United States Patent
Centonza et al.

(10) Patent No.: US 11,818,769 B2
(45) Date of Patent: Nov. 14, 2023

(54) FIRST NETWORK NODE, SECOND NETWORK NODE AND METHODS PERFORMED THEREBY FOR HANDLING A RANDOM ACCESS CHANNEL CONFIGURATION CONFLICT

(71) Applicant: Telefonaktiebolaget LM Ericsson (publ), Stockholm (SE)

(72) Inventors: Angelo Centonza, Torrenueva Costa (ES); Pablo Soldati, Solna (SE); Ali Parichehrehteroujeni, Linköping (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 154 days.

(21) Appl. No.: 17/298,134

(22) PCT Filed: Aug. 12, 2020

(86) PCT No.: PCT/SE2020/050775
§ 371 (c)(1),
(2) Date: May 28, 2021

(87) PCT Pub. No.: WO2021/034246
PCT Pub. Date: Feb. 25, 2021

(65) Prior Publication Data
US 2022/0022264 A1    Jan. 20, 2022

Related U.S. Application Data

(60) Provisional application No. 62/887,778, filed on Aug. 16, 2019.

(51) Int. Cl.
*H04W 74/08*    (2009.01)
*H04W 74/00*    (2009.01)
*H04L 5/00*    (2006.01)

(52) U.S. Cl.
CPC ....... *H04W 74/0841* (2013.01); *H04L 5/0053* (2013.01); *H04W 74/008* (2013.01); *H04W 74/0866* (2013.01)

(58) Field of Classification Search
CPC .................. H04W 74/0841; H04W 74/008
See application file for complete search history.

(56) References Cited

U.S. PATENT DOCUMENTS

2022/0217781 A1* 7/2022 Decarreau ............. H04W 24/10

OTHER PUBLICATIONS

International Search Report and Written Opinion of the International Searching Authority for PCT International Application No. PCT/SE2020/050775 dated Oct. 14, 2020.

(Continued)

*Primary Examiner* — James P Duffy
(74) *Attorney, Agent, or Firm* — Christopher & Weisberg, P.A.

(57) ABSTRACT

A method performed by a first network node operating in with a Radio Access Technology with split architecture. The first network node is a Distributed Unit. The first network node receives one or more second indications from a second network node, a Centralized Unit. The indications comprise: i) a positive or a negative acknowledgement of a configuration conflict between a first RACH configuration in a first cell being a served cell, and a second RACH configuration in a second cell, the second cell being a neighbour cell to the first cell, ii) CU RACH assistance information associated to the conflict, the information comprising the second RACH configuration, and/or iii) a first third RACH configuration for the first cell. The first network node then updates the first RACH configuration to a second third RACH configuration, based on the indications.

11 Claims, 26 Drawing Sheets

(56) References Cited

OTHER PUBLICATIONS

Huawei, "RACH optimisation in NR based on LTE," R3-192963, 3GPP TSG-RAN3 Meeting #104, Reno, Nevada, US May 13-17, 2019, 3 pages.
Ericsson, "TP on solutions for RACH optimisation," R3-193063, 3GPP TSG-RAN3 Meeting #104, Reno, Nevada, US May 13-17, 2019, 3 pages.
Ericsson, "RACH optimization in NR," R3-193062, 3GPP TSG-RAN3 Meeting #104, Reno, Nevada, US May 13-17, 2019, 5 pages.
3GPP TR 37.816 V16.0.0, "3rd Generation Partnership Project; Technical Specification Group Radio Access Network; Study on RAN-centric data collection and utilization for LTE and NR (Release 16)," Technical Report (Jul. 2019), 35 pages.
3GPP TS 38.321 V15.3.0, "3rd Generation Partnership Project; Technical Specification Group Radio Access Network; NR; Medium Access Control (MAC) protocol specification (Release 15)," Technical Specification (Sep. 2018), 76 pages.
3GPP TS 36.331 V15.3.0, "3rd Generation Partnership Project; Technical Specification Group Radio Access Network; Evolved Universal Terrestrial Radio Access (E-UTRA); Radio Resource Control (RRC); Protocol specification (Release 15)," Technical Specification (Sep. 2018), 918 pages.
3GPP TS 38.331 V15.3.0, "3rd Generation Partnership Project; Technical Specification Group Radio Access Network; NR; Radio Resource Control (RRC) protocol specification (Release 15)," Technical Specification (Sep. 2018), 445 pages.
3GPP TS 38.401 V15.3.0, "3rd Generation Partnership Project; Technical Specification Group Radio Access Network; NG-RAN; Architecture description (Release 15)," Technical Specification (Sep. 2018), 39 pages.

\* cited by examiner a)

b)

a)

b)

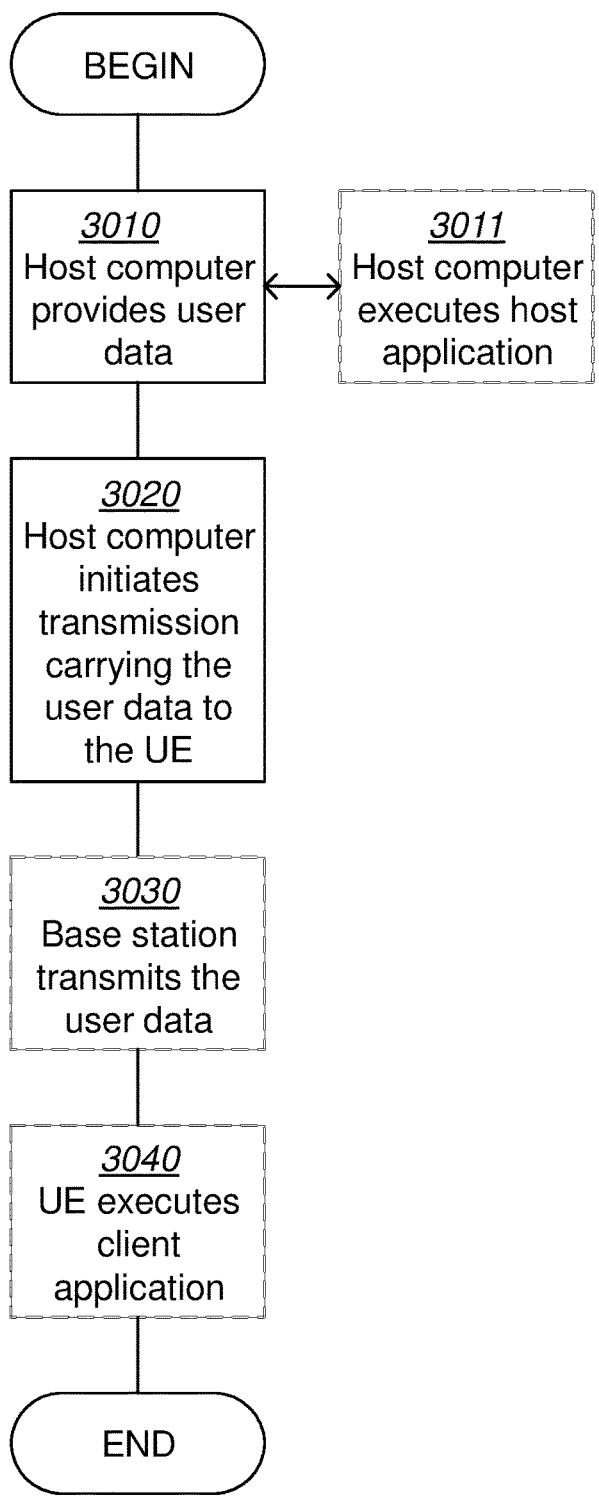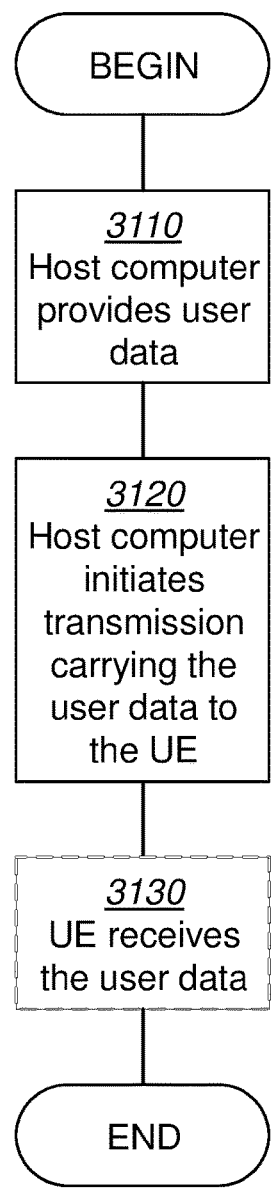
FIG. 30
FIG. 31

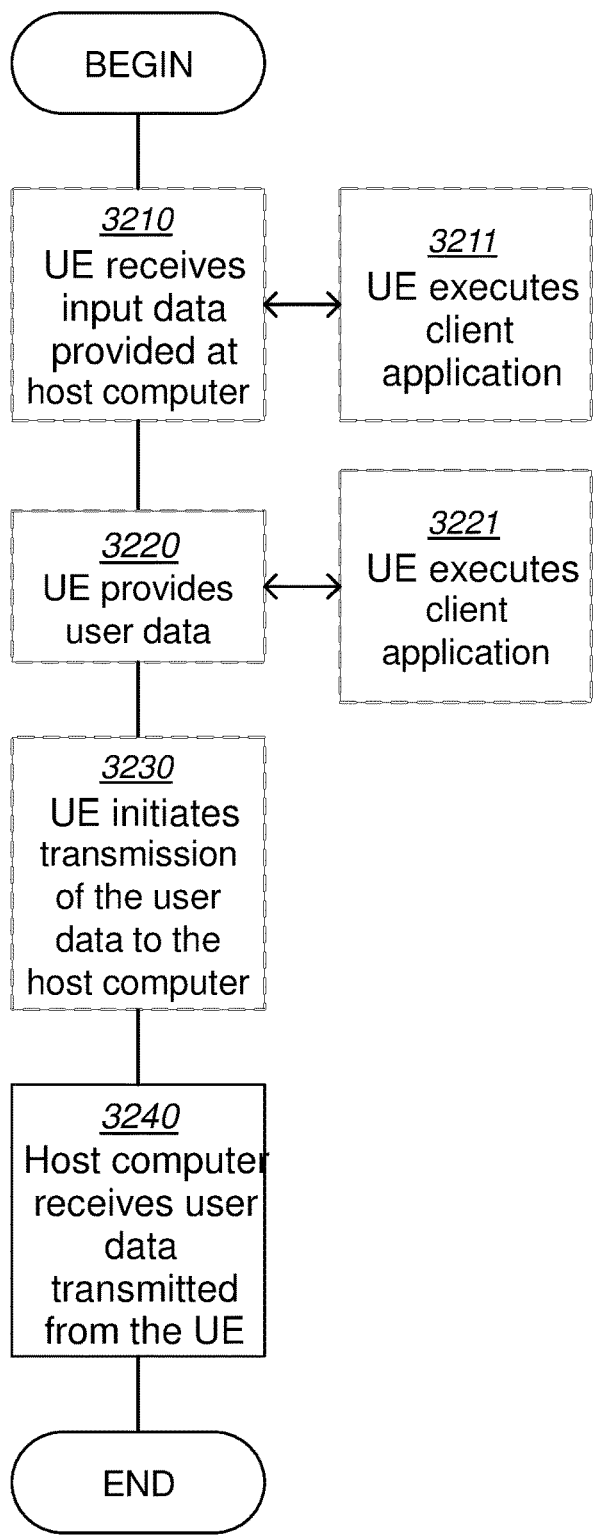
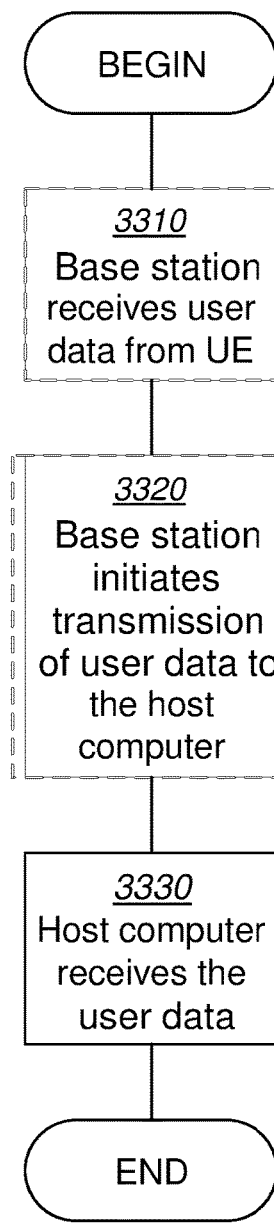
FIG. 32
FIG. 33

FIRST NETWORK NODE, SECOND NETWORK NODE AND METHODS PERFORMED THEREBY FOR HANDLING A RANDOM ACCESS CHANNEL CONFIGURATION CONFLICT

CROSS REFERENCE TO RELATED APPLICATIONS

This application is a 35 U.S.C. § 371 national stage application of PCT International Application No. PCT/SE2020/050775 filed on Aug. 12, 2020, which claims the benefit of U.S. Provisional Patent Application Ser. No. 62/887,778, filed on Aug. 16, 2019, the disclosures and content of which are incorporated by reference herein in their entireties.

TECHNICAL FIELD

The present disclosure relates generally to a first network node, and methods performed thereby, for handling a Random Access Channel (RACH) configuration conflict. The present disclosure also relates generally to a second network node and methods performed thereby, for handling the RACH configuration conflict.

BACKGROUND

Communication devices within a wireless communications network may be User Equipments (UEs) such as e.g., wireless devices, stations (STAs), mobile terminals, wireless terminals, terminals, and/or Mobile Stations (MS). Wireless devices are enabled to communicate wirelessly in a cellular communications network or wireless communication network, sometimes also referred to as a cellular radio system, cellular system, or cellular network. The communication may be performed e.g., between two wireless devices, between a wireless device and a regular telephone, and/or between a wireless device and a server via a Radio Access Network (RAN), and possibly one or more core networks, comprised within the wireless communications network. Wireless devices may further be referred to as mobile telephones, cellular telephones, laptops, or tablets with wireless capability, just to mention some further examples. The wireless devices in the present context may be, for example, portable, pocket-storable, hand-held, computer-comprised, or vehicle-mounted mobile devices, enabled to communicate voice and/or data, via the RAN, with another entity, such as another terminal or a server.

Communication devices may also be network nodes, such as radio network nodes or access nodes, e.g., Transmission Points (TP). The wireless communications network covers a geographical area which may be divided into cell areas, each cell area being served by a network node such as a Base Station (BS), e.g. a Radio Base Station (RBS), which sometimes may be referred to as e.g., gNB, evolved Node B ("eNB"), "eNodeB", "NodeB", "B node", or BTS (Base Transceiver Station), depending on the technology and terminology used. The base stations may be of different classes such as e.g. Wide Area Base Stations, Medium Range Base Stations, Local Area Base Stations and Home Base Stations, based on transmission power and thereby also cell size. A cell is the geographical area where radio coverage is provided by the base station at a base station site. One base station, situated on the base station site, may serve one or several cells. Further, each base station may support one or several communication technologies. The wireless communications network may also be a non-cellular system, comprising network nodes which may serve receiving nodes, such as wireless devices, with serving beams. In 3rd Generation Partnership Project (3GPP) Long Term Evolution (LTE), base stations, which may be referred to as eNodeBs or even eNBs, may be directly connected to one or more core networks. In the context of this disclosure, the expression Downlink (DL) may be used for the transmission path from the base station to the wireless device. The expression Uplink (UL) may be used for the transmission path in the opposite direction i.e., from the wireless device to the base station.

NR The so-called Fifth Generation (5G) system, from a radio perspective started to be standardized in 3GPP, and the so-called New Radio (NR) is the name for the radio interface. NR architecture is being discussed in 3GPP. In the current concept, gNB denotes NR BS, where one NR BS may correspond to one or more transmission/reception points.

One of the main goals of NR is to provide more capacity for operators to serve ever increasing traffic demands and variety of applications. Because of this, NR will be able to operate on high frequencies like frequencies over 6 GHz until 60 or even 100 GHz.

NR Architecture

The current 5G RAN (NG-RAN) architecture is depicted and described in TS 38.401v15.5.0 (http://www.3gpp.org/ftp//Specs/archive/38 series/38.401/38401-f50.zip) as depicted in the schematic diagram of FIG. 1. The NG architecture may be further described as follows. The NG-RAN 10 may be understood to consist of a set of gNBs 11 connected to the 5G Core Network (5GC) 12 through the NG 13. An gNB can support Frequency Division Duplex (FDD) mode, Time Division Duplex (TDD) mode or dual mode operation. gNBs may be understood to be interconnected through the Xn 14. A gNB may consist of a gNB-Central Unit (CU) 15 and gNB-Distributed Units (DUs) 16. A gNB-CU and a gNB-Distributed Unit (DU) may be connected via F1 logical interface 17. One gNB-DU may be connected to only one gNB-CU. It may be noted that for resiliency, a gNB-DU may be connected to multiple gNB-CU by appropriate implementation.

NG, Xn and F1 are logical interfaces. The NG-RAN may be understood to be layered into a Radio Network Layer (RNL) and a Transport Network Layer (TNL). The NG-RAN architecture, that is, the NG-RAN logical nodes and interfaces between them, may be defined as part of the RNL. For each NG-RAN interface (NG, Xn, F1), the related TNL protocol and the functionality are specified. The TNL may be understood to provide services for user plane transport, signalling transport. If security protection for control plane and user plane data on TNL of NG-RAN interfaces has to be supported, NDS/IP (3GPP TS 33.401 [x] may be understood to need to be applied).

A gNB may also be connected to an LTE eNB via the X2 interface. Another architectural option is that where an LTE eNB connected to the Evolved Packet Core network is connected over the X2 interface with a so called en-gNB. The latter may be understood as a gNB not connected directly to a CN and connected via X2 to an eNB for the sole purpose of performing dual connectivity.

The architecture in FIG. 1 may be expanded by splitting the gNB-CU 15 into two entities. FIG. 2 is a schematic diagram depicting a split gNB architecture in NG RAN. In the split architecture option, the RAN protocol stack functionality may be separated in different parts. The Central Unit-Control Plane (CU-CP) 20 may be expected to handle the Radio Resource Control (RRC layer), the Central Unit-User Plane (CU-UP) 21 may handle the Packet Data Convergence Protocol (PDCP) layer and the DU 22 may handle the RLC, Medium Access Control (MAC) and Physical layer (PHY) layer of the protocol stack. In some further split, the DU may have separated unit that may handle the PHY parts separately compared to RLC and MAC layers that may be handled in a DU.

As different units handle different protocol stack functionalities, there may be a need for inter-node communication between the DU, the CU-UP 21 and the CU-CP 20. This may be achieved via an F1-C interface 23 related to control plane signaling, via an F1-U 24 interface related to user plane signaling for communication between CU and DU and via E1 25 for communication between CU-UP 21 and CU-CP 20.

The E1 25 interface may be understood as a logical interface. It may support the exchange of signalling information between the endpoints. From a logical standpoint, the E1 25 may be understood as a point-to-point interface between a gNB-CU-CP and a gNB-CU-UP. The E1 interface may enable exchange of UE associated information and non-UE associated information. The E1 interface may be understood as a control interface and may be understood to not be used for user data forwarding.

Random Access Channel (RACH) Optimization Purpose

Optimization of the RACH configuration in cells is a Release 9 Self-Organizing Network (SON) feature that may be understood to be key to optimizing the system performance of a mobile network. A poorly configured RACH may result in higher call setup and handover delays due to frequent RACH collisions, or low preamble-detection probability and limited coverage. The amount of uplink resource reserved for RACH may also affect the system capacity. Therefore, a network operator may need to carefully monitor that the RACH parameters are appropriately set, considering factors such as the RACH load, the uplink interference, the traffic patterns and the population under the cell coverage.

The RACH optimization feature may facilitate automatic configuration of Physical Random Access Channel (PRACH) parameters, including the PRACH resource configuration, preamble root sequence and cyclic shift configuration, to avoid preamble collisions with neighbouring cells. The principle of this automatic configuration may be understood to be similar to the automatic Physical Cell Identifier (PCI) configuration SON feature: the PRACH configuration information may be included in the 'X2 Setup' and 'eNB Configuration Update' procedures. Therefore, whenever a new eNodeB is initialized and may learn about its neighbours via the Automatic Neighbour Relation (ANR) function, it may at the same time learn the neighbouring PRACH configurations. It may then select its own PRACH configuration to avoid conflicts with the neighbouring ones.

Whenever a conflict is identified, one of the cells may need to change its configuration, but the algorithm for selecting which cell may need to change and in what manner is not specified. The network operator may also combine PRACH self-optimization with manual configuration if necessary, but this may be typically more prone to errors and more time consuming than automatic RACH optimization.

Reporting of RACH Information and Failures.

RACH resources configuration and allocation among different cells may be performed at the network planning phase in a centralized fashion, e.g., by Operation and Maintenance (OAM) or in a distributed fashion, e.g., by a RAN node at gNB-CU and/or gNB-DU. The network may use UE assistance information in terms of a RACH report for a performed RACH procedure.

However, the task becomes more complicated given that these factors may change dynamically. For example, if the antenna tilt is changed in a cell, it may be understood to affect the rates of call arrival and handover in this cell and the surrounding cells, and therefore the RACH load per preamble in all those cells. A change in transmission power settings or handover thresholds may have similar effects.

Whenever such a network configuration change happens, the RACH self-optimization feature may need to automatically make appropriate measurements of the RACH performance and usage in all the affected cells and determine any necessary updates of the RACH parameters.

RACH parameters that may then be adjusted may typically be the following: split of RACH preambles between contention-free access, contention-based access with high payload and contention-based access with low payload, RACH back-off parameter value or the RACH transmission power ramping parameters, and any other parameter may be adjusted if found useful by network operator.

In the following, the signaling designed for RACH optimization over the X2 logical interface as well as the RACH UE assistance information reporting mechanism in LTE will be briefly reviewed. In addition, different types of the RACH procedure in NR and some details on how RACH procedure works will also be explained.

RACH Related Signaling Over the X2 Interface in LTE System

Generally, a RAN node may trigger an analysis of the information reported by the UE internally or in coordination in other RAN nodes. In this regards, as a part of LTE solution, eNB PRACH configuration may be exchanged over the X2 interface by leveraging ENB X2 Setup Request and eNB Configuration update signaling, where the PRACH Configuration Information Element (IE), shown in the following table, may be contained in the Served Cell Information IE. This IE may indicate the PRACH resources used in a neighbour cell.

| IE/Group Name | Presence | IE type and reference | Semantics description | Criticality | Assigned Criticality |
|---|---|---|---|---|---|
| RootSequenceIndex | M | INTEGER (0 . . . 837) | See section 5.7.2. in TS 36.211 [10] | — | — |
| ZeroCorrelationZoneConfiguration | M | INTEGER (0 . . . 15) | See section 5.7.2. in TS 36.211 [10] | — | — |

| IE/Group Name | Presence | IE type and reference | Semantics description | Criticality | Assigned Criticality |
|---|---|---|---|---|---|
| HighSpeedFlag | M | BOOLEAN | TRUE corresponds to Restricted set and FALSE to Unrestricted set. See section 5.7.2 in TS 36.211 [10] | — | — |
| PRACH-FrequencyOffset | M | INTEGER (0 . . . 94) | See section 5.7.1 of TS 36.211 [10] | — | — |
| PRACH-ConfigurationIndex | O | INTEGER (0 . . . 63) | Mandatory for TDD, shall not be present for FDD. See section 5.7.1. in TS 36.211 [10] | — | — |

Note that such information may be exchanged between RAN nodes with cells identified as neighbouring cells. Neighbouring cells may be identified by Radio Resource Management (RRM) measurements provided by UEs. Upon detection of a new neighbour, a RAN node may request to set up an X2 interface or later update the configurations if changed. This may be accomplished as part of X2 Setup Request or eNB Configuration signaling which may include PRACH configuration as part of Served Cell Information IE.

In addition to the above-mentioned mechanism to exchange RACH related configuration over the X2 interface as part of X2 Setup and eNB Configuration update signals, a Uu based signaling has been defined to use a UE assistance information to detect the potential issues, and further enhance the RACH performance by performing finer optimization relying on the provided UE assistance information.

Log and Reporting of UE Assistance RACH Information in LTE

In LTE, the report of RACH information when random access procedure is performed may be requested by the network via the UE Information procedure in RRC (section 5.6.5 of 3GPP TS 36.331 V15.3.0 (2018-09)), in the case where a RACH procedure was successful. That procedure is summarized below, as described in RRC specifications:

5.6.5 UE Information
5.6.5.1 General
The UE information procedure is used by E-UTRAN to request the UE to report information. FIG. 3 is a schematic representation of this procedure, which is described next.

5.6.5.2 Initiation
E-UTRAN 30 initiates the procedure by sending the UEInformationRequest message at 31. E-UTRAN should initiate this procedure only after successful security activation.

5.6.5.3 Reception of the UEInformationRequest Message
Upon receiving the UEInformationRequest message, the UE 32 shall, only after successful security activation:
  1> if rach-ReportReq is set to true, set the contents of the rach-Report in the UEInformationResponse message as follows:
    2> set the numberOfPreamblesSent to indicate the number of preambles sent by MAC for the last successfully completed random access procedure;
    2> if contention resolution was not successful as specified in TS 36.321 [6] for at least one of the transmitted preambles for the last successfully completed random access procedure:
      3> set the contentionDetected to true;
    2> else:
      3> set the contentionDetected to false;
  . . .
  1> else:
    2> submit the UEInformationResponse message to lower layers for transmission via SRB1 at 33;
UEInformationRequest
The UEInformationRequest is the command used by E-UTRAN to retrieve information from the UE.
  Signalling radio bearer: SRB1
  RLC-SAP: AM
  Logical channel: DCCH
  Direction: E-UTRAN to UE UEInformationRequest message

```
-- ASN1START
UEInformationRequest-r9            ::=       SEQUENCE {
  rrc-TransactionIdentifier                  RRC-TransactionIdentifier,
  criticalExtensions                         CHOICE {
    c1                                       CHOICE {
      ueInformationRequest-r9                        UEInformationRequest-r9-IEs,
      spare3 NULL, spare2 NULL, spare1 NULL
    },
```

-continued

| UEInformationRequest message |
|---|

```
    criticalExtensionsFuture              SEQUENCE { }
  }
}
UEInformationRequest-r9-IEs  ::=         SEQUENCE {
 rach-ReportReq-r9                        BOOLEAN,
 rlf-ReportReq-r9                         BOOLEAN,
 nonCriticalExtension                     UEInformationRequest-v930-IEs
 OPTIONAL
}
 . . .
-- ASN1STOP
```

UEInformationResponse

The UEInformationResponse message is used by the UE to transfer the information requested by the E-UTRAN.
    Signalling radio bearer: SRB1 or SRB2 (when logged measurement information is included) RLC-SAP: AM
    Logical channel: DCCH
    Direction: UE to E-UTRAN

| UEInformationResponse message |
|---|

```
-- ASN1START
UEInformationResponse-r9  ::= SEQUENCE {
UEInformationResponse-r9-IEs  ::=        SEQUENCE {
 rach-Report-r9                           SEQUENCE {
    numberOfPreamblesSent-r9               NumberOfPreamblesSent-r11,
    contentionDetected-r9                  BOOLEAN
 }                                          OPTIONAL,
 rlf-Report-r9                           RLF-Report-r9   OPTIONAL,
 nonCriticalExtension                    UEInformationResponse-v930-IEs
    OPTIONAL
}
NumberOfPreamblesSent-r11::= INTEGER (1..200)
-- ASN1STOP
```

RACH Configuration in NR

As in LTE, random access procedure may be understood to be described in the NR MAC specifications, and parameters may be configured by RRC e.g., in System Information (SI) or handover, e.g., in RRCReconfiguration with reconfigurationWithSync. Random access may be triggered in many different scenarios, for example, when the UE is in RRC_IDLE or RRC_INACTIVE and may want to access a cell that is camping on, that is, in a transition to RRC_CONNECTED.

In NR, RACH configuration, e.g., RACH-ConfigGeneric and RACH-ConfigCommon, may be broadcasted in System Information Block 1 (SIB1), as part of the servingCellConfigCommon, with both DL and UL configurations, where the RACH configuration may be within the uplinkConfigCommon. The exact RACH parameters may be within what is called initialUplinkBWP, since this may be the part of the UL frequency the UE may be required to access and search for RACH resources.

| RACH-ConfigGeneric information element |
|---|

```
-- ASN1START
-- TAG-RACH-CONFIGGENERIC-START
RACH-ConfigGeneric ::=                   SEQUENCE {
 prach-ConfigurationIndex                 INTEGER (0..255),
 msg1-FDM                                 ENUMERATED {one, two,
four, eight},
 msg1-FrequencyStart                      INTEGER
(0..maxNrofPhysicalResourceBlocks-1),
 zeroCorrelationZoneConfig                INTEGER(0..15),
 preambleReceivedTargetPower              INTEGER (-202..-60),
 preambleTransMax                         ENUMERATED {n3, n4, n5,
n6, n7, n8, n10, n20, n50, n100, n200},
 powerRampingStep                         ENUMERATED {dB0, dB2,
dB4, dB6},
 ra-ResponseWindow                        ENUMERATED {sl1, sl2,
sl4, sl8, sl10, sl20, sl40, sl80},
 ...
}
-- TAG-RACH-CONFIGGENERIC-STOP
-- ASN1STOP
```

| RACH-ConfigCommon information element |
|---|

```
-- ASN1START
-- TAG-RACH-CONFIGCOMMON-START
RACH-ConfigCommon ::=                 SEQUENCE {
 rach-ConfigGeneric                    RACH-ConfigGeneric,
 totalNumberOfRA-Preambles             INTEGER (1..63) OPTIONAL,
-- Need S
 ssb-perRACH-OccasionAndCB-Preambles-   CHOICE {
PerSSB
    oneEighth                          ENUMERATED
{n4,n8,n12,n16,n20,n24,n28,n32,n36,n40,n44,n48,n52,n56,n60,n64},
    oneFourth                          ENUMERATED
{n4,n8,n12,n16,n20,n24,n28,n32,n36,n40,n44,n48,n52,n56,n60,n64},
    oneHalf                            ENUMERATED
{n4,n8,n12,n16,n20,n24,n28,n32,n36,n40,n44,n48,n52,n56,n60,n64},
    one                                ENUMERATED
{n4,n8,n12,n16,n20,n24,n28,n32,n36,n40,n44,n48,n52,n56,n60,n64},
    two                                ENUMERATED
{n4,n8,n12,n16,n20,n24,n28,n32},
    four                               INTEGER (1..16),
    eight                              INTEGER (1..8),
    sixteen                            INTEGER (1..4)
 }
OPTIONAL, -- Need M
 groupBconfigured                      SEQUENCE {
    ra-Msg3SizeGroupA                   ENUMERATED {b56, b144, b208,
b256, b282, b480, b640,
                                                   b800, b1000,
b72, spare6, spare5, spare4, spare3, spare2, spare1},
    messagePowerOffsetGroupB            ENUMERATED { minusinfinity,
dB0, dB5, dB8, dB10, dB12, dB15, dB18},
    numberOfRA-PreamblesGroupA          INTEGER (1..64)
 }
OPTIONAL, -- Need R
 ra-ContentionResolutionTimer          ENUMERATED { sf8, sf16,
sf24, sf32, sf40, sf48, sf56, sf64},
 rsrp-ThresholdSSB                     RSRP-Range
OPTIONAL, -- Need R
 rsrp-ThresholdSSB-SUL                 RSRP-Range
OPTIONAL, -- Cond SUL
 prach-RootSequenceIndex               CHOICE {
    l839                                INTEGER (0..837),
    l139                                INTEGER (0..137)
 },
 msg1-SubcarrierSpacing                SubcarrierSpacing
OPTIONAL, -- Cond L139
 restrictedSetConfig                   ENUMERATED {unrestrictedSet,
restrictedSetTypeA, restrictedSetTypeB},
 msg3-transformPrecoder                ENUMERATED {enabled}
OPTIONAL, -- Need R
 ...
}
-- TAG-RACH-CONFIGCOMMON-STOP
-- ASN1STOP
```

Contention-Based RACH (CBRA) in NR

In LTE, the RACH report to assist the network to perform RACH optimization, may contain an indication that a collision was detected. With that information, it may be understood to be clear that at some point before that RACH procedure that has succeeded, that same UE tried to access the network and happened to have a collision.

In NR, a mechanism also exists for contention resolution for contention-based random access. Because in NR transmission may take place via beamforming, whenever a conflict is identified, the beam that may need to change its configuration may need to be determined. Therefore, CBRA may take into consideration the RACH partitioning per beam, in other words, which beam the UE may have selected to communicate with the network.

RACH Partitioning Per Beam in NR

FIG. 4 is a schematic diagram illustrating an example of how Primary Synchronization Signal (PSS) and Secondary Synchronization Signal (SSS) signals may be transmitted in LTE, top panel, and in NR, bottom panel, respectively. The top panel, shows how within an LTE cell, a particular set x of PSS and SSS is transmitted. In an NR cell, on the other hand, PSS and SS signals may be part of the Synchronization Signal Blocks (SSBs), which may be transmitted in a single or multiple beams, as illustrated in the bottom panel. For instance, in NR, an SSBs may be transmitted in 1 beam, a typical implementation for lower frequencies e.g. below 6 GHz, or in multiple downlink beams, a typical implementation for lower frequencies e.g. below 6 GHz. For the same cell, these SSBs may carry the same Physical Cell Identifier (PCI) and a Master Information Block (MIB).

In a NR, random access resource selection may need to be performed within a cell depending on measurements performed on Synchronization Signal Blocks (SSBs) or Channel State Information Reference signals (CSI-RSs). For standalone operation, that is, to support UEs camping on an NR cell, they may also carry in SIB1 the RACH configuration, which may comprise a mapping between the detected SSB covering the UE at a given point in time and the PRACH configuration, e.g., time, frequency, preamble, etc. to be used. For that, each of these beams may transmit its own SSB which may be distinguished by an SSB index, as shown in the example of the lower panel of FIG. 4.

The mapping between RACH resources and SSBs, or CSI-RS, may also be provided as part of the RACH configuration, in RACH-ConfigCommon. Two parameters may be relevant here: #SSBs-per-PRACH-occasion: ⅛, ¼, ½, 1, 2, 8 or 16, which may be understood to represent the number of SSBs per RACH occasion; and #CB-preambles-per-SSB preambles to each SS-block: within a RACH occasion, which may be understood to represent how many preambles are allocated.

FIG. 5 is a schematic diagram illustrating an example of SSB transmission, wherein an exemplary mapping from SSB index, as transmitted in the PDSCH 50, to PRACH occasion 51 in the PUSCH 52, is depicted. To give a first example, if the number of SSBs per RACH occasion 51 is 1, and if the UE is under the coverage of a specific SSB, e.g., SSB index 2 53, there may be a RACH occasion for that SSB index 2. If the UE moves and is now under the coverage of another specific SSB, e.g., SSB index 5, there may be another RACH occasion for that SSB index 5, that is, each SSB detected by a given UE may have its own RACH occasion. Hence, at the network side, upon detecting a preamble in a particular RACH occasion the network may know exactly which SSB the UE has selected and, consequently, which downlink beam may be covering the UE, so that the network may continue the downlink transmission e.g., Random Access Response (RAR), etc. That factor 1 may be understood to be an indication that each SSB may have its own RACH resource. That is, a preamble detected there may be understood to indicate to the network which SSB the UE has selected, that is, which DL beam the network may need to use to communicate with the UE, such as the one to send the RAR.

Note that each SS-block may typically map to multiple preambles, different cyclic shifts and Zadoff-Chu roots, within a PRACH occasion, so that it may be possible to multiplex different UEs in the same RACH occasions since they may be under the coverage of the same SSB. In a second example, shown in the schematic diagram of FIG. 6, the number of SSBs per RACH occasion is 2. Hence, a preamble received in that RACH occasion may be understood to indicate to the network that one of the two beams are being selected by the UE. So either the network has means via implementation to distinguish these two beams and/or the network may need to perform a beam sweeping in the downlink by transmitting the RAR in both beams, either simultaneously or, transmitting in one, waiting for a response from the UE, and if absent, transmit in the other.

Assuming now that in the first attempt the UE may have selected an SSB, based on measurements performed in that cell, transmitted with initial power a selected preamble associated to the PRACH resource mapped to the selected SSB, and has not received a RAR within the RAR time window, the next paragraphs describe the actions that may be taken by the UE and/or the network. According to the specifications, the UE may still perform preamble re-transmission, as long as a maximum number of allowed transmissions may not have been reached.

The contention resolution in NR is shown below as described in the MAC specifications (3GPP TS 38.321, v. 15.3.0 (2018-09), 3rd Generation Partnership Project; Technical Specification Group Radio Access Network; NR; Medium Access Control (MAC) protocol specification (Release 15)):

5.1.5 Contention Resolution
Once Msg3 is transmitted, the MAC entity shall:
   1> start the ra-ContentionResolutionTimer and restart the ra-ContentionResolutionTimer at each HARQ retransmission in the first symbol after the end of the Msg3 transmission;
   1> monitor the PDCCH while the ra-ContentionResolutionTimer is running regardless of the possible occurrence of a measurement gap;
   1> if notification of a reception of a PDCCH transmission of the SpCell is received from lower layers:
      2> if the C-RNTI MAC CE was included in Msg3:
         3> if the Random Access procedure was initiated for beam failure recovery (as specified in subclause 5.17) and the PDCCH transmission is addressed to the C-RNTI; or
         3> if the Random Access procedure was initiated by a PDCCH order and the PDCCH transmission is addressed to the C-RNTI; or
         3> if the Random Access procedure was initiated by the MAC sublayer itself or by the RRC sublayer and the PDCCH transmission is addressed to the C-RNTI and contains a UL grant for a new transmission:
            4> consider this Contention Resolution successful;
            4> stop ra-ContentionResolutionTimer;
            4> discard the TEMPORARY_C-RNTI;
            4> consider this Random Access procedure successfully completed.
      2> else if the CCCH SDU was included in Msg3 and the PDCCH transmission is addressed to its TEMPORARY_C-RNTI:
         3> if the MAC PDU is successfully decoded:
            4> stop ra-ContentionResolutionTimer,
            4> if the MAC PDU contains a UE Contention Resolution Identity MAC CE; and
            4> if the UE Contention Resolution Identity in the MAC CE matches the CCCH SDU transmitted in Msg3:
               5> consider this Contention Resolution successful and finish the disassembly and demultiplexing of the MAC PDU;
               5> if this Random Access procedure was initialed for SI request:
                  6> indicate the reception of an acknowledgement for SI request to upper layers.
               5> else:
                  6> set the C-RNTI to the value of the TEMPORARY_C-RNTI;
               5> discard the TEMPORARY_C-RNTI;
               5> consider this Random Access procedure successfully completed.
            4> else:
               5> discard the TEMPORARY_C-RNTI;
               5> consider this Contention Resolution not successful and discard the successfully decoded MAC PDU.
   1> if ra-ContentionResolutionTimer expires:
      2> discard the TEMPORARY_C-RNTI;
      2> consider the Contention Resolution not successful.
   1> if the Contention Resolution is considered not successful:

2> flush the HARQ buffer used for transmission of the MAC PDU in the MSg3 buffer,
2> increment PREAMBLE_TRANSMISSION_COUNTER by 1;
2> if PREAMBLE_TRANSMISSION_COUNTER= preambleTransMax+1;
  3> indicate a Random Access problem to upper layers.
  3> if this Random Access procedure was triggered for SI request:
    4> consider the Random Access procedure unsuccessfully completed.
2> if the Random Access procedure is not completed:
  3> select a random backoff time according to a uniform distribution between 0 and the PREAMBLE_BACKOFF;
  3> if the criteria (as defined in subclause 5.1.2) to select contention-free Random Access Resources is met during the backoff time:
    4> perform the Random Access Resource selection procedure (see subclause 5.1.2);
  3> else:
    4> perform the Random Access Resource selection procedure (see subclause 5.1.2) after the backoff time.

5.1.2 Random Access Resource Selection
The MAC entity shall:
1> if the Random Access procedure was initiated for beam failure recovery (as specified in subclause 5.17); and
1> if the beamFailureRecoveryTimer (in subclause 5.17) is either running or not configured; and
1> if the contention-free Random Access Resources for beam failure recovery request associated with any of the SSBs and/or CSI-RSs have been explicitly provided by RRC; and
1> if at least one of the SSBs with SS-RSRP above rsrp-ThresholdSSB amongst the SSBs in candidateBeamRSList or the CSI-RSs with CSI-RSRP above rsrp-ThresholdCSI-RS amongst the CSI-RSs in candidateBeamRSList is available:
  2> select an SSB with SS-RSRP above rsrp-ThresholdSSB amongst the SSBs in candidateBeamRSList or a CSI-RS with CSI-RSRP above rsrp-ThresholdCSI-RS amongst the CSI-RSs in candidateBeamRSList;
  2> if CSI-RS is selected, and there is no ra-PreambleIndex associated with the selected CSI-RS:
    3> set the PREAMBLE_INDEX to a ra-PreambleIndex corresponding to the SSB in candidateBeamRSList which is quasi-colocated with the selected CSI-RS as specified in TS 38.214 [7].
  2> else:
    3> set the PREAMBLE_INDEX to a ra-PreambleIndex corresponding to the selected SSB or CSI-RS from the set of Random Access Preambles for beam failure recovery request.
1> else if the ra-PreambleIndex has been explicitly provided by PDCCH; and
1> if the ra-PreambleIndex is not 0b000000:
  2> set the PREAMBLE_INDEX to the signalled ra-PreambleIndex;
  2> select the SSB signalled by PDCCH.
1> else if the contention-free Random Access Resources associated with SSBs have been explicitly provided in rach-ConfigDedicated and at least one SSB with SS-RSRP above rsrp-ThresholdSSB amongst the associated SSBs is available:
  2> select an SSB with SS-RSRP above rsrp-ThresholdSSB amongst the associated SSBs;
  2> set the PREAMBLE_INDEX to a ra-PreambleIndex corresponding to the selected SSB.
1> else if the contention-free Random Access Resources associated with CSI-RSs have been explicitly provided in rach-ConfigDedicated and at least one CSI-RS with CSI-RSRP above rsrp-ThresholdCSI-RS amongst the associated CSI-RSs is available:
  2> select a CSI-RS with CSI-RSRP above rsrp-ThresholdCSI-RS amongst the associated CSI-RSs;
  2> set the PREAMBLE_INDEX to a ra-PreambleIndex corresponding to the selected CSI-RS.
1> else if the Random Access procedure was initiated for SI request (as specified in TS 38.331 [5]); and
1> if the Random Access Resources for SI request have been explicitly provided by RRC:
  2> if at least one of the SSBs with SS-RSRP above rsrp-ThresholdSSB is available:
    3> select an SSB with SS-RSRP above rsrp-ThresholdSSB.
  2> else:
    3> select any SSB.
  2> select a Random Access Preamble corresponding to the selected SSB, from the Random Access Preamble(s) determined according to ra-PreambleStarthIndex as specified in TS 38.331 [5];
  2> set the PREAMBLE_INDEX to selected Random Access Preamble.
1> else (i.e. for the contention-based Random Access preamble selection):
  2> if at least one of the SSBs with SS-RSRP above rsrp-ThresholdSSB is available:
    3> select an SSB with SS-RSRP above rsrp-ThresholdSSB.
  2> else:
    3> select any SSB.

5.1.3 Random Access Preamble Transmission
The MAC entity shall, for each Random Access Preamble:
1> if PREAMBLE_TRANSMISSION_COUNTER is greater than one; and
1> if the notification of suspending power ramping counter has not been received from lower layers: and
1> if SSB or CSI-RS selected is not changed from the selection in the last Random Access Preamble transmission:
  2> increment PREAMBLE_POWER_RAMPING_COUMER by 1;
1> select the value of DELTA_PREAMBLE according to subclause 7.3;
1> set PREAMBLE_RECEIVED_TARGET_POWER to preambleReceivedTargetPower+DELTA_PREAMBLE+(PREAMBLE_POWER_RAMPING_COUNTER−1)×PREAMBLE_POWER_RAMPING_STEP;
1> except for contention-free Random Access Preamble for beam failure recovery request, compute the RA-RNTI associated with the PRACH occasion in which the Random Access Preamble is transmitted;
1> instruct the physical layer to transmit the Random Access Preamble using the selected PRACH occasion, corresponding RA-RNTI (if available). PREAMBLE_INDEX and PREAMBLE_RECEIVED_TARGET_POWER.

The RA-RNTI associated with the PRACH occasion in which the Random Access Preamble is transmitted, is computed as:

$$RA\text{-}RNTI=1+s\_id+14\times t\_id+14\times 80\times f\_id+14\times 80\times 8\times ul\_carrier\_id$$

where s_id is the index of the first OFDM symbol of the PRACH occasion (0≤s_id<14), t_id is the index of the first slot of the PRACH occasion in a system frame (0≤t_id<80), f_id is the index of the PRACH occasion in the frequency domain (0≤f_id<8), and ul_carrier_id is the UL carrier used for Random Access Preamble transmission (0 for NUL carrier, and 1 for SUL carrier).

5.1.4 Random Access Response Reception

Once the Random Access Preamble is transmitted and regardless of the possible occurrence of a measurement gap, the MAC entity shall:

1> if the contention-free Random Access Preamble for beam failure recovery request was transmitted by the MAC entity:
  2> start the ra-ResponseWindow con figured in BeamFailure RecoveryConfig at the first PDCCH occasion as specified in TS 38.213 [6] from the end of the Random Access Preamble transmission;
  2> monitor for a PDCCH transmission on the search space indicated by recoverySearchSpaceId of the SpCell identified by the C-RNTI while ra-Response Window is running.
1> else:
  2> start the ra-ResponseWindow configured in RACH-ConfigComman at the first PDCCH occasion as specified in TS 38.213 [6] from the end of the Random Access Preamble transmission;
  2> monitor the PDCCH of the SpCell for Random Access Response(s) identified by the RA-RNTI while the ra-Response Window is running.
1> if notification of a reception of a PDCCH transmission on the search space indicated by recoverySearchSpaceId is received from lower layers on the Serving Cell where the preamble was transmitted; and
1> if PDCCH transmission is addressed to the C-RNTI; and
1> if the contention-free Random Access Preamble for beam failure recovery request was transmitted by the MAC entity:
  2> consider the Random Access procedure successfully completed.
1> else if a downlink assignment has been received on the PDCCH for the RA-RNTI and the received TB is successfully decoded:
  2> if the Random Access Response contains a MAC subPDU with Backoff Indicator:
    3> set the PREAMBLE_BACKOFF to value of the BI field of the MAC subPDU using Table 7.2-1, multiplied with SCALING_FACTOR_BIU.
  2> else:
    3> set die PREAMBLE_BACKOFF to 0 ms.
  2> if the Random Access Response contains a MAC subPDU with Random Access Preamble identifier corresponding to the transmitted PREAMBLE_INDEX (see subclause 5.1.3):
    3> consider this Random Access Response reception successful.
  2> if the Random Access Response reception is considered successful:
    3> if the Random Access Response includes a MAC subPDU with RAPID only:
      4> consider this Random Access procedure successfully completed;
      4> indicate the reception of an acknowledgement for SI request to upper layers.
    3> else:
      4> apply the following actions for the Serving Cell where the Random Access Preamble was transmitted:
        5> process the received Timing Advance Command (see subclause 5.2);
        5> indicate the preambleReceivedTargetPower and the amount of power ramping applied to the latest Random Access Preamble transmission to lower layers (i.e. (PREAMBLE_POWER_RAMPING_COUNTER−1)×PREAMBLE_POWER_RAMPING_STEP);
        5> if the Serving Cell for the Random Access procedure is SRS-only SCell:
          6> ignore the received UL grant.
        5> else:
          6> process the received UL grant value and indicate it to the lower layers.
      4> if the Random Access Preamble was not selected by the MAC entity among the contention-based Random Access Preamble(s):
        5> consider the Random Access procedure successfully completed.
      4> else:
        5> set the TEMPORARY_C-RNTI to the value received in the Random Access Response;
        5> if this is the first successfully received Random Access Response within this Random Access procedure:
          6> if die transmission is not being made for the CCCH logical channel:
            7> indicate to the Multiplexing and assembly entity to include a C-RNTI MAC CE in the subsequent uplink transmission.
          6> obtain the MAC PDU to transmit from the Multiplexing and assembly entity and store it in die Msg3 buffer.

NOTE: If within a Random Access procedure, an uplink grant provided in the Random Access Response for the same group of contention-based Random Access Preambles has a different size than the first uplink grant allocated during that Random Access procedure, the UE behavior is not defined.

1> if ra-ResponseWindow configured in BeamFailureRecoveryConfig expires and if a PDCCH transmission on the search space indicated by recoverySearchSpaceId addressed to the C-RNTI has not been received on the Serving Cell where the preamble was transmitted: or
1> if ra-ResponseWindow configured in RACH-Config Common expires, and if the Random Access Response containing Random Access Preamble identifiers that matches the transmitted PREAMBLE_INDEX has not been received:
  2> consider the Random Access Response reception not successful;
  2> increment PREAMBLE_TRANSMISSION_COUNTER by 1;

2> if PREAMBLE_TRANSMISSION_COUNTER=preambleTransMax+1;
　3> if the Random Access Preamble is transmitted on the SpCell;
　　4> indicate a Random Access problem to upper layers;
　　4> if this Random Access procedure was triggered for SI request
　　　5> consider the Random Access procedure unsuccessfully completed.
　3> else if the Random Access Preamble is transmitted on a SCell:
　　4> consider the Random Access procedure unsuccessfully completed.
2> if the Random Access procedure is not completed:
　3> select a random backoff time according to a uniform distribution between 0 and the PREAMBLE_BACKOFF;
　3> if the criteria (as defined in subclause 5.1.2) to select contention-free Random Access Resources is met during the backoff time:
　　4> perform the Random Access Resource selection procedure (see subclause 5.1.2);
　3> else:
　　4> perform the Random Access Resource selection procedure (see subclause 5.1.2) after the backoff time.

The MAC entity may stop ra-Response Window (and hence monitoring for Random Access Response(s)) after successful reception of a Random Access Response containing Random Access Preamble identifiers that matches the transmitted PREAMBLE_INDEX. HARQ operation is not applicable to the Random Access Response reception.

2.1.7. Contention-Free Random Access (CFRA) in NR and Fallback to CBRA

In NR, as in LTE, the UE may be configured to perform CFRA e.g., during handovers. That configuration may be comprised in the reconfigurationWithSync of IE ReconfigurationWithSync, which may be comprised in the CellGroupConfig IE, transmitted in the RRCReconfiguration message, as shown below:

```
ReconfigurationWithSync ::=        SEQUENCE {
 spCellConfigCommon                 ServingCellConfigCommon
OPTIONAL, -- Need M
 newUE-Identity                     RNTI-Value,
 t304                               ENUMERATED {ms50, ms100,
ms150, ms200, ms500, ms1000, ms2000, ms10000},
 rach-ConfigDedicated               CHOICE {
    uplink                            RACH-ConfigDedicated,
    supplementaryUplink               RACH-ConfigDedicated
 }
OPTIONAL, -- Need N
 ...,
 [[
 smtc                               SSB-MTC
OPTIONAL -- Need S
 ]]
}
```

| RACH-ConfigDedicated information element |
|---|
| ```
-- ASN1START
--- TAG-RACH-CONFIG-DEDICATED-START
RACH-ConfigDedicated ::=   SEQUENCE {
 cfra                       CFRA OPTIONAL, -- Need S
 ra-Prioritization          RA-Prioritization
OPTIONAL, -- Need N
 ...
}
CFRA ::=                    SEQUENCE {
 occasions                   SEQUENCE {
    rach-ConfigGeneric          RACH-ConfigGeneric,
    ssb-perRACH-Occasion        ENUMERATED
{oneEighth, oneFourth, oneHalf, one, two, four, eight,
sixteen} OPTIONAL -- Cond
SSB-CFRA
 }
OPTIONAL, -- Need S
 resources                   CHOICE {
    ssb                         SEQUENCE {
       ssb-ResourceList            SEQUENCE
(SIZE(1..maxRA-SSB-Resources)) OF CFRA-SSB-Resource,
       ra-ssb-OccasionMaskIndex    INTEGER (0..15)
    },
    csirs                       SEQUENCE {
       csirs-ResourceList          SEQUENCE
(SIZE(1..maxRA-CSIRS-Resources)) OF CFRA-CSIRS-Resource,
       rsrp-ThresholdCSI-RS        RSRP-Range
    }
 },
 ...,
 [[
``` |

| RACH-ConfigDedicated information element |
| --- |
| ```
totalNumberOfRA-Preambles-v1530  INTEGER (1..63)
OPTIONAL -- Cond Occasions
  ]]
}
CFRA-SSB-Resource    ::=     SEQUENCE {
 ssb                         SSB-Index,
 ra-PreambleIndex            INTEGER (0..63),
 ...
}
CFRA-CSIRS-Resource  ::=     SEQUENCE {
 csi-RS                      CSI-RS-Index,
 ra-OccasionList             SEQUENCE
(SIZE(1..maxRA-OccasionsPerCSIRS)) OF INTEGER
(0..maxRA-Occasions-1),
 ra-PreambleIndex            INTEGER (0..63),
 ...
}
-- TAG-RACH-CONFIG-DEDICATED-STOP
-- ASN1STOP
``` |

One first difference shown above, that is already highlighted in the section entitled "RACH configuration in NR" is that RACH resources may be mapped to beams, e.g., SSBs or CSI-RS resources that may be measured by the UE. Hence, when CFRA resources are provided they may be also mapped to beams and this may be done only for a subset of beams in a given target cell.

The consequence is that to use CFRA resources, the UE may need to select a beam for which it has CFRA resources configured in the dedicated configuration. In the case of SSBs, for example, that may be found in the ssb-ResourceList which is a SEQUENCE (SIZE(1 . . . maxRA-SSB-Resources)) OF CFRA-SSB-Resource.

If an analogy with LTE were to be made, that is, if the NR solution would have been the same as LTE, upon selecting a beam with CFRA resource, e.g. a beam from the configured list, and not receiving the RAR, the UE would keep selecting the same resource and ramp the power before retransmitting the preamble. However, as in the case of NR CBRA, the UE has the option upon every failed attempt to select another beam. And, that another beam may either be in the list of beams for CFRA or it may not. In the case the selected beam is not, the UE may perform CBRA.

It may also be noticed that there may be a fallback between CSI-RS selection to SSB selection, in case CFRA may be provided for CSI-RS resources.

That is shown below, as captured in the MAC specifications (3GPP TS 38.331 V15.3.0 (2018-09), 3rd Generation Partnership Project; Technical Specification Group Radio Access Network; NR; Radio Resource Control (RRC) protocol specification (Release 15)):

5.1.2 Random Access Resource Selection
The MAC entity shall:
1> if the Random Access procedure was initiated for beam failure recovery (as specified in subclause 5.17); and
  1> if the beamFailureRecoveryTimer (in subclause 5.17) is either running or not configured; and
  1> if the contention-free Random Access Resources for beam failure recovery request associated with any of the SSBs and/or CSI-RSs have been explicitly provided by RRC; and
  1> if at least one of the SSBs with SS-RSRP above rsrp-ThresholdSSB amongst the SSBs in candidateBeamRSList or the CSI-RSs with CSI-RSRP above rsrp-ThresholdCSI-RS amongst the CSI-RSs in candidateBeamRSList is available:
    2> select an SSB with SS-RSRP above rsrp-ThresholdSSB amongst the SSBs in candidateBeamRSList or a CSI-RS with CSI-RSRP above rsrp-ThresholdCSI-RS amongst the CSI-RSs in candidateBeamRSList;
    2> if CSI-RS is selected, and there is no ra-PreambleIndex associated with the selected CSI-RS:
      3> set the PREAMBLE_INDEX to a ra-PreambleIndex corresponding to the SSB in candidateBeamRSList which is quasi-colocated with the selected CSI-RS as specified in TS 38.214 [7].
    2> else:
      3> set the PREAMBLE_INDEX to a ra-PreambleIndex corresponding to the selected SSB or CSI-RS from the set of Random Access Preambles for beam failure recovery request.
1> else if the ra-PreambleIndex has been explicitly provided by PDCCH; and
1> if the ra-PreambleIndex is not 0b000000:
  2> set the PREAMBLE_INDEX to the signalled ra-PreambleIndex;
  2> select the SSB signalled by PDCCH.
1> else if the contention-free Random Access Resources associated with SSBs have been explicitly provided in rach-ConfigDedicated and at least one SSB with SS-RSRP above rsrp-ThresholdSSB amongst the associated SSBs is available:
  2> select an SSB with SS-RSRP above rsrp-ThresholdSSB amongst the associated SSBs;
  2> set the PREAMBLE_INDEX to a ra-PreambleIndex corresponding to the selected SSB.
1> else if the contention-free Random Access Resources associated with CSI-RSs have been explicitly provided in rach-ConfigDedicated and at least one CSI-RS with CSI-RSRP above rsrp-ThresholdCSI-RS amongst the associated CSI-RSs is available:
  2> select a CSI-RS with CSI-RSRP above rsrp-ThresholdCSI-RS amongst the associated CSI-RSs;
  2> set the PREAMBLE_INDEX to a ra-PreambleIndex corresponding to the selected CSI-RS.
1> else if the Random Access procedure was initiated for SI request (as specified in TS 38.331 [5]); and 1> if the Random Access Resources for SI request have
   been explicitly provided by RRC:
   2> if at least one of the SSBs with SS-RSRP above
      rsrp-ThresholdSSB is available:
      3> select an SSB with SS-RSRP above rsrp-ThresholdSSB.
   2> else:
      3> select any SSB.
   2> select a Random Access Preamble corresponding to
      the selected SSB, from the Random Access
      Preamble(s) determined according to ra-PreambleStartIndex as specified in TS 38.331 [5];
   2> set the PREAMBLE_INDEX to selected Random
      Access Preamble.
1> else (i.e. for the contention-based Random Access
   preamble selection):
   2> if at least one of the SSBs with SS-RSRP above
      rsrp-ThresholdSSB is available:
      3> select an SSB with SS-RSRP above rsrp-ThresholdSSB.
   2> else:
      3> select any SSB.
1> if the Random Access procedure was initiated for SI
   request (as specified in TS 38.331 [5]); and
1> if ra-AssociationPeriodIndex and si-RequestPeriod are
   configured:

The RACH optimization legacy mechanisms for LTE are not re-adaptable to NR. As stated earlier, a poorly configured RACH may result in delays, limited coverage, interference and affected system capacity.

SUMMARY

The NR RAT, part of the NG RAN system, has a new structure for the configuration of RACH resources and processes when compared to LTE. In NR RACH, resources and processes may be configured on a per beam basis, whereas in LTE RACH resources may be understood to be defined only on a cell granularity. Cell beams may be characterized by specific reference signals and communication channels. Typically, beams signals and channels may not always be available in time for a given coverage area. The reason for this is that beams "sweep", namely their availability in terms of RS and communication channels may change in the time and spatial domain given that the beam orientation may be swept across a pre-set coverage area. Furthermore, the split architecture followed in NR and in other RATs such as E-UTRAN, may be understood to imply that information that may be needed to perform RACH optimization, such as RACH configurations of cells within a neighbourhood, indications on whether a possible RACH configuration conflict exists, indication of changes of RACH configuration to solve a RACH configuration conflict, may need to be exchanged between gNB-CU and gNB-DU, in the specific example of NR, or in general, between the CU and the DU of the specific high layer split architecture for that RAT.

For example, while a CU may be aware of a conflict, it may not be able to change the RACH resources. Similarly, while a DU may be able to change RACH resources, it may not know the actual configuration of RACH resources of the neighbouring cells, which may be known by the CU.

The above factors create a problem when a RACH optimization solution may need to be supported because the legacy mechanisms for LTE, such as those described in the background section, are not re-adaptable to NR.

Certain aspects of the present disclosure and their embodiments may provide solutions to this challenge or other challenges. There are, proposed herein, various embodiments which address one or more of the issues disclosed herein.

Embodiments herein may be understood to be related to a method for resolving RACH configuration conflicts with detection at a gNB-DU.

It is an object of embodiments herein to improve the handling of a Random Access Channel (RACH) configuration. It is a particular object of embodiments herein to improve the handling of a RACH configuration in a wireless communications network with a Radio Access Technology (RAT) with a split architecture, with a Centralized Unit (CU), and a Distributed Unit (DU).

According to a first aspect of embodiments herein, the object is achieved by a method performed by a first network node. The method is for handling a RACH configuration conflict. The first network node operates in a wireless communications network with a RAT with a split architecture, wherein the first network node is a DU, and a second network node is a CU. The first network node receives one or more indications from the second network node. The second network node operates in the wireless communications network. The one or more indications comprise at least one of the following three options. In a first option i), a positive acknowledgement or a negative acknowledgement of a RACH configuration conflict. The RACH configuration conflict is detected between a first RACH configuration in a first cell, the first cell being a served cell by the first network node, and a second RACH configuration in a second cell. The second cell is a neighbour cell to the first cell. In a second option ii) CU RACH assistance information associated to the RACH conflict. The CU RACH assistance information comprises the second RACH configuration. In a third option iii), a first third RACH configuration for the first cell. The first network node then updates the first RACH configuration to a second third RACH configuration, based on the detected conflict. The second third RACH configuration is obtained based on the received one or more indications.

According to a second aspect of embodiments herein, the object is achieved by a method performed by the second network node. The method is for handling the RACH configuration conflict. The second network node operates in the wireless communications network with the RAT with a split architecture, wherein the second network node is a CU, and the first network node is a DU. The second network node sends the one or more indications to the first network node operating in the wireless communications network. The one or more indications comprise at least one of the following three options. In a first option i), the positive acknowledgement or the negative acknowledgement of the RACH configuration conflict. The RACH configuration conflict is between the first RACH configuration in the first cell, the first cell being a served cell by the first network node, and the second RACH configuration in the second cell. The second cell is the neighbour cell to the first cell. In a second option ii), the CU RACH assistance information associated to the RACH conflict. The CU RACH assistance information comprises the second RACH configuration. In a third option iii), the first third RACH configuration for the first cell.

According to a third aspect of embodiments herein, the object is achieved by a the first network node. The first network node is for handling the RACH configuration conflict. The first network node is configured to operate in the wireless communications network with the RAT with the split architecture, wherein the first network node is configured to be a DU, and the second network node is configured to be a CU. The first network node is configured to receive the one or more indications from the second network node configured to operate in the wireless communications network. The one or more indications are configured to comprise at least one of the following three options. In a first option i), the positive acknowledgement or the negative acknowledgement of the RACH configuration conflict. The RACH configuration conflict is configured to be detected between the first RACH configuration in the first cell, the first cell being configured to be the served cell by the first network node, and the second RACH configuration in the second cell. The second cell is configured to be the neighbour cell to the first cell. In a second option ii), the CU RACH assistance information configured to be associated to the RACH conflict. The CU RACH assistance information is configured to comprise the second RACH configuration. In a third option iii), the first third RACH configuration for the first cell. The first network node is further configured to update the first RACH configuration to the second third RACH configuration, based on the conflict configured to be detected. The second third RACH configuration is configured to be obtained based on the one or more indications configured to be received.

According to a fourth aspect of embodiments herein, the object is achieved by the second network node, for handling the RACH configuration conflict. The second network node is configured to operate in the wireless communications network the RAT with the split architecture, wherein the second network node is configured to be a CU, and the first network node is configured to be a DU. The second network node is further configured to send the one or more indications to the first network node configured to operate in the wireless communications network. The one or more indications are further configured to comprise at least one of the following three options. In a first option i) the positive acknowledgement or the negative acknowledgement of the RACH configuration conflict. The RACH configuration conflict is configured to be between the first RACH configuration in the first cell. The first cell is configured to be the served cell by the first network node, and the second RACH configuration in the second cell. The second cell is configured to be the neighbour cell to the first cell. In a second option ii) the CU RACH assistance information associated to the RACH conflict. The CU RACH assistance information is configured to comprise the second RACH configuration. In a third option iii) the first third RACH configuration for the first cell.

By receiving the one or more indications from the second network node comprising at least one of the positive acknowledgement or a negative acknowledgement of the RACH configuration conflict, the CU RACH assistance information and/or the first third RACH configuration, and updating the first RACH configuration to the second third RACH configuration, based on the received one or more indications, the first network node may enable the conflict to be resolved, either by resolving it itself, by having the second network node to resolve it efficiently and with minimal information exchange between the first network node and the second network node. This may be understood to be because in a split RAN architecture, wherein the first network node is a DU, and the second network node is a CU, the second network node may have knowledge of the RACH resource configuration for all cells of the first network node, as well as the RACH resource configuration of cells con-trolled by DUs connected to one or more neighbouring CUs. As such, the second network node may be able to verify if the RACH configuration conflict actually exists or not, since the potential RACH configuration conflict that may have been detected by the first network node may be, for example, due to a deterioration of a radio link unrelated to a RACH configuration conflict. By receiving the positive acknowledgement or a negative acknowledgement of the RACH configuration conflict, the first network node may therefore be enabled to only proceed with resolving the conflict, if the conflict actually exists, which may enable it to save time, processing and energy resources. By receiving the CU RACH assistance information, the first network node may be enabled to have enough information to change the RACH configuration and avoid any RACH configuration conflict with neighbouring cells, since only the second network node may be enabled to provide such information. Hence, the first network node may be enabled to perform a more optimized update of the first RACH configuration to resolve the conflict more efficiently, with minimal signalling exchanges between the first network node and the second network node. Similarly, by receiving the first third RACH configuration the first network node may be enabled to perform a more optimized update of the first RACH configuration to resolve the conflict more efficiently, with minimal signalling exchanges between the first network node and the second network node, since only the second network node may have knowledge of the RACH resource configuration for all cells of the first network node, as well as the RACH resource configuration of cells controlled by DUs connected to one or more neighbouring CUs. Hence, the first third RACH configuration provided by the second network node may avoid any RACH configuration conflict with neighbouring cells.

BRIEF DESCRIPTION OF THE DRAWINGS

Examples of embodiments herein are described in more detail with reference to the accompanying drawings, and according to the following description.

FIG. 30 is a flowchart depicting embodiments of a method in a communications system including a host computer, a base station and a user equipment, according to embodiments herein.

FIG. 31 is a flowchart depicting embodiments of a method in a communications system including a host computer, a base station and a user equipment, according to embodiments herein.

FIG. 32 is a flowchart depicting embodiments of a method in a communications system including a host computer, a base station and a user equipment, according to embodiments herein.

FIG. 33 is a flowchart depicting embodiments of a method in a communications system including a host computer, a base station and a user equipment, according to embodiments herein.

DETAILED DESCRIPTION

As part of the development of embodiments herein, one or more challenges with the existing technology have been identified and discussed in the Summary section.

Some of the embodiments contemplated will now be described more fully hereinafter with reference to the accompanying drawings, in which examples are shown. In this section, the embodiments herein will be illustrated in more detail by a number of exemplary embodiments. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art. It should be noted that the exemplary embodiments herein are not mutually exclusive. Components from one embodiment may be tacitly assumed to be present in another embodiment and it will be obvious to a person skilled in the art how those components may be used in the other exemplary embodiments.

Note that although terminology from LTE/5G has been used in this disclosure to exemplify the embodiments herein, this should not be seen as limiting the scope of the embodiments herein to only the aforementioned system. Other wireless systems with similar features, may also benefit from exploiting the ideas covered within this disclosure.

Figure 1:
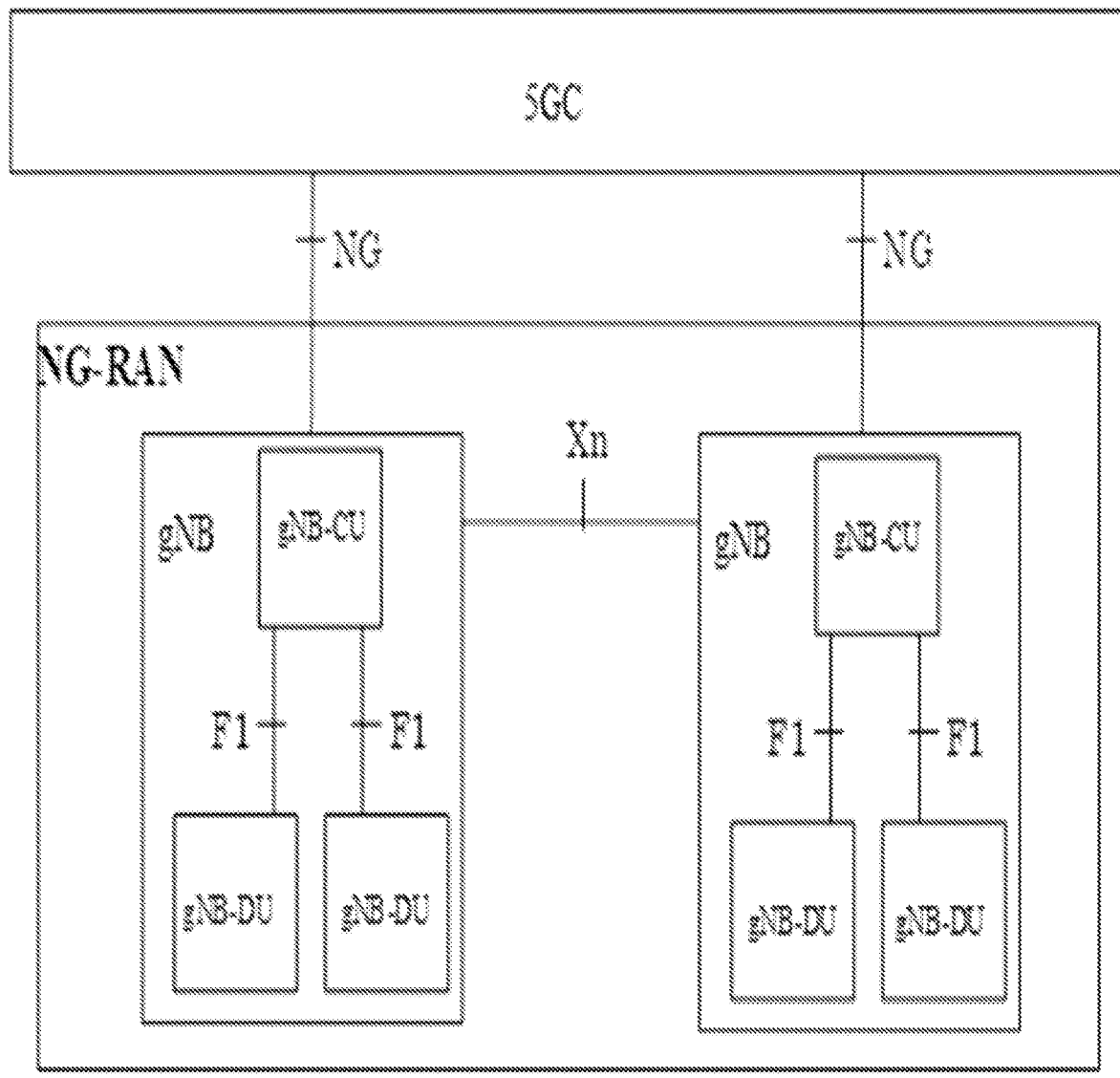
FIG. 1 is a schematic diagram illustrating an example of a NR architecture overview.
Figure 2:
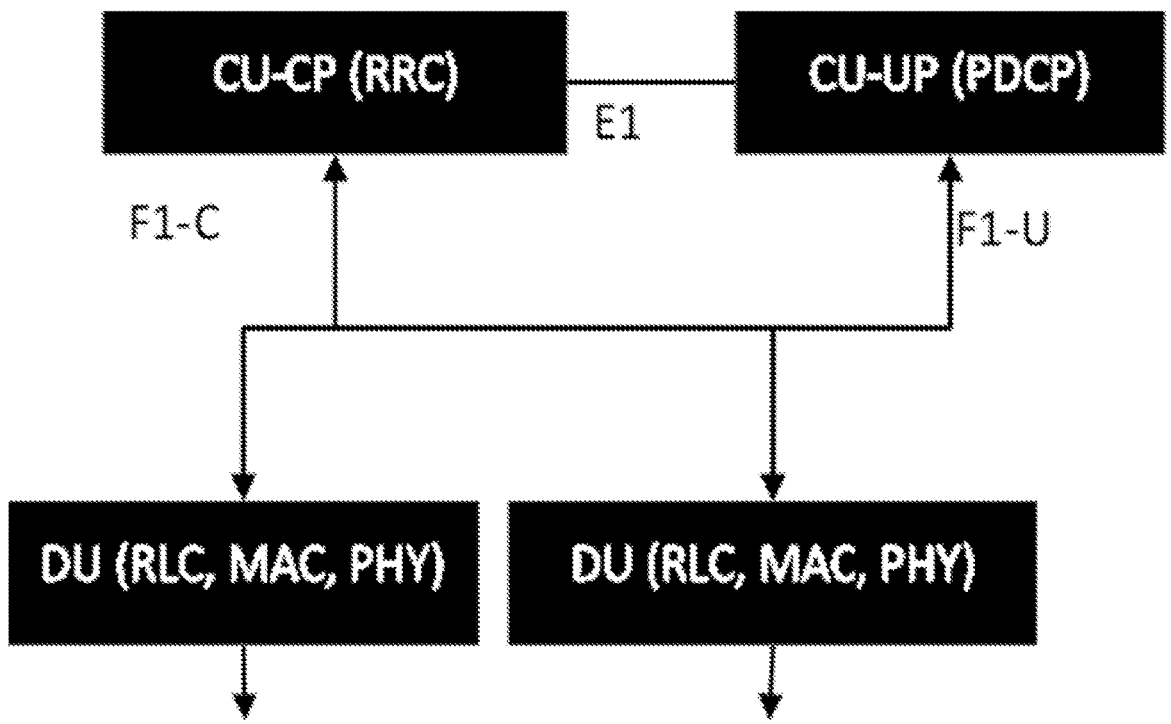
FIG. 2 is a signalling diagram depicting an example of split gNB architecture in NG RAN.
Figure 3:
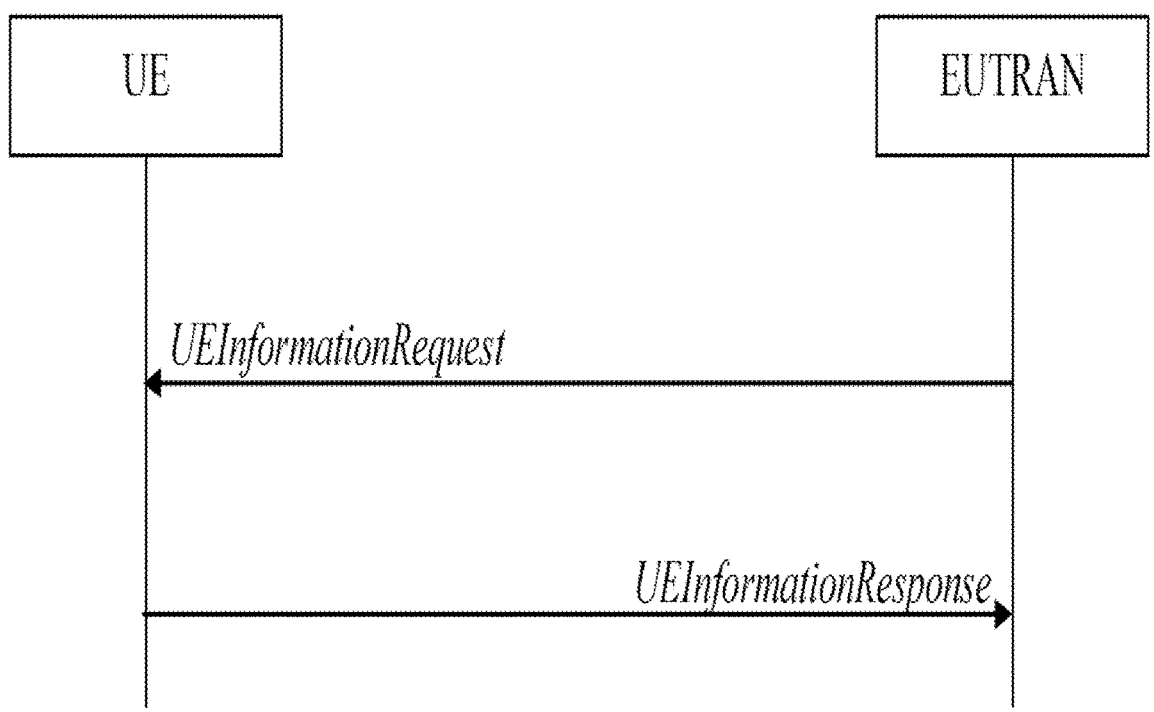
FIG. 3 is a signalling diagram depicting an example of UE information procedure as depicted in FIG. 5.6.5.1-1 of 3GPP TS 36.331 V15.3.0 (2018-09).
Figure 4:
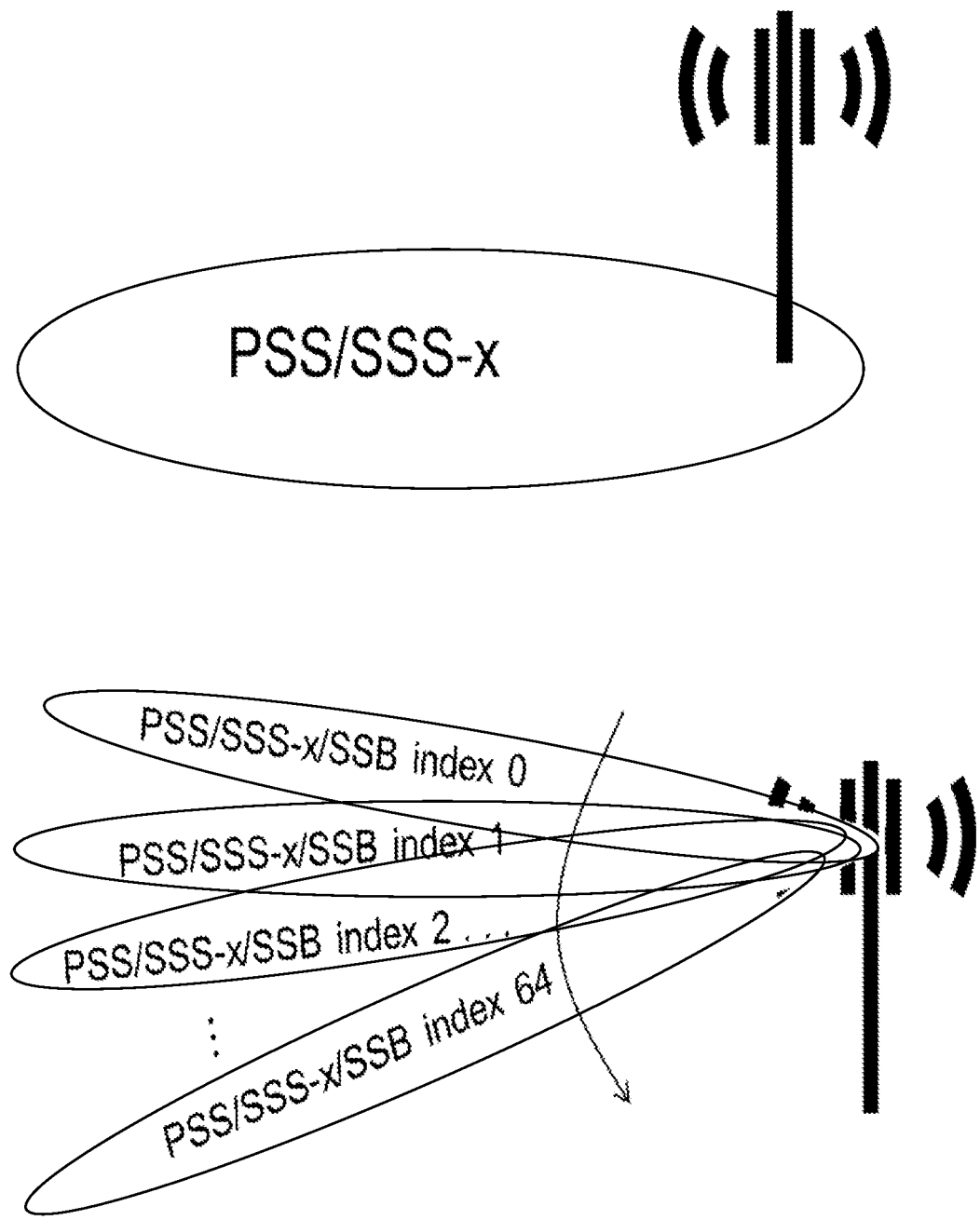
FIG. 4 is a signalling diagram illustrating an example of beam transmission in NR.
Figure 5:
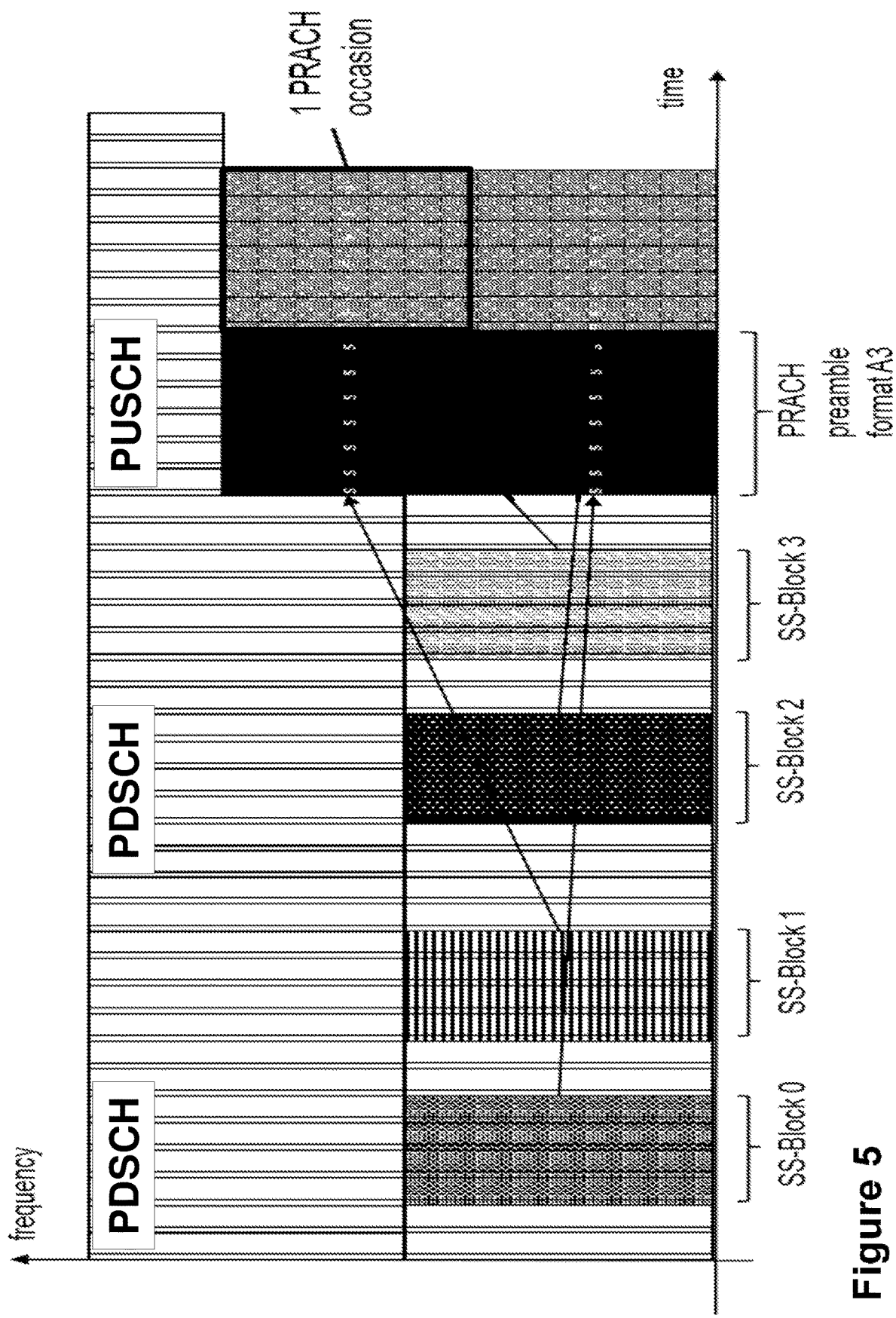
FIG. 5 is a schematic diagram illustrating an example of SSB transmission.
Figure 6:
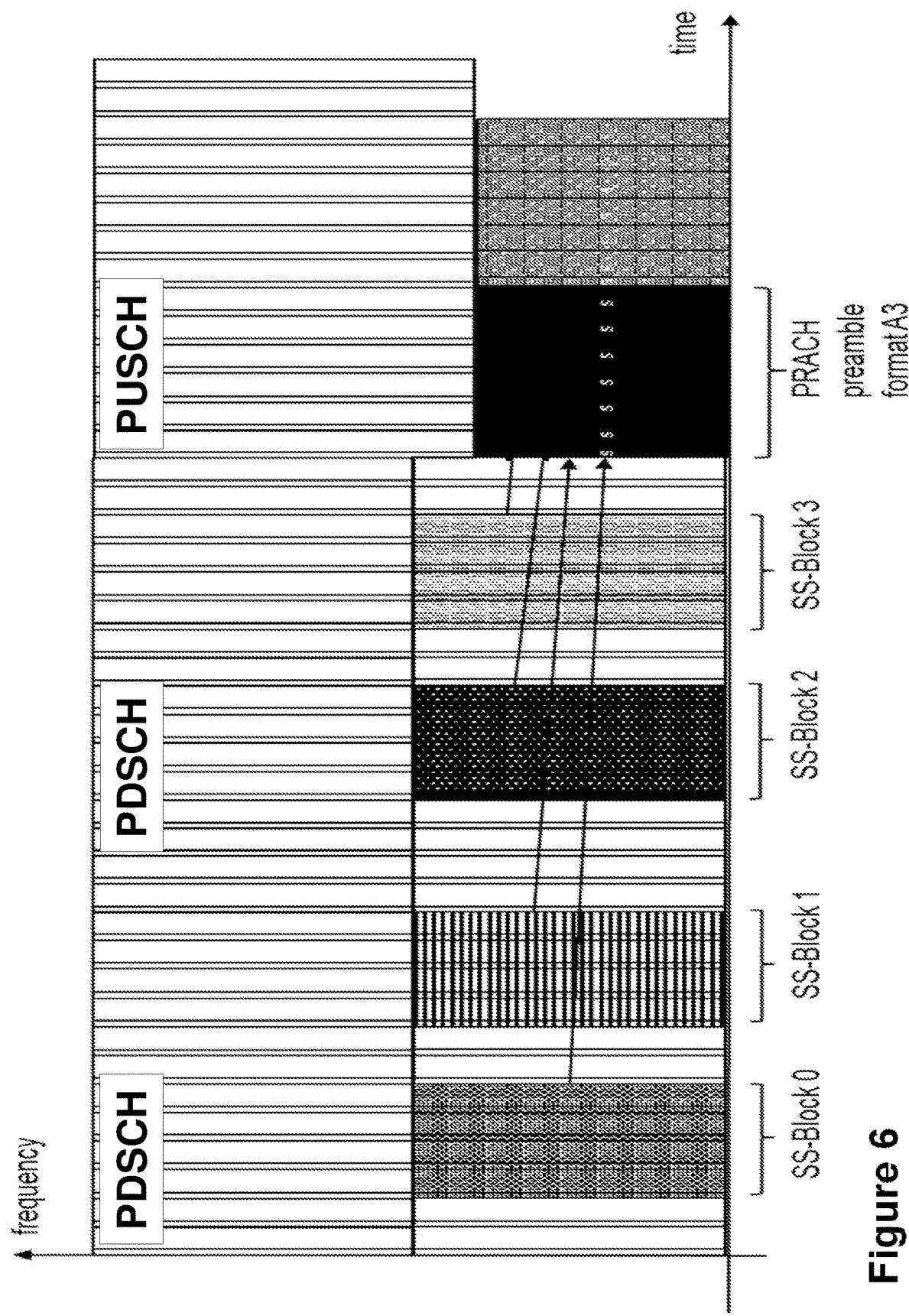
FIG. 6 is a schematic diagram illustrating another example of SSB transmission.
Figure 7:
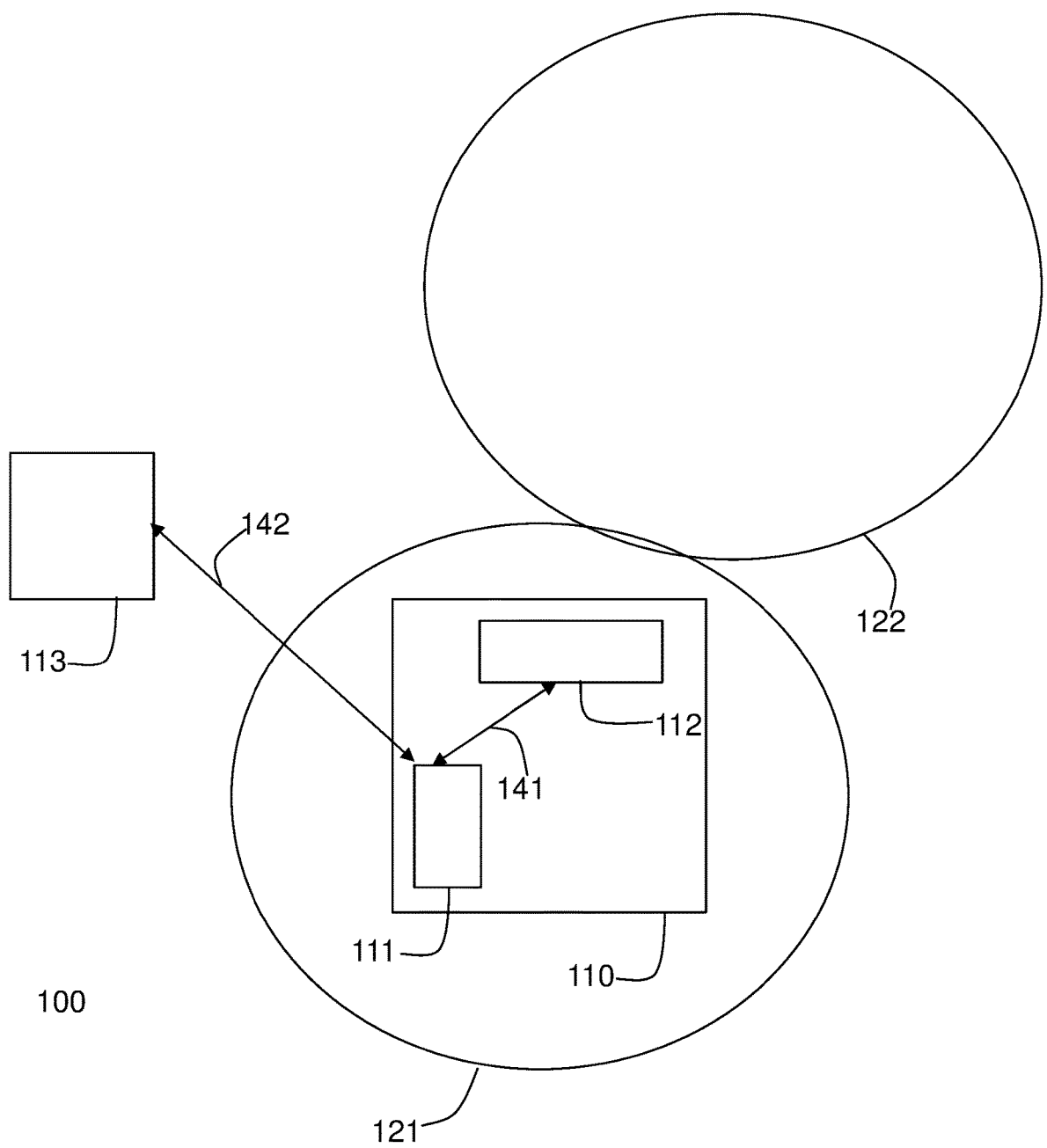
FIG. 7 is a schematic diagram illustrating a wireless communications network, according to embodiments herein.

FIG. 7 depicts a non-limiting example of a wireless communications network 100, sometimes also referred to as a wireless communications system, cellular radio system, or a cellular network, in which embodiments herein may be implemented. The wireless communications network 100 may typically be a 5G system, 5G network, NR-U or Next Gen System or network, Licensed-Assisted Access (LAA), or MulteFire. The wireless communications network 100 may support a younger system than a 5G system. The wireless communications network 100 may support other technologies, such as, for example Long-Term Evolution (LTE), LTE-Advanced/LTE-Advanced Pro, e.g. LTE Frequency Division Duplex (FDD), LTE Time Division Duplex (TDD), LTE Half-Duplex Frequency Division Duplex (HD-FDD), LTE operating in an unlicensed band, etc. . . . . Other examples of other technologies the wireless communications network 100 may support may be Wideband Code Division Multiple Access (WCDMA), Universal Terrestrial Radio Access (UTRA) TDD, Global System for Mobile telecommunications (GSM) network, GSM/Enhanced Data Rate for GSM Evolution (EDGE) Radio Access Network (GERAN) network, Ultra-Mobile Broadband (UMB), EDGE network, network comprising of any combination of Radio Access Technologies (RATs) such as e.g. Multi-Standard Radio (MSR) base stations, multi-RAT base stations etc., any 3rd Generation Partnership Project (3GPP) cellular network, WiFi networks, Worldwide Interoperability for Microwave Access (WiMax), NarrowBand Internet of Things (NB-IoT), or any cellular network or system. Thus, although terminology from 5G/NR and LTE may be used in this disclosure to exemplify embodiments herein, this should not be seen as limiting the scope of the embodiments herein to only the aforementioned systems.

The wireless communications network 100 may comprise a plurality of network nodes, whereof a network node 110, a first network node 111, a second network node 112 and a third network node 113 are depicted in the non-limiting example of FIG. 7.

Any, or both, of the first network node 111, and the second network node 112 may be co-localized, or be part of the network node 110, as depicted in panel in FIG. 7. The network node 110 may be, e.g., a radio network node or access node, such as a radio base station, or any other network node with similar features capable of serving a user equipment, such as a wireless device or a machine type communication device, in the wireless communications network 100. The first network node 111 may be a gNB-DU, or a network node with similar functionality. The second network node 112 may be a gNB-CU, or a network node with similar functionality. This particular example is depicted in the non-limiting example of FIG. 7.

The third network node 113 may be another network node, or a core network node. In some examples, the third network node 113 may be an Orchestration and Management (OAM) node, or OAM network node, or a node with similar functionality.

The wireless communications network 100 covers a geographical area which may be divided into cell areas, wherein each cell area may be served by a network node, although, one network node may serve one or several cells. In the non-limiting example of FIG. 7, the wireless communications network 100 comprises a first cell 121 and a second cell 122. As depicted in FIG. 7, the first cell 121 may be a served cell. The first cell 121 may be served by the network node 110, the first network node 111, and/or the second network node 112. The second cell 122 may be a neighbour cell to the first cell 121. In the context of this disclosure, that the second cell 122 may be a neighbour cell to the first cell 121 may be understood to mean that the second cell 122 may be a cell of a "neighbour DU". That is, a DU connected to a "neighbour CU" of the second network node 112, which may be understood to refer to a CU sharing an Xn interface with the second network node 112. In some particular examples, that the second cell 122 may be a neighbour cell to the first cell 121 may be understood to mean that the second cell 122 may be located in a physical proximity of the first cell 121. Any of the network node 110, the first network node 111, and the second network node 112 may be of different classes, such as, e.g., macro base station (BS), home BS or pico BS, based on transmission power and thereby also cell size. It may be understood that when co-localized, or being comprised in the same node, the network node 110, the first network node 111, and the second network node 112 may be of the same class. Any of the network node 110, the first network node 111 and the second network node 112 may be directly connected to one or more core networks, which are not depicted in FIG. 7 to simplify the Figure. In some examples, any of the network node 110, the first network node 111, and the second network node 112 may be a distributed node, such as a virtual node in the cloud, and it may perform its functions entirely on the cloud, or partially, in collaboration with a radio network node.

A plurality of wireless devices, such as a user equipment, may be located in the wireless communication network 100. The user equipment, e.g., a 5G UE, may be a wireless communication device which may also be known as e.g., a UE, a mobile terminal, wireless terminal and/or mobile station, a mobile telephone, cellular telephone, or laptop with wireless capability, just to mention some further examples. The user equipment may be, for example, portable, pocket-storable, hand-held, computer-comprised, or a vehicle-mounted mobile device, enabled to communicate voice and/or data, via the RAN, with another entity, such as a server, a laptop, a Personal Digital Assistant (PDA), or a tablet, Machine-to-Machine (M2M) device, device equipped with a wireless interface, such as a printer or a file storage device, modem, or any other radio network unit capable of communicating over a radio link in a communications system. The user equipment that may be comprised in the wireless communications network 100 may be understood to be enabled to communicate wirelessly in the wireless communications network 100. The communication may be performed e.g., via a RAN, and possibly the one or more core networks, which may be comprised within the wireless communications network 100.

The first network node 111 may be configured to communicate in the wireless communications network 100 with the second network node 112 over a first link 141, e.g., a wired link. The first network node 111 may be configured to communicate in the wireless communications network 100 with the third network node 113 over a second link 142, e.g., a wired link or a radio link.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In general, the usage of "first", "second", "third" and/or "fourth" herein may be understood to be an arbitrary way to denote different elements or entities, and may be understood to not confer a cumulative or chronological character to the nouns they modify, unless otherwise noted, based on context.

Several embodiments are comprised herein. It should be noted that the examples herein are not mutually exclusive. Components from one embodiment may be tacitly assumed to be present in another embodiment and it will be obvious to a person skilled in the art how those components may be used in the other exemplary embodiments.

More specifically, the following are embodiments related to a first network node, such as the first network node 111, e.g., a gNB-DU, and embodiments related to a second network node, such as the second network node 112, e.g., a gNB-CU.

Figure 8:
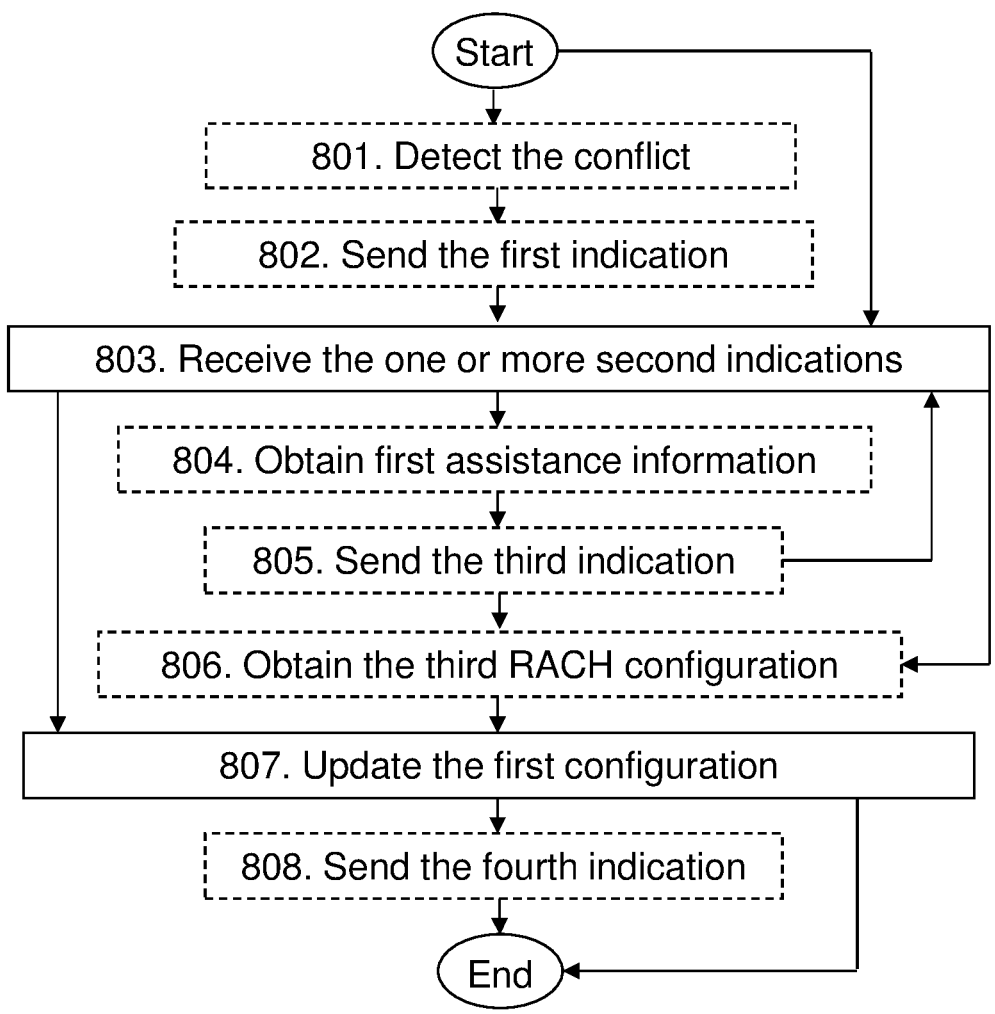
FIG. 8 is a flowchart depicting an example of a method in a first network node, according to embodiments herein.

Embodiments of a method, performed by the first network node 111, will now be described with reference to the flowchart depicted in FIG. 8. The method may be understood to be for handling a Random Access Channel (RACH) configuration conflict. The first network node 111 may operate in the wireless communications network 100 with a Radio Access Technology (RAT) with a split architecture, wherein the first network node 111 is a Distributed Unit (DU), and the second network node 112 is a Centralized Unit (CU).

Embodiments herein may be understood to disclose a method for detecting and resolving RACH configuration conflicts between neighbouring cells in a split RAN architecture wherein the first network node 111, e.g., a gNB-CU, may be connected to multiple distributed units such as the second network node 112, e.g., gNB-DUs, and each gNB-DU may serve/control one or more radio access cells. A RACH configuration conflict may occur either between two cells served by different DUs, e.g., gNB-DUs, connected to the same CU, e.g., gNB-CU, or between two radio cells served by different DUs, e.g., gNB-DUs, connected to different CUs, e.g., gNB-CUs.

In embodiments herein, the example case of an NR RAT may be considered. In such example, the architecture taken into consideration may be a split architecture where a gNB-CU may host high layers, such as RRC, and where the gNB-DU may host lower layers, such as PHY, MAC and RLC. The methods described herein may be applied to any RAT that follows the same split architecture. For example they may be applied to the E-UTRAN split architecture or to the E-UTRA split architecture.

Several embodiments are comprised herein. In some embodiments all the actions may be performed. In some embodiments, one or more actions may be performed. It should be noted that the examples herein are not mutually exclusive. One or more embodiments may be combined, where applicable. All possible combinations are not described to simplify the description. Components from one embodiment may be tacitly assumed to be present in another embodiment and it will be obvious to a person skilled in the art how those components may be used in the other exemplary embodiments. A non-limiting example of the method performed by the first network node 111 is depicted in FIG. 8. Some actions may be performed in a different order than that shown in FIG. 8. Some of the actions may be performed more than once, e.g., iteratively.

Action 801

A RACH configuration for an NG RAN cell may consist of a set of time-frequency resources as well as set of RACH preambles that may be generated starting from a specific root sequence. Ideally, neighbouring cells may need to be allocated with orthogonal RACH resources, with orthogonality realized in time, frequency or code domain, or a combination thereof. However, due to the limited time-frequency resources and root sequences, not all the available RACH configurations may be orthogonal but may in fact share some resources, e.g., in time and/or frequency, or the same RACH configuration may be reused in different cells.

While it may be possible to configure different cells either with the same RACH configuration or with not fully orthogonal RACH configurations, this may need to be avoided in the case of neighbouring cells as it may lead to failure or delay of the UE random access procedure. Hereafter, this case is referred to as a RACH configuration conflict.

In this Action 801, the first network node 111 detects, or determines an existence of, a conflict. The conflict is between a first RACH configuration in the first cell 121, the first cell 121 being a served cell by the first network node 111, and a second RACH configuration in the second cell 122. The second cell 122 is a neighbour cell to the first cell 121. That is, in a particular example, this Action 801 may be understood to be drawn to detecting a RACH configuration conflict, at the gNB-DU, between the RACH configuration of the served cell and the RACH configuration of the neighbouring cell.

Determining may be understood as calculating, or deriving.

In some examples, the conflict may be between a RACH configuration associated to a first Synchronization Signal Block (SSB) beam of the first cell 121, and another RACH configuration associated to a second SSB beam of the second cell 122.

In one example of embodiments herein, the first network node 111 may detect a potential RACH configuration conflict between the first cell 121 and the second cell 122 based on statistic information associated to failed random access attempts of user devices, such as the user equipment described earlier, to the first cell 121. In one implementation, a random access attempt of a user device may be declared failed if the a RACH msg-1 transmitted by the user device is received by the first network node 111 according to the RACH configuration of the first cell 121, a RACH msg-2 is transmitted by the first network node 111 to the user device to grant uplink resources to the user device for transmitting a RACH msg-3 according to the RACH configuration of the served cell, but the RACH msg-3 transmitted by the user device is not received by the first network node 111 in the reserved resources.

The first network node 111 may, for instance, collect statistics associated to the number of failed RACH attempts, the frequency of the failed RACH attempts, the RACH resources wherein the RACH msg-1 is received from a user device during a failed RACH attempt, such as RACH preamble used, time-frequency location of the RACH msg-1 transmission, etc.

The first network node 111 may then determine a RACH configuration conflict if, for instance, the number of failed RACH attempts exceeds a predefined threshold. In an alternative implementation, the first network node 111 may determine a RACH configuration conflict if the number of failed RACH attempts within a part of the RACH resources used by the served cell exceeds a predefined threshold.

By detecting the conflict between the first RACH configuration and the second RACH configuration in this Action 801, the first network node 111 may then be enabled to take action in order to ultimately resolve it. One of those actions may be Action 802, described next.

Action 802

In this Action 802, the first network node 111 may send a first indication to the second network node 112 operating in the wireless communications network 100. The first indication is based on the detected, or determined, conflict.

Sending may be understood as transmitting, or providing, e.g., via the first link 141. This Action 802 may be performed upon detecting a RACH configuration conflict for the first cell 121.

The first indication may comprise one or more of: i) an indication of the detected conflict for the served cell, e.g., a potential RACH configuration conflict detected for a served cell, ii) an identifier of the served cell for which the conflict has been detected, e.g., the potential RACH configuration conflict, iii) a request for the second network node 112 to verify, or confirm, the conflict detected by the first network node 111 for the served cell, and iv) a request to the second network node 112 for RACH assistance information for the detected conflict for the served cell.

In one example of embodiments herein wherein the first network node 111 may be a gNB-DU, the first indication may be, for example, a gNB-DU RACH Configuration Conflict message transmitted to a gNB-CU.

According to option i), the first indication may be a flag indicating of a possible RACH configuration conflict detected for the served cell.

According to option i) or ii), for example, once the first network node 111 may determine that the RACH configuration conflict has occurred, the first network node 111 may issue an indication to the second network node 112, highlighting the cell for which the conflict is suspected, that is the first cell 121.

In other embodiments, according to option iii), the first indication may indicate that the second network node 112 may need to verify that the cells indicated by the first network node 111 are subject to RACH configuration conflict.

In other embodiments, according to option iv), the first indication may additionally indicate the request for assistance information associated to the detected, or determined, conflict to assist the first network node 111 to resolve the detected conflict for the served cell. For example, in this Action 802, the first network node 111 may transmit a gNB-DU Assistance Information message or a DU RACH conflict information message to the second network node 112 with a request for CU assistance information. The first network node 111 may further explicitly request information associated to the RACH configuration of at least one cell creating the RACH configuration conflict with the served cell and/or the RACH configuration of neighbouring cells to the served cell.

By sending the first indication in this Action 802, the first network node 111 may then enable the conflict to be resolved, either by resolving it itself, e.g., by later using assistance information requested from the second network node 112, or by later assisting the second network node 112 to resolve it. This may be understood to be because while the first network node 111 may be able to detect the conflict, it may not know the configuration of RACH resourced of neighbouring cells, which may be known by the second network node 112. Detection of any conflict with another cell without having the actual configuration of the RACH resources between conflicting cells, the first network node 111 may not be able to resolve the conflict RACH configuration conflict properly. By performing this Action 802, the first network node 111 may be enabled to flag the conflict for the second network node 112 in order to corroborate the existence of the conflict. Upon detecting that the conflict between the RACH configuration of any serving cell, or SSB beam, of the second network node 112 and the RACH resources used by a cell, or SSB beam, e.g., of a neighbouring DU, may exist, the first network node 111 may transmit the first indication to the second network node 112. In one exemplifying case, the first indication may comprise a request for assistance information for the second network node 112. The second network node 112 may then be enabled to determine whether the RACH configuration conflict exists for the serving cell, that is, the first cell 121, or SSB beams of the serving cell, indicated by the first network node 111.

Action 803

In this Action 803, the first network node 111 receives one or more indications from the second network node 112 operating in the wireless communications network 100. The one or more indications may be understood to be, or be referred to as, one or more second indications. The one or more second indications comprise at least one of: i) a positive acknowledgement (ACK) or a negative acknowledgement (NACK) of the RACH configuration conflict detected between the first RACH configuration in the first cell 121, the first cell 121 being the served cell by the first network node 111, and the second RACH configuration in the second cell 122, the second cell 122 being a neighbour cell to the first cell 121, ii) CU RACH assistance information associated to the RACH conflict, the CU RACH assistance information comprising the second RACH configuration, and iii) a first third RACH configuration for the first cell 121.

A third RACH configuration may be understood herein as a different RACH configuration than the first RACH configuration. The first third RACH configuration may be understood as a first instance of the third RACH configuration, for example a third RACH configuration as it may be calculated or derived by the second network node 112, or as recommended to or by the second network node 112. For example one of the one or more second indications may be a gNB-CU Configuration Update message associated to the reported RACH configuration conflict, received from the second network node 112.

Assistance information may be understood as information associated to the detected conflict that may assist the first network node 111 to resolve the detected conflict for the served cell.

In a particular example, one of the one or more second indications may be a CU RACH assistance info message from the gNB-CU, e.g., a gNB-CU Assistance Information message.

The receiving may be performed, e.g., via the first link 141.

In some embodiments, the CU RACH assistance information may comprise at least one of: i) a set of second RACH configurations of neighbouring cells to the first cell 121 served by the first network node 111 causing the RACH conflict, ii) another set of RACH configurations of neighbouring cells to the first cell 121 served by the first network node 111 for which the RACH conflict has been detected, wherein the another set of RACH configurations are not causing the RACH conflict and are to be avoided when resolving the RACH conflict for the served cell, and iii) a range of values for one or more RACH resources that may be available to be used by the first network node 111 to resolve the RACH conflict for the served cell 121.

In one particular example of the method wherein the first network node 111 may be a gNB-DU, and the second network node 112 may be a gNB-CU, the gNB-CU Assistance Information message received by the gNB-DU from a gNB-CU may comprise one or more information elements in the group of: a) a positive acknowledgement (ACK) or a negative acknowledgment (NACK) of a RACH configuration conflict detected by the gNB-CU for a served cell, and b) CU RACH assistance information associated to the detected RACH conflict. In particular, the CU RACH assistance information may comprise one or more information elements in the group of: i) the RACH configuration of the neighbouring cell causing the RACH configuration conflict with the cell served by the gNB-DU, ii) the RACH configuration of neighbouring cells to the cell served by the gNB-DU for which a RACH conflict has been detected; this may be understood to provide the gNB-DU, information about RACH resources that, despite not causing a RACH conflict with the served cell, may need to be avoided when resolving the RACH conflict for the served cell, for example, when determining a new RACH configuration for the served cell, and iii) a range of values for one or more RACH resources that may be used by the gNB-DU to resolve the RACH conflict for the served cell.

Therefore, in two possible implementation of the embodiment, the gNB-CU Assistance Information message may include assistance information, such as: a) information related to RACH configuration of neighbouring cells that may create the RACH configuration conflict, and information related to RACH configuration of other neighbouring cells that may need to be avoided, and b) a range of parameters for the RACH configuration that the first network node 111 may use to resolve the RACH configuration conflict.

Option a) may be understood to ensure that the first network node 111 may have enough information to change the RACH configuration and avoid any RACH configuration conflict with neighbouring cells. Namely, the RACH configurations provided to the first network node 111 may be for cells in the neighbourhood of the cell subject to RACH configuration conflict, hence a change of RACH configuration may need to not overlap such cells in the neighbourhood.

Option b) may be understood to shift some of the RACH optimization at the second network node 112. In this option, the first network node 111 may be limited to choose among a subset of RACH configurations where such subset may be determined by the range of RACH configuration parameters the second network node 112 may signal to the first network node 111.

In some embodiments, the one or more second indications may be based on the sent first indication. For example, the first network node 111 may, in this action 803, receive a gNB-CU Assistance Information message in response to a gNB-DU RACH Configuration Conflict message that the first network node 111 may have sent in Action 802.

Different combination of information elements within the gNB-DU RACH Configuration Conflict message may result in different type of assistance information being provided by the second network node 112 to the first network node 111 within the gNB-CU Assistance Information message, hence in different possible implementations of the method.

By receiving the one or more indications in this Action 803, the first network node 111 may then enable the conflict to be resolved, either by resolving it itself, e.g., in Actions 804 and 805, or by having assisted the second network node 112 to resolve it.

Action 804

In this Action 804, the first network node 111 may obtain first assistance information based on the determined conflict.

Obtaining may be understood as determining, calculating, deriving, retrieving, e.g., from an internal memory, or receiving, e.g., via the first link 141. For example, in this Action 804, the first network node 111 may determine DU RACH assistance information associated to the RACH configuration conflict.

The first assistance information may be understood as assistance information derived by the first network node 111. The first assistance information may be understood to be assistance information associated to the detected RACH conflict.

In one example of embodiments herein, the first network node 111 may further determine DU RACH assistance information which may comprise one or more information elements in the group of: a set of one or more RACH configurations, e.g., preferred RACH configurations, that may be configured for the served cell, a range of values, e.g., preferred range of values, for a set of RACH configuration parameters, and a set of DU RACH requirements for the optimization of the RACH configuration of the served cell.

In one case, the first network node 111 may determine, in this Action 804, one or more, e.g., preferred, RACH configurations that the second network node 112 may use to optimize the RACH configuration of the served cell experiencing a RACH configuration conflict. In another example, the first network node 111 may determine a, e.g., preferred, range of values for a set of RACH configuration parameters that the second network node 112 may use to optimize the RACH configuration of the served cell experiencing a RACH configuration conflict.

In yet another case, the first network node 111 may determine a set of DU RACH requirements for the optimization of the RACH configuration of the served cell. For example, a minimum and a maximum amount of RACH time/frequency resources.

In yet other examples, as part of the negotiation mechanism mentioned in Action 803 with respect to Option b), the first network node 111 may assist the second network node 112 with information associated to the user plane requirements for the first cell 121. For example, the first network node 111 may specify to the second network node 112 the minimum or maximum amount of RACH resources that may be used for its configuration. In an alternative, the first network node 111 may suggest a list of preferred RACH configurations to the second network node 112, which in turn may choose one that does not create any RACH conflict with neighbouring cells and later signal it back to the first network node 111 based, for instance, on the RACH configuration information received by neighbouring gNB-CUs.

As part of this option, the second network node 112 may have determined a single RACH configuration and signaled it to the first network node 111. In this case, the first network node 111 may not be able to adopt the suggested RACH configuration suggested by the second network node 112, or indeed the range of RACH parameters suggested. Such rejection of the suggested configuration, or configuration parameters, may be due to a number of reasons. As an example, it may be up to the first network node 111 implementation how much RACH resource allocation may be needed to ensure correct detection of RACH access: a too narrow resource allocation may not be suitable for the first network node 111 implementation, while a too large resource allocation may result in waste of resources. As a different example, resource partitioning policies at the first network node 111, such as those in place for each network slice supported by the first network node 111, may pose limitations on the amount of User Plane (UP) resources employed as RACH resources. A rejection of a RACH configuration suggested by the second network node 112 may derive into a negotiation between first network node 111 and second network node 112 about the best RACH configuration to adopt. This is yet another procedure that may be added to the solution.

In yet another alternative example, the first network node 111 may fail the procedure by which the second network node 112 may have proposed a new RACH configuration for the cell in conflict, e.g., by indicating it in one of the one or more second indications. The first network node 111 may obtain according to this Action 804, a range of assistance information indicating RACH configuration parameters that may be acceptable for the first network node 111, for example a minimum and a maximum amount of RACH time/frequency resources.

By obtaining the first assistance information in this Action 804, the first network node 111 may then be enabled to provide the obtained first assistance information to the second network node 112, and thereby help the second network node 112 to resolve the detected conflict, or assist the second network node 112 to determine assistance information that may then enable the first network node 111 to resolve the conflict.

Action 805

In this Action 805, the first network node 111 may send a third indication to the second network node 112. The third indication may be based on the obtained first assistance information. That is, the third indication may indicate the obtained first assistance information. For example, in examples wherein the first network node 111 may fail the procedure by which the second network node 112 may have proposed a new RACH configuration for the cell in conflict, the first network node 111 may, in the third indication, provide a failure indication, and additionally with such failure indication, a range of assistance information indicating RACH configuration parameters that may be acceptable for the first network node 111, for example a minimum and a maximum amount of RACH time/frequency resources.

At least one of the received one or more second indications may be based on the sent third indication. That at least one of the received one or more second indications may be based on the sent third indication may typically be because the first network node 111 may receive a plurality of second indications, which may be received at different times. Therefore, one of the additional second indications may be received based on the sent third indication. Nevertheless, as explained earlier, the usage of "second" and "third" does not by itself convey a chronological order, wherein second precedes third. Accordingly, in some examples wherein only one second indication may be received, it may also be based on the sent third indication, indicating the obtained first assistance information.

The sending in this Action 805 may be implemented via the first link 141.

The third indication may be, for example, a gNB DU Assistance information message. Therefore, in a particular example of this Action 805, the first network node 111 may transmit, to the second network node 112, a gNB-DU Assistance Information message comprising at least the DU RACH assistance information.

In one example of embodiments herein, this Action 805 may be performed upon receiving a gNB-CU Assistance Information message from the second network node 112. In this case, the gNB-CU Assistance Information message may comprise either just and acknowledgment of the RACH configuration conflict reported by the first network node 111, or an explicit request for DU RACH assistance information. In the former case, the first network node 111 may proactively provide DU RACH assistance information to the second network node 112 in this Action 805, thereby avoiding additional signaling exchange between the two network nodes.

By sending the third indication in this Action 805, the first network node 111 may enable the second network node 112 to obtain the first assistance information, and thereby help it to resolve the detected conflict, or to provide additional second indications to the first network node 111 so it may itself resolve the conflict.

Action 806

In some embodiments, the first network node 111 may resolve the RACH configuration conflict detected for the served cell by determining a new RACH configuration for the served cell, which may be referred to herein as a second third RACH configuration. The new RACH configuration may comprise, for instance, RACH resources that may be orthogonal to the RACH resources of the pre-existing RACH configuration used by the served cell in time domain, frequency domain, code domain or a combination thereof. This may need to ensure that the RACH conflict with the neighbouring cell may be resolved.

In this Action 806, the first network node 111 may obtain the second third RACH configuration, a that is, it may determine a new RACH configuration for the served cell, based on the received one or more indications, that is, the one or more second indications.

As stated earlier, obtaining may be understood as determining, calculating, deriving, retrieving, or receiving, e.g., via the first link 141.

The second third RACH configuration may be understood as a second instance of the third RACH configuration, for example a third RACH configuration, as it may be calculated or derived by the first network node 111. The second third RACH configuration may be the same as the first third RACH configuration. In other examples, the second third RACH configuration may be different than the first third RACH configuration.

That the first network node 111 may obtain the second third RACH configuration based on the received one or more indications may be understood to mean, for example, that the first network node 111 may further resolve the detected RACH configuration conflict for the served cell, e.g., based on the content of the gNB-CU Assistance Information message. In some examples, one of the second indications may indicate the third RACH configuration as determined by the first network node 111. In other words, the obtained second RACH configuration may be the same as the first third RACH configuration indicated by the second network node 112.

In some of such examples, this Action 806 may comprise the first network node 111 determining whether the RACH configuration indicated by the second network node 112 fulfils the requirements of the first network node 111.

In one possible implementation of the method, one of the one or more second indications may be a gNB-CU Configuration Update message comprising a new RACH configuration for the served cell experiencing a RACH configuration conflict. The first network node 111 may then, in this Action 806, determine to accept the RACH configuration indicated by the second network node 112.

In an alternative implementation of the method, the first network node 111 may instead determine to reject the RACH configuration indicated by the second network node 112. For example, if the first RACH configuration indicated by the second network node 112 does not fulfil the first network node 111 requirements, the first network node 111 may determine, in this Action 806, a new RACH configuration for the served cell based on the first network node 111 requirements.

Indeed, a negotiation mechanism may be needed between the second network node 112 and the first network node 111, so that the first network node 111 may, for instance, reject a RACH configuration suggested by the second network node 112 if this is not feasible in light of first network node 111 implementation and policies.

In one example, the first network node 111 may have transmitted, in Action 802, a gNB-DU RACH Configuration Conflict message to the second network node 112, indicating the potential RACH configuration conflict for the served cell and an identifier of the served cell. No assistance information may be requested by the first network node 111 to resolve the potential RACH configuration conflict detected for the served cell. In this case, the second network node 112 may verify whether the reported RACH configuration conflict may exist for the served cell, and respond with a CU-RACH assistance information message comprising either a positive acknowledgement (ACK) or a negative acknowledgment (NACK) of the RACH configuration conflict detected by the first network node 111 for the served cell. In case of a positive ACK, the first network node 111 may proceed resolving the RACH configuration conflict without any further assistance information from the second network node 112 according to other embodiments of the method.

In another example, the first network node 111 may have transmitted a gNB-DU RACH Configuration Conflict message to the second network node 112 indicating a request of CU RACH assistance information for the served cell, whose identifier may further be included in the gNB-DU RACH Configuration Conflict message. In this case, the first network node 111 may implicitly indicate to the second network node 112 a potential RACH configuration conflict for the served cell.

The gNB-CU Assistance Information message that may have been received from the second network node 112 in Action 803 may have comprised either a positive acknowledgement (ACK) or a negative acknowledgment (NACK) of the RACH configuration conflict detected by the first network node 111, so that to allow the first network node 111 to resolve the RACH conflict without any further assistance information in some examples of this Action 806. In an alternative, or in addition, the gNB-CU Assistance Information message that may have been received from the second network node 112 may have comprised CU RACH assistance information associated to the detected RACH conflict which the first network node 111 may use to resolve the RACH configuration conflict in other examples of this Action 806.

In one example, the second network node 112 may have informed the first network node 111 about the RACH configuration of the neighbouring cell causing the RACH conflict with the cell served by the first network node 111 in Action 801. This may allow the first network node 111 to resolve the RACH conflict detected for the served cell, that is, to determine a new RACH configuration, e.g., a set of RACH resources in time, frequency and code domain, which may be orthogonal to the RACH configuration of the neighbouring cell that cases the conflict. In addition, to avoid that the new RACH configuration causes a new RACH configuration conflict with another neighbouring cell, the CU RACH assistance information may further comprise an indication of the RACH configurations of relevant neighbouring cells which the first network node 111 may need to avoid when resolving the RACH configuration conflict.

In an alternative example, the CU RACH assistance information may comprise a range of values for one or more RACH parameters/resources that the first network node 111 may use to resolve the RACH conflict for the served cell such as a range of time frequency resources the first network node 111 may choose from for the RACH configuration, or a range of Root Sequence values the first network node 111 may choose from for the RACH configuration.

This may be understood to have the benefit of limiting the signaling overhead of the gNB-CU Assistance Information message, while still providing the first network node 111 sufficient information to resolve the RACH configuration conflict.

By obtaining the first third RACH configuration in this Action 806, the first network node 111 may be enabled to change and/or update the first RACH configuration in order to resolve the detected conflict.

Action 807

In this Action 807, the first network node 111 updates, or changes, the first RACH configuration to the second third RACH configuration, based on the detected conflict. In other words, in this Action 807, the first network node 111 may change the RACH configuration for the served cell based on the detection of the RACH configuration conflict, to the new RACH configuration.

The second third RACH configuration is obtained based on the received one or more indications. As explained earlier, in one example of embodiments herein, the first network node 111 may receive a CU RACH assistance info message from the second network node 112 comprising the first third RACH configuration, that is, a RACH configuration for the served cell for which the first network node 111 may have reported the RACH configuration conflict within the gNB-DU RACH Configuration Conflict message. The first network node 111 may then, in this Action 807, update the RACH configuration of the served cell with the RACH configuration indicated by the second network node 112 within the CU RACH assistance info message, or within an CU RACH configuration update message.

If the RACH configuration indicated by the second network node 112 does not fulfil the gNB-DU requirements, the first network node 111 may first determine, in Action 806, a new RACH configuration for the served cell based on the requirements of the first network node 111, and in this Action 807, may then update the RACH configuration of the served cell according to the new RACH configuration that may fulfil the requirements of the first network node 111.

By updating the first configuration in this Action 807, the first network node 111 may to resolve the detected conflict.

Action 808

In this Action 808, the first network node 111 may send a fourth indication to at least one of a second network node 112 operating in the wireless communications network 100 and a third network node 113 operating in the wireless communications network 100. The fourth indication may be based on the obtained second third RACH configuration, and/or on the first RACH configuration as updated, or changed, to the second third RACH configuration by the first network node 111.

Sending in this Action 808 may be performed, e.g., via the first link 141 and/or via the second link 142.

That the fourth indication may be based on the obtained second third RACH configuration may be understood to mean that the fourth indication may indicate the obtained second third RACH configuration. The fourth indication may be, for example, a gNB-DU RACH Configuration Conflict message, or an equivalent message, comprising comprising the new RACH configuration and the identity of the served cell configured with the new RACH configuration.

In another example, the fourth indication may be, for example, a gNB-DU Configuration Update message.

In an example, the first network node 111 may transmit a gNB-DU Configuration Update message to at least the second network node 112, e.g., the gNB-CU, comprising the new RACH configuration and the identity of the served cell configured with the new RACH configuration. The first network node 111 may further transmit a gNB-DU Configuration Update message to an Orchestration and Management (OAM) node. It may be understood by the skilled person that the gNB-DU Configuration Update message may be transmitted to the second network node 112 and the third network node 113 in a different order.

In another example, the first network node 111 may further transmit a gNB-DU Configuration Update message to the second network node 112, and/or an equivalent message to the third network node 113, to acknowledge the updated RACH configuration for the served cell according to previous embodiments.

That the fourth indication may be based on the on the first RACH configuration as updated to the second third RACH configuration may be understood to mean that the fourth indication may indicate the that the first RACH configuration has been updated.

In some examples, the method may have the advantage of enabling an efficient detection of a RACH configuration conflict at the first network node 111 and resolving such conflict without any assistance from another network node.

However, if, after sending the fourth indication in this Action 808, the RACH configuration selected by the first network node 111 in Action 807 is still subject to a RACH configuration conflict, detected by the second network node 112, the second network node 112 may fail the procedure with which the first network node 111 may be trying to update its cell RACH configuration with an opportune cause value indicating that the configuration generates RACH configuration conflict. The first network node 111 may therefore select yet another configuration, e.g., by repeating Action 806 and Action 807, until the conflict may be resolved.

By sending the fourth indication in this Action 808, the first network node 111 may be enabled to either provide a confirmation that the first network node 111 has changed or updated its first RACH configuration to the second third RACH configuration. The first network node 111, if the second network node 112 fails the update, may additionally obtain a recommendation or an instruction from the second network node 112 to update and/or change the first RACH configuration of the first network node 111 to the another first third RACH configuration in order to resolve the detected conflict.

Examples of these actions and the indications are provided later in this document.

Figure 9:
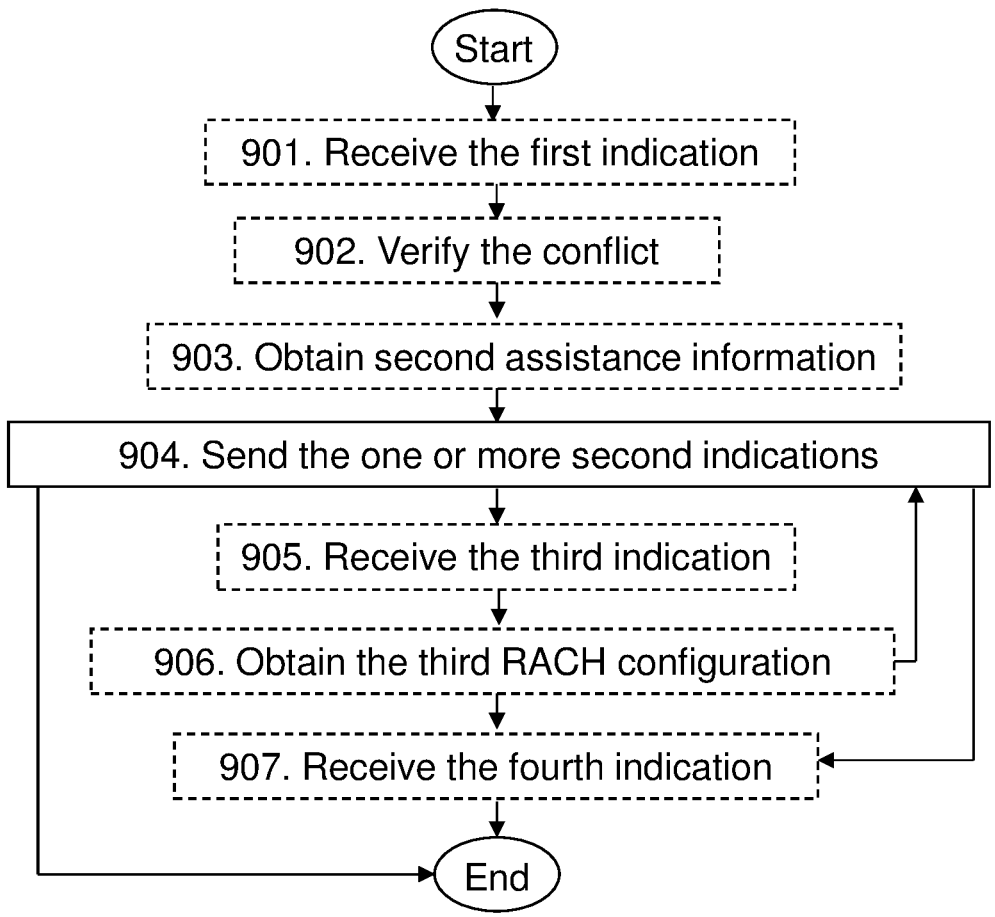
FIG. 9 is a flowchart depicting an example of a method in a second network node, according to embodiments herein.

Embodiments of a method performed by the second network node 112, will now be described with reference to the flowchart depicted in FIG. 9. The method may be understood to be for handling a RACH configuration conflict. The second network node 112 operates in the wireless communications network 100 with a RAT with a split architecture, wherein the second network node 112 is a CU, and the first network node 111 is a DU.

In embodiments herein, the example case of an NR RAT may be considered. In such example, the architecture taken into consideration may be a split architecture where a gNB-CU may host high layers, such as RRC, and where the gNB-DU may host lower layers, such as PHY, MAC and RLC. The methods described herein may be applied to any RAT that follows the same split architecture. For example, they may be applied to the E-UTRAN split architecture or to the E-UTRA split architecture.

Several embodiments are comprised herein. In some embodiments all the actions may be performed. In some embodiments, one or more actions may be performed. It should be noted that the examples herein are not mutually exclusive. One or more embodiments may be combined, where applicable. All possible combinations are not described to simplify the description. Components from one embodiment may be tacitly assumed to be present in another embodiment and it will be obvious to a person skilled in the art how those components may be used in the other exemplary embodiments. A non-limiting example of the method performed by the second network node 112 is depicted in FIG. 9. Some actions may be performed in a different order than that shown in FIG. 9. Some of the actions may be performed more than once, e.g., iteratively.

The detailed description of some of the following corresponds to the same references provided above, in relation to the actions described for the first network node 111, and will thus not be repeated here to simplify the description. For example, in some embodiments, the second network node 112 may be a gNB-CU.

In some embodiments, the first network node 111 may be a gNB-DU.

In some embodiments, the first network node 111 may be a gNB-DU and the second network node 112 may be a gNB-CU.

Action 901

In this Action 901 the second network node 112 receives the first indication from the first network node 111 operating in the wireless communications network 100. As stated earlier, the first indication is based on the conflict between the first RACH configuration, and the second RACH configuration.

The first indication may be based on the conflict between the first RACH configuration in the first cell 121, the first cell 121 being a served cell, and the second RACH configuration in the second cell 122, the second cell 122 being a neighbour cell to the first cell 121.

Receiving may be performed, e.g., via the first link 141.

The first indication may comprise one or more of: i) the indication of the detected conflict for the served cell, e.g., a potential RACH configuration conflict detected for a served cell, ii) the identifier of the served cell for which the conflict has been detected, e.g., the potential RACH configuration conflict, iii) the request for the second network node 112 to verify, or confirm, the conflict detected by the first network node 111 for the served cell, and iv) the request to the second network node 112 for RACH assistance information for the conflict detected by the first network node 111 for the served cell.

In a particular example of this Action 901, the second network node 112 may receive the gNB-DU RACH Configuration Conflict message from the first network node 111 associated to the RACH configuration conflict detected by the first network node 111 for the served cell.

The conflict may be between the RACH configuration associated to the first SSB beam of the first cell 121 and the another RACH configuration associated to the second SSB beam of the second cell 122.

Action 902

In this Action 902, the second network node 112 verifies the existence of the conflict based on the received first indication.

The second network node 112 may verify that the cell is in RACH configuration conflict by comparing the RACH configuration of the first cell 121 with those of all cells in the cell neighbourhood, where a gNB-CU may have previously received RACH configuration information of all cells in such neighbourhood, and where the second network node 112 may be able to determine cells in the neighbourhood thanks to UE cell measurement reports, e.g., UE RRM measurement reports, and pre-configuration of neighbour relations between cells. The UE RRM measurement reports, e.g., reported by RRC_Connected mode UEs, may be based, for instance, on Reference Signal Received Power (RSRP) measurements of neighbouring cells monitored by the UE.

In a particular example of this Action 902, upon receiving a gNB-DU RACH Configuration Conflict message from the first network node 111 associated to the served cell, the second network node 112 may first verify the existence of the RACH configuration conflict for the served cell indicated within the gNB-DU RACH Configuration Conflict message, then determine CU RACH assistance information in the next Action 903.

It may be noted that the first network node 111 may receive information associated to the RACH configuration of cells served by gNB-DUs, such as the second network node 112, with which it has a connection. In the 3GPP NR, this may be done by exchanging information from the first network node 111 to the second network node 112 over the F1 interface. This information may comprise the full RACH configuration of the served cells, or a limited set of RACH resources allocated to the served cells according to the corresponding RACH configuration. The second network node 112 may additionally receive information associated to the RACH configuration of cells served by neighbouring gNB-CUs with which the first network node 111 may have a connection, e.g., via an Xn or X2 interface.

Therefore, in one example, the second network node 112 may verify the existence of the RACH conflict indicated by the first network node 111 within the received gNB-DU RACH Configuration Conflict message by comparing the RACH configuration of the served cell indicated by the first network node 111 with the RACH configuration of neighbouring cells, such as other cells served by the second network node 112, e.g., served by the first network node 111 controlled by the second network node 112, or cells served by other gNB-CUs.

The second network node 112 may then acknowledge the RACH conflagration conflict for the served cell that may be indicated by the first network node 111, if the served cell is either configured with the same RACH resources of a neighbouring cell, or it is configured with RACH resources that overlap, at least in part, in a non-orthogonal manner with RACH resources configured for a neighbouring cell such as the second cell 122. Otherwise, the second network node 112 may determine a negative acknowledgment (NACK), indicating that the RACH configuration conflict reported by the first network node 111 does not exist.

Action 903

In this Action 903, the second network node 112 may obtain the second assistance information based on the received first indication. For example, may comprise the second network node 112 determining CU RACH assistance information based on the received gNB-DU RACH Configuration Conflict message.

Obtaining may be understood as determining, calculating, deriving, retrieving, or receiving, e.g., via the first link 141.

The second assistance information may be, e.g., gNB-CU Assistance information. In one example, based on the RACH conflict verification, the second network node 112 may determine the positive acknowledgement (ACK) or the negative acknowledgment (NACK) for the RACH configuration conflict for the served cell indicated within the received gNB-DU RACH Configuration Conflict message.

Therefore, in one example of embodiments herein, the second network node 112 may configure and transmit a gNB-CU Assistance Information message comprising or more information elements in the group of: a) the positive acknowledgement (ACK) or the negative acknowledgment (NACK) of the RACH configuration conflict detected by the second network node 112 for the served cell, b) CU RACH assistance information associated to the detected RACH conflict, comprising one or more in the group of: i) the RACH configuration of the neighbouring cell causing the RACH conflict with the cell served by the first network node 111, and ii) the RACH configuration of neighbouring cells to the cell served by the first network node 111 for which the RACH conflict has been detected; this may be understood to provide the first network node 111 information about RACH resources that, despite not causing the RACH conflict with the served cell, may need to be avoided when resolving the RACH conflict for the served cell, that is, when determining a new RACH configuration for the served cell.

When the second network node 112 may acknowledge the existence of the RACH configuration conflict reported by the first network node 111, the second network node 112 may also provide the first network node 111 with assistance information to resolve the conflict. In particular, the second network node 112 may indicate to the first network node 111 the RACH configuration of the neighbouring cell that may be causing the RACH conflict with the cell served by the first network node 111. This may allow the first network node 111 to resolve the RACH configuration conflict. In addition, the second network node 112 may indicate to the first network node 111 the set of RACH configurations of neighbouring cells whose resources may need to be avoided when resolving the RACH conflict.

The second network node 112 may determine a set of relevant neighbouring cells whose RACH configuration may need to be avoided when resolving the existing RACH configuration conflict based on RRM measurement reports for connected UEs. Such reports may be used to determine information associated to the neighbourhood of the served cell affected by the RACH configuration conflict.

In one example of embodiments herein, upon receiving a gNB-DU RACH Configuration Conflict message from the second network node 112 indicating the RACH configuration conflict for the served cell, the second network node 112 may further: a) determine the range of values for one or more RACH resources that may be used by the first network node 111 to resolve the RACH conflict for the served cell, and b) transmit, in an example of the next Action 904, a CU RACH assistance info message to the first network node 111 comprising the range of values for the one or more RACH resources that may be used by the first network node 111 to resolve the RACH conflict for the served cell.

To this end, the second network node 112 may compare the RACH configuration of the served cell indicated by the first network node 111 with the RACH configuration of the cell causing the RACH configuration conflict and/or with the RACH configuration of neighbouring cells that may need to be avoided by the first network node 111 when updating the RACH configuration of the served cell.

Action 904

In this Action 904, the second network node 112 sends the one or more indications to the first network node 111 operating in the wireless communications network 100. The one or more indications may be understood to be, or be referred to as, the one or more second indications. The one or more second indications comprise at least one of: i) the positive acknowledgement (ACK) or the negative acknowledgement (NACK) of the RACH configuration conflict between the first RACH configuration in the first cell 121, the first cell 121 being the served cell by the first network node 111, and the second RACH configuration in the second cell 122, the second cell 122 being a neighbour cell to the first cell 121, ii) the CU RACH assistance information associated to the RACH conflict, the CU RACH assistance information comprising the second RACH configuration, and iii) the first third RACH configuration for the first cell 121.

In some embodiments, the CU RACH assistance information may comprise at least one of: i) the set of second RACH configurations of neighbouring cells to the first cell 121 served by the first network node 111 causing the RACH conflict, ii) the another set of RACH configurations of neighbouring cells to the first cell 121 served by the first network node 111 for which the RACH conflict has been detected, wherein the another set of RACH configurations are not causing the RACH conflict and are to be avoided when resolving the RACH conflict for the served cell, and iii) the range of values for one or more RACH resources that may be available to be used by the first network node 111 to resolve the RACH conflict for the served cell 121.

Sending may be understood as transmitting, or providing, e.g., via the first link 141.

The one or more second indications may be based on the received first indication. For example, upon verifying the existence of the RACH configuration conflict reported by the first network node 111, the second network node 112 may transmit a gNB-CU Assistance Information message to the first network node 111 comprising one or both of: an acknowledgement of the RACH configuration conflict reported by the first network node 111, and/or a request for DU RACH assistance information. In both cases, the first network node 111 may then respond providing a DU RACH assistance info message, which may be received in Action 905.

In some embodiments, at least one of the sent one or more second indications may be based on a result of the verification.

In some embodiments, at least one of the sent one or more second indications may be based on the obtained second assistance information.

In an example of embodiments herein, the second network node 112 may, in this Action 904, transmit a gNB-CU Assistance Information message to the first network node 111 comprising CU RACH assistance information associated to the RACH configuration conflict detected by the gNB-DU for the served cell.

It should be noticed that, if the second network node 112 only transmits a ACK of the RACH configuration conflict reported by the first network node 111, the first network node 111 may proactively provide DU RACH assistance information without being explicitly requested by the second network node 112.

Action 905

In this Action 905, the second network node 112 may receive the third indication from the first network node 111. The third indication may be based on the first assistance information. At least one of the sent one or more second indications may be based on the received third indication.

The first assistance information may be, for example, DU RACH assistance information. The gNB-DU Assistance Information message may comprise one or more information elements in the group of: a set of preferred RACH configurations that may be configured for the served cell, a range of values for a set of RACH configuration parameters for determining a new RACH configuration for the served cell, and/or a set of DU RACH requirements for the optimization of the RACH configuration of the served cell.

Action 906

In this Action 906, the second network node 112 may obtain the first third RACH configuration based on the first indication. The first third RACH configuration may be performed to change, or update, the first RACH configuration to the first third RACH configuration. At least one of the sent one or more second indications may be based on the obtained first third RACH configuration.

In some examples, the second network node 112 may resolve the RACH configuration conflict at the second network node 112 without assistance from the first network node 111. In one example of embodiments herein, upon receiving a gNB-DU RACH Configuration Conflict message from the first network node 111 indicating a RACH configuration conflict for the served cell, the second network node 112 may further determine, in this Action 906, a new RACH configuration based at least on the gNB-DU RACH Configuration Conflict message. The second network node 112 may then, according to Action 904, transmit a CU RACH assistance info message to the first network node 111 comprising the new RACH configuration for the served cell.

The second network node 112 may first verify, in Action 902, the existence of the RACH configuration conflict for the served cell indicated within the gNB-DU RACH Configuration Conflict message. The second network node 112 may then resolve the RACH configuration conflict by determining a new RACH configuration for the served cell based, for instance, on: the RACH configuration of the neighbouring cell causing the RACH conflict with the cell served by the first network node 111, and/or the RACH configuration of neighbouring cells of the cell served by the first network node 111 for which a RACH conflict has been detected.

In this case, the second network node 112 may not rely on any further assistance information from the first network node 111 to determine the new RACH configuration for the served cell. The second network node 112 may then either instruct or recommend, by performing Action 904, the first network node 111 to update the RACH configuration of the served cell with the RACH configuration indicated by the gNB-CU.

In other examples, the second network node 112 may resolve the RACH configuration conflict at the second network node 112 with assistance from the first network node 111. The second network node 112 may take the assistance information from the first network node 111 into account when generating a new RACH configuration signaled to the first network node 111. If such assistance information is not available, the second network node 112 may determine a new RACH configuration for the first network node 111 cell in conflict and signal it to the first network node 111. The procedure may re-iterate until a RACH configuration that may be suitable to the first network node 111 may be signaled to the first network node 111, and adopted by it.

For the CU RACH conflict resolution based on DU RACH assistance information, the second network node 112 may resolve the RACH configuration conflict for the served cell reported by the first network node 111 by determining a new RACH configuration for the served cell based on one or more information in the group of: the RACH configuration of the neighbouring cell causing the RACH conflict with the cell served by the first network node 111, the RACH configuration of neighbouring cells of the cell served by the first network node 111 for which a RACH conflict has been detected, and the DU RACH assistance information received from the first network node 111.

In some embodiments, at least one of the one or more second indications may indicate the first third RACH configuration.

Action 907

In this Action 907, the second network node 112 may receive the fourth indication from the first network node 111. The fourth indication may be based on the second third RACH configuration, and/or on the first RACH configuration as updated, or changed, to the second third RACH configuration by the first network node 111.

Examples of these actions and the indications are provided later in this document.

Some embodiments herein will now be further described with some non-limiting examples.

In the following description, any reference to a/the gNB-DU may be understood to equally refer to any of the first network node 111; any reference to a/the gNB-CU may be understood to equally refer to the second network node 112; any reference to a/the served cell may be understood to equally refer the first cell 121; any reference to a/the neighbour cell may be understood to equally refer the second cell 122; any reference to a/the UE and/or the UE 102 may be understood to equally refer the user equipment described earlier.

Examples of embodiments herein may be understood to disclose a method for detecting and resolving RACH configuration conflicts between neighbouring cells in a split RAN architecture wherein a gNB central unit (gNB-CU) may be connected to multiple gNB distributed units, e.g., gNB-DUs, and each gNB-DU may serve/control one or more radio access cell. A RACH configuration conflict may occur either between two cells served by different gNB-DUs connected to the same gNB-CU, or between two radio cells served by different gNB-DUs connected to different gNB-CUs.

Examples of Embodiments for the First Network Node 111, e.g., the gNB-DU

Figure 10:
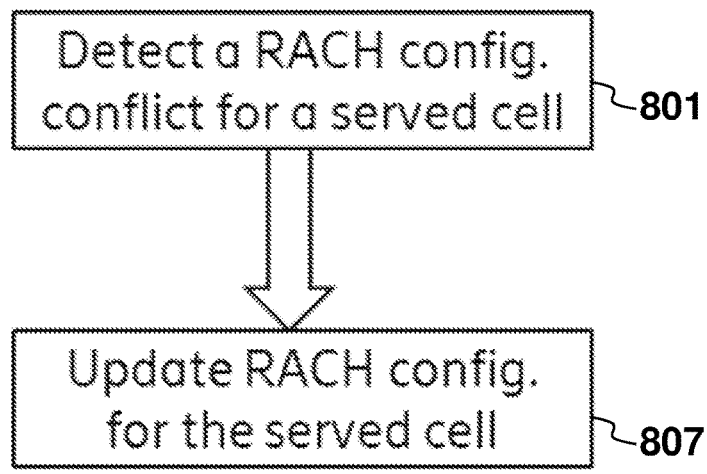
FIG. 10 is a flowchart illustrating a non-limiting example of non-limiting aspects of a method in a first network node, e.g., a gNB-DU, according to embodiments herein.

FIG. 10 is a signalling diagram illustrating some aspects of embodiments of method at the first network node, e.g., the gNB-DU, according to embodiments herein. The reference numerals correspond to the Actions described earlier for each of the first network node 111. According to some aspects, embodiments herein may be understood to disclose a method for RACH configuration conflict resolution that may be executed by the first network node 111, e.g., a gNB-DU for optimizing the RACH configuration of at least a served cell. The method may comprise detecting the RACH configuration conflict between the RACH configuration of the served cell and the RACH configuration of the neighbouring cell, and changing the RACH configuration for the served cell based on the detection of the RACH configuration conflict.

Figure 11:
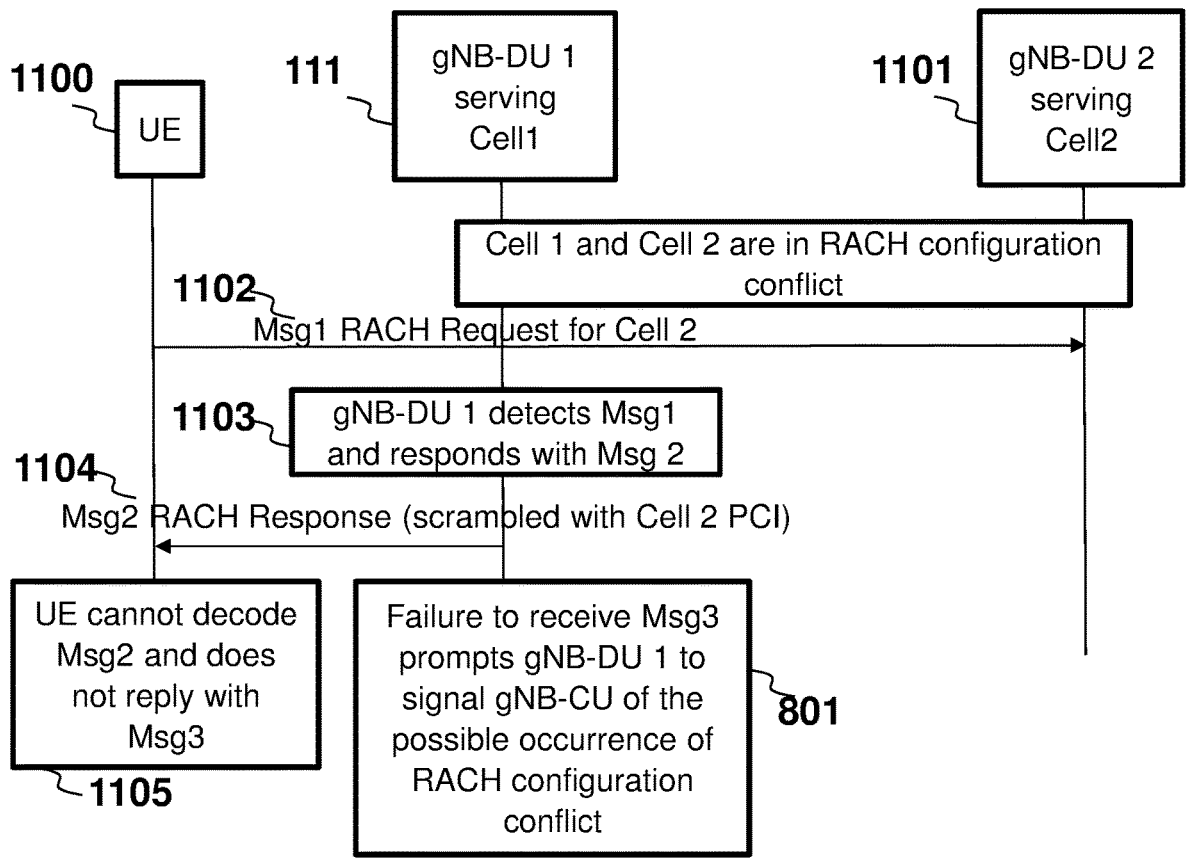
FIG. 11 is a flowchart illustrating a non-limiting example of signaling exchange for RACH configuration conflict detection at gNB-DU, according to non-limiting aspects of embodiments herein.

FIG. 11 is a signalling diagram depicting RACH conflict detection at the gNB-DU. Particularly, FIG. 11 shows a non-limiting example of how the first network node 1111, a gNB-DU represented as gNB-DU 1, may detect the RACH configuration conflict for a given cell such as the first cell 121, represented as Cell 1. In one example of embodiments herein, the gNB-DU detects the potential RACH configuration conflict between the served cell and a neighbouring cell such as the second cell 122, represented as Cell 2, based on statistic information associated to failed random access attempts of user devices to the served cell. The second cell 122 may be served by another gNB-DU 1101, gNB-DU 2. In one implementation, a random access attempt of a user device, represented as UE 1100, is declared failed if the a RACH msg-1 transmitted by the user device at 1102 is received by the gNB-DU at 1103 according to the RACH configuration of the served cell, a RACH msg-2 is transmitted at 1104 by the gNB-DU to the user device to grant uplink resources to the user device for transmitting a RACH msg-3 according to the RACH configuration of the served cell, but the RACH msg-3 transmitted by the user device is not received by the gNB-DU in the reserved resources. FIG. 11 depicts a slightly different scenario, wherein the UE 1100 cannot decode the Msg2 at 1105 and does not reply with an Msg3.

The gNB-DU may, for instance, at 801, collect statistics associated to the number of failed RACH attempts, the frequency of the failed RACH attempts, the RACH resources wherein the RACH msg-1 is received from a user device during a failed RACH attempt, such as RACH preamble used, time-frequency location of the RACH msg-1 transmission, etc.

The gNB-DU may then determine a RACH configuration conflict if, for instance, the number of failed RACH attempts exceeds a predefined threshold. In an alternative implementation, the gNB-DU may determine a RACH configuration conflict if the number of failed RACH attempts within a part of the RACH resources used by the served cell exceeds a predefined threshold.

Once the gNB-DU determines that a RACH configuration conflict has occurred, the gNB-DU may issue an indication to the gNB-CU in accordance with Action 802, highlighting the cell for which the conflict is suspected. The gNB-CU may verify, in accordance with Action 902, that the cell is in RACH configuration conflict by comparing the RACH configuration of the cell with those of all cells in the cell neighbourhood, where a gNB-CU has previously received RACH configuration information of all cells in such neighbourhood and where the gNB-CU is able to determine cells neighbourhood thanks to UE cell measurement reports and pre-configuration of neighbour relations between cells.

FIG. 12-FIG. 22 depict each a signalling diagram illustrating non-limiting examples of methods, or actions, performed by the first network node 111 and the second network node 112, according to embodiments herein. The reference numerals correspond to the Actions described earlier for each of the first network node 111, and the second network node 112. The direction of the arrows represents the direction of the signalling. The different indications mentioned in the actions are exemplified with particular messages.

Figure 12:
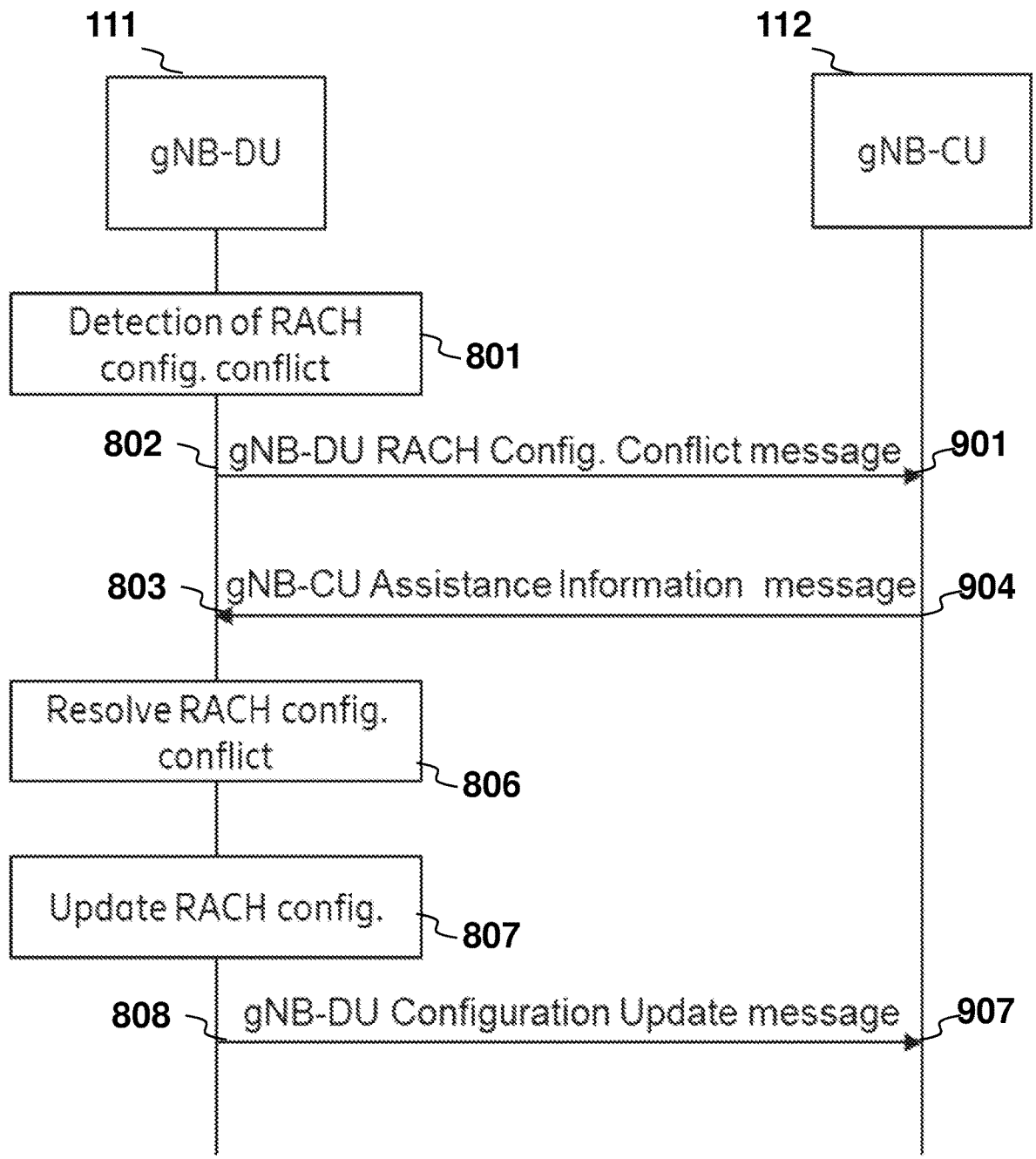
FIG. 12 is a flowchart illustrating a non-limiting example of detection and resolution of RACH configuration conflict at the gNB-DU with assistance from gNB-CU, according to embodiments herein.
Figure 13:
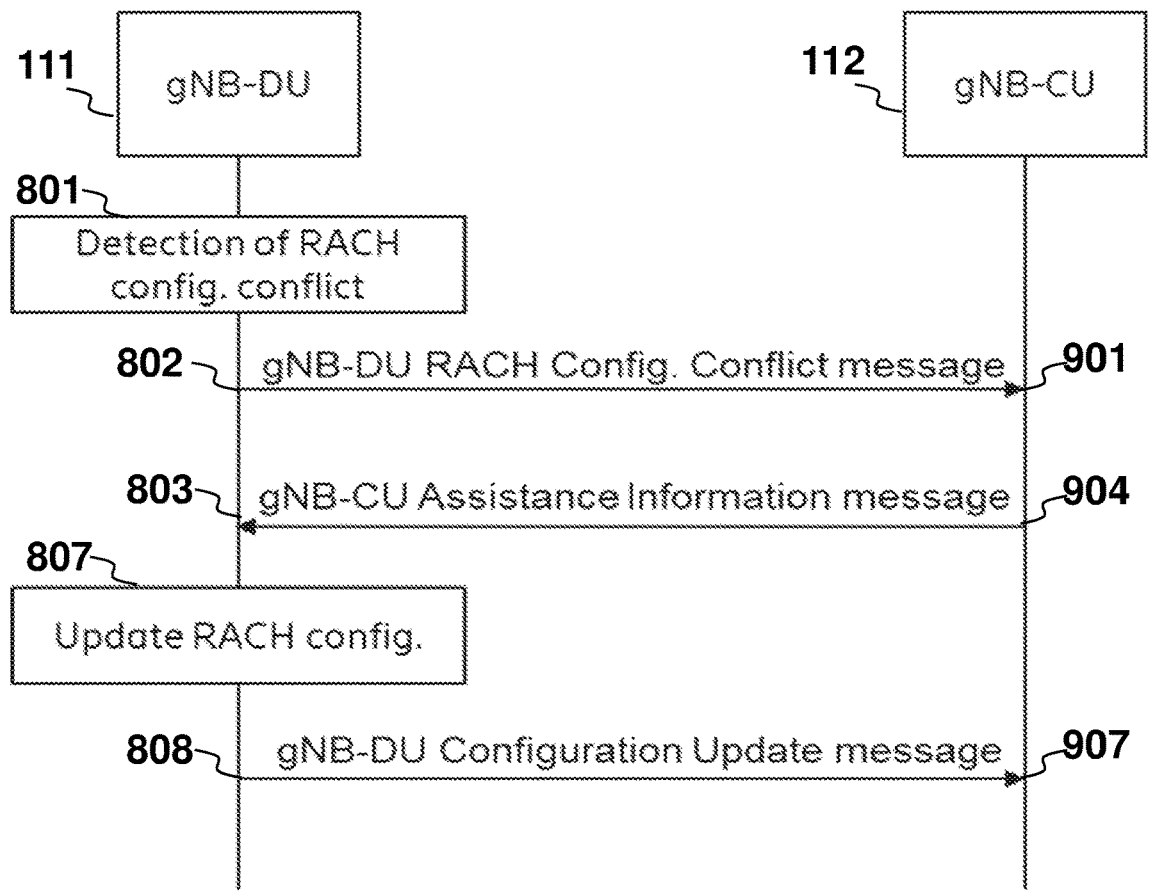
FIG. 13 is a flowchart illustrating a non-limiting example of an embodiment wherein the gNB-DU receives from gNB-DU a RACH configuration resolving the RACH configuration conflict for the served cell and configures the served cell with said RACH configuration, according to embodiments herein.

In one example of embodiments herein, illustrated in FIG. 12, of resolution of RACH conflict at gNB-DU with assistance from gNB-CU, the first network node 111, a gNB-CU, upon detecting a RACH configuration conflict for a served cell at 801, further, transmits a gNB-DU RACH Configuration Conflict message to the second network node 112, a gNB-CU, according to the content described earlier. The first network node 111 receives a gNB-CU Assistance Information message in response to a gNB-DU RACH Configuration Conflict message, according to the content described earlier, and determines, according to Action 806, a new RACH configuration for the served cell based on the gNB-CU Assistance Information message. The first network node 111 then updates, according to Action 807, the RACH configuration of the served cell according to the new RACH configuration, and transmits, according to Action 808, a gNB-DU Configuration Update message to at least a second network node 112, the gNB-CU, comprising the new RACH configuration and the identity of the served cell configured with the new RACH configuration. The gNB-DU may further transmit a gNB-DU Configuration Update message to an OAM node. According to the method illustrated in FIG. 12, the gNB-DU may further resolve the detected RACH configuration conflict for the served cell, that is, it may determine a new RACH configuration for the served cell, based on the content of the gNB-CU Assistance Information message. In one example, the gNB-DU may transmit, according to Action 802, a gNB-DU RACH Configuration Conflict message to the gNB-CU indicating a potential RACH configuration conflict for the served cell and an identifier of the served cell. No assistance information may be requested by the gNB-DU to resolve the potential RACH configuration conflict detected for the served cell. In this case, the gNB-CU may verify, according to Action 902, whether the reported RACH configuration conflict exists for the served cell and, according to Action 904, respond with a CU-RACH assistance information message comprising either positive acknowledgement (ACK) or a negative acknowledgment (NACK) of the RACH configuration conflict detected by the gNB-DU for the served cell. In case of a positive ACK, the gNB-DU may proceed resolving the RACH configuration conflict without any further assistance information from the gNB-CU according to other embodiments of the method.

In another example, the gNB-DU may, according to Action 802, transmit a gNB-DU RACH Configuration Conflict message to a gNB-CU indicating a request of CU RACH assistance information for the served cell, whose identifier may further be included in the gNB-DU RACH Configuration Conflict message. In this case, the gNB-DU may implicitly indicates to the gNB-CU a potential RACH configuration conflict for the served cell.

The gNB-CU Assistance Information message received from the gNB-CU may comprise either a positive acknowledgement (ACK) or a negative acknowledgment (NACK) of the RACH configuration conflict detected by the gNB-DU, so that to allow the gNB-DU resolve the RACH conflict without any further assistance information. In alternative, or in addition, the gNB-CU Assistance Information message received from the gNB-CU may comprise CU RACH assistance information associated to the detected RACH conflict which the gNB-DU can use to resolve the RACH configuration conflict.

In one example, the gNB-CU may inform the gNB-DU about the RACH configuration of the neighbouring cell causing the RACH conflict with the cell served by the gNB-DU. This may allow the gNB-DU to resolve the RACH conflict detected for the served cell, that is, to determine a new RACH configuration, e.g., a set of RACH resources in time, frequency and code domain, orthogonal to the RACH configuration of the neighbouring cell that cases the conflict.

In addition, to avoid that the new RACH configuration causes a new RACH configuration conflict with another neighbouring cell, the CU RACH assistance information may further comprise an indication of the RACH configurations of relevant neighbouring cells which the gNB-DU may need to avoid when resolving the RACH configuration conflict. In an alternative example, the CU RACH assistance information may comprise a range of values for one or more RACH parameters/resources that the gNB-DU may use to resolve the RACH conflict for the served cell such as a range of time frequency resources the gNB-DU may choose from for the RAHC configuration, a range of Root Sequence values the gNB-DU may choose from for the RACH configuration. This may be understood to have the benefit of limiting the signaling overhead of the gNB-CU Assistance Information message while still providing the gNB-DU sufficient information to resolve the RACH configuration conflict.

Some examples of gNB-DU embodiments herein may comprise RACH conflict resolution at the gNB-CU.

In some examples, the DU may accept or recompute a RACH configuration. In one example of embodiments herein, illustrated in FIG. 13, the gNB-DU receives, according to Action 803, a CU RACH assistance information message, or gNB-CU assistance information message, from the gNB-CU comprising a RACH configuration for the served cell for which the gNB-DU reported, according to Action 802, a RACH configuration conflict within the gNB-DU RACH Configuration Conflict message. The gNB-DU may then update, according to Action 807, the RACH configuration of the served cell with the RACH configuration indicated by the gNB-CU within the CU RACH assistance information message. The gNB-DU may further transmit, according to Action 808, a gNB-DU Configuration Update message to the gNB-CU, and/or an equivalent message to the OAM, to acknowledge the updated RACH configuration for the served cell according to previous embodiments. In an alternative example, the gNB-DU may further determine, according to Action 806, whether that the RACH configuration indicated by the gNB-CU fulfils the gNB-DU requirements. If the RACH configuration indicated by the gNB-CU does not fulfil the gNB-DU requirements, the first network node 111 may a) determine a new RACH configuration for the served cell based on the gNB-DU requirements, b) update the RACH configuration of the served cell according to the new RACH configuration that fulfils the gNB-DU requirements, and c) transmit a gNB-DU Configuration Update message to at least the second network node, the gNB-CU, comprising the new RACH configuration and the identity of the served cell configured with the new RACH configuration.

In yet another alternative example, the gNB-DU may fail the procedure by which the gNB-CU proposes a new RACH configuration for the cell in conflict. The gNB-DU may provide, according to Action 805, additionally with such failure indication a range of assistance information indicating RACH configuration parameters that may be acceptable for the gNB-DU, for example a minimum and a maximum amount of RACH time/frequency resources. The gNB-CU may take the assistance information from the gNB-DU into account when, according to Action 906, generating a new RACH configuration signaled to the gNB-DU. If such assistance information is not available, the gNB-CU may determine, according to Action 906, a new RACH configuration for the gNB-DU cell in conflict and signal it to the gNB-DU. The procedure may re-iterate until a RACH configuration that may be suitable to the gNB-DU may be signaled to the gNB-DU and adopted by it. FIG. 12 still correctly represents the steps involved in this embodiment.

Figure 14:
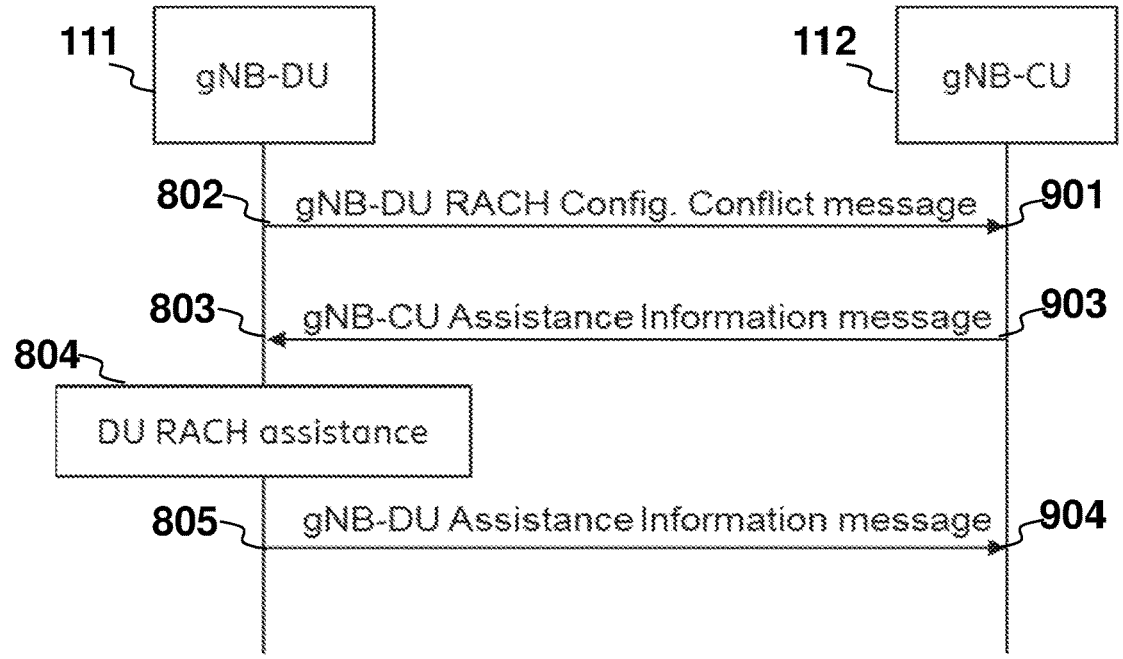
FIG. 14 is a flowchart illustrating a non-limiting example of an embodiment wherein upon receiving a gNB-CU Assistance Information message, the gNB-DU determines DU RACH assistance information associated to the reported RACH configuration conflicts and transmits a gNB-DU Assistance Information message to the gNB-CU, according to embodiments herein.

In one example of aspects of embodiments herein, illustrated in FIG. 14, upon receiving, according to Action 803, a gNB-CU Assistance Information message from the gNB-CU, the gNB-DU further determine, according to Action 804, DU RACH assistance information associated to the RACH configuration conflict, and, according to Action 805, transmit, to the gNB-CU, a gNB-DU Assistance Information message comprising at least the DU RACH assistance information, as described earlier. In this case, the gNB-CU Assistance Information message may comprise either just and acknowledgment of the RACH configuration conflict reported by the gNB-DU or an explicit request for DU RACH assistance information. In the former case, the DU may proactively provide, according to Action 805, DU RACH assistance information to the gNB-CU, thereby avoiding additional signaling exchange between the two network nodes. In one example of embodiments herein, the gNB-DU may further determine, according to Action 804, DU RACH assistance information which may comprise one or more information elements in the group of: a set of one or more, preferred, RACH configurations that can be configured for the served cell; a, preferred, range of values for a set of RACH configuration parameters; and a set of DU RACH requirements for the optimization of the RACH configuration of the served cell. Therefore, in one case, the gNB-DU may determine, according to Action 804, and indicate, according to Action 805, one or more, preferred, RACH configurations that the gNB-CU may use to optimize the RACH configuration of the served cell experiencing a RACH configuration conflict. In another example, the gNB-DU may determine, according to Action 404, preferred, range of values for a set of RACH configuration parameters that the gNB-CU may use to optimize the RACH configuration of the served cell experiencing a RACH configuration conflict. In another case, the gNB-DU may determine, according to Action 804, a set of DU RACH requirements for the optimization of the RACH configuration of the served cell. For example, a minimum and a maximum amount of RACH time/frequency resources.

Figure 15:
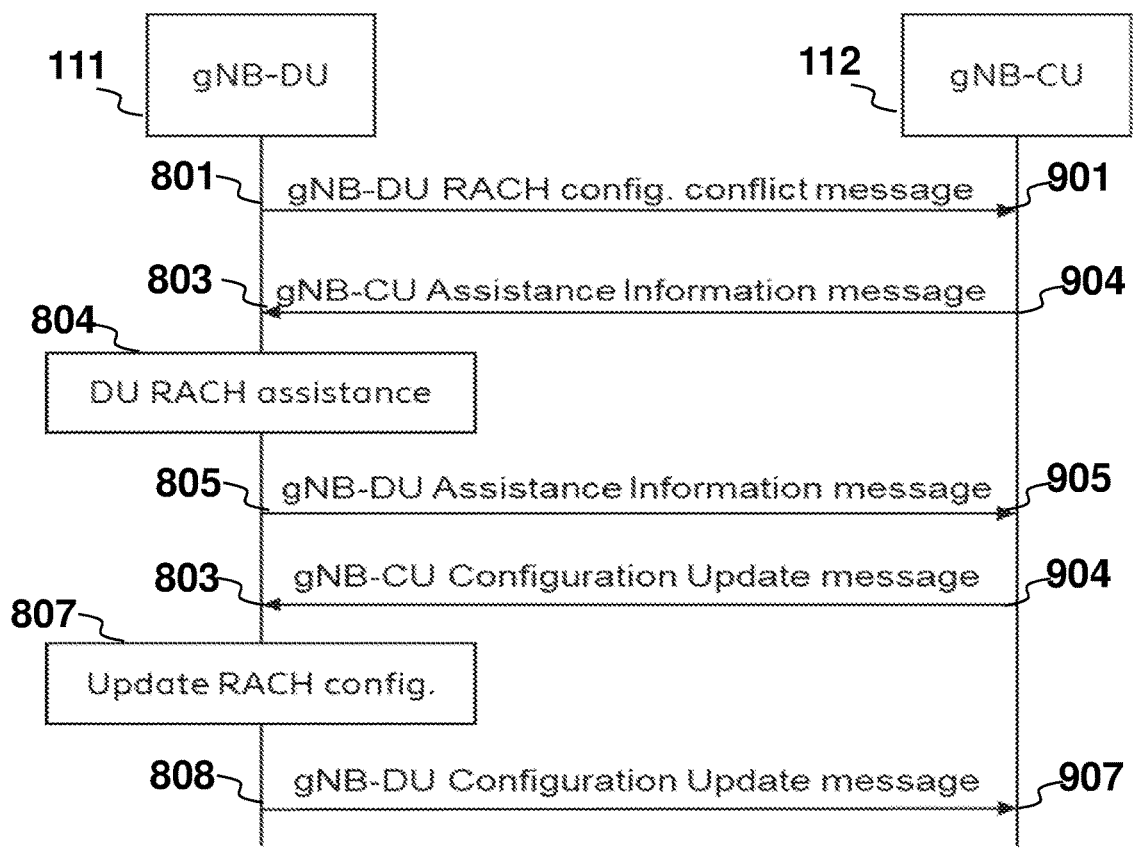
FIG. 15 is a flowchart illustrating a non-limiting example wherein the gNB-DU further receives a gNB-CU Configuration Update message and updates the RACH configuration of the served cell experiencing a RACH configuration conflict, according to embodiments herein.

In one example of gNB-DU embodiments herein, illustrated in FIG. 15, with a gNB-CU Configuration Update message from gNB-CU, the gNB-DU may, according to Action 803, further receive from the gNB-CU a gNB-CU Configuration Update message associated to the reported RACH configuration conflict in Action 801. The first network node 111 may then update, according to Action 807, the RACH configuration of the served cell based on the CU RACH configuration update message, and according to Action 808, transmit a gNB-DU RACH Configuration Conflict message to the gNB-CU. In one possible implementation of the method, the gNB-CU Configuration Update message may comprise a new RACH configuration for the served cell experiencing a RACH configuration conflict. The gNB-DU may then determine to accept the RACH configuration indicated by the gNB-CU and update the RACH configuration of the served cell based on the CU RACH configuration update message. In an alternative implementation of the method, the gNB-DU can instead determine to reject the RACH configuration indicated by the gNB-CU. Indeed, a negotiation mechanism may be needed between the gNB-CU and the gNB-DU so that the gNB-DU may, for instance, reject a RACH configuration suggested by the gNB-CU if this is not feasible in light of gNB-DU implementation and policies. As part of the negotiation mechanism, the gNB-DU may then assist the gNB-CU with information associated to the user plane requirements for the cell. For example, the gNB-DU may specify to the gNB-CU the minimum or maximum amount of RACH resources that may be used for its configuration. In alternative, the gNB-DU may suggest a list of preferred RACH configurations to the gNB-CU, which in turn may choose one that does not create any RACH conflict with neighbouring cells and signal it back to the gNB-DU based, for instance, on the RACH configuration information received by neighbouring gNB-CUs. In one example, the gNB-DU may start a negotiation/coordination protocol with the gNB-CU wherein, according to previous embodiments, the gNB-CU may execute one of the following options: a) transmit a gNB-DU Assistance Information message or a DU RACH conflict information message to the gNB-CU with a request for CU assistance information; the gNB-DU may further explicitly request information associated to the RACH configuration of at least one cell creating the RACH configuration conflict with the served cell and/or the RACH configuration of neighbouring cells to the served cell, and b) determine a new RACH configuration for the served cell experiencing a RACH configuration conflict and transmitting a gNB-DU Configuration Update message to the gNB-CU indicating the new RACH configuration for the served cell.

Examples of Embodiments for the Second Network Node 112, e.g., the gNB-CU

Figure 16:
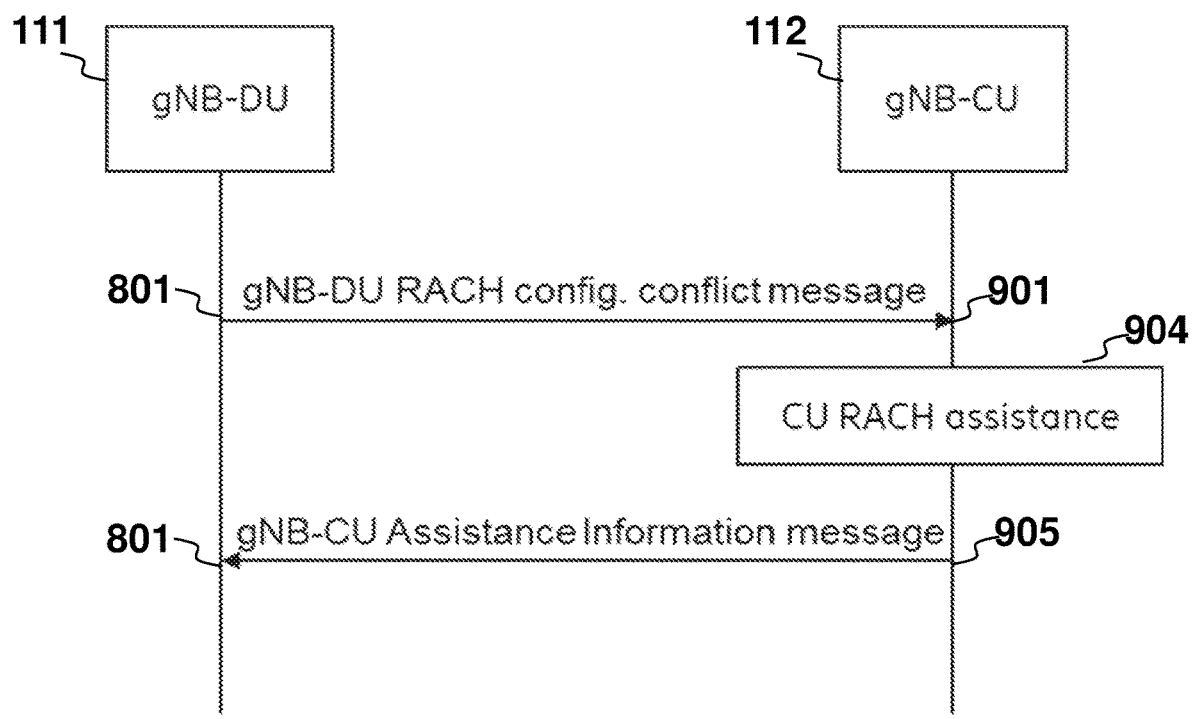
FIG. 16 is a flowchart illustrating a non-limiting example of a method executed by a gNB-CU, wherein the gNB-CU provides assistance information to the gNB-DU to verify and/or resolve a RACH configuration conflict for a served cell, according to embodiments herein.

Embodiments herein may be understood to further disclose a method executed by the second network node 112, e.g., a gNB-CU, the method comprising: a) receiving, according to Action 901, a gNB-DU RACH Configuration Conflict message from a gNB-DU associated to a RACH configuration conflict detected by the gNB-DU for the served cell, according to the content described earlier, b) determining, according to Action 904, CU RACH assistance information based on the received gNB-DU RACH Configuration Conflict message, and c) transmitting, according to Action 905, a gNB-CU Assistance Information message to the gNB-DU comprising CU RACH assistance information associated to the RACH configuration conflict detected by the gNB-DU for the served cell. FIG. 16 shows an illustration of the method executed by the gNB-CU. The content of the gNB-CU Assistance Information message has been described in the following subsections for different embodiments of the method.

Figure 17:
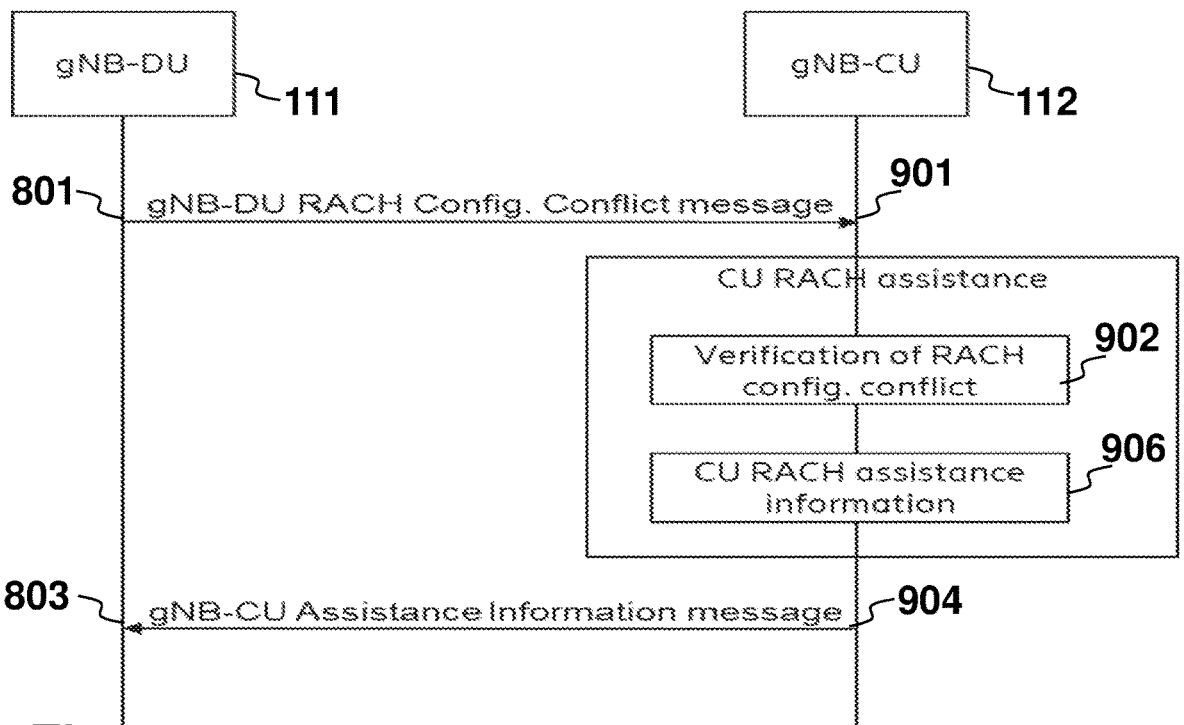
FIG. 17 is a flowchart illustrating a non-limiting example of CU RACH assistance in the form of verification of RACH configuration conflict and determination of CU RACH assistance information, according to embodiments herein.

Upon, according to Action 901, receiving a gNB-DU RACH Configuration Conflict message from the gNB-DU associated to a served cell, the gNB-CU may first, according to Action 902, verify the existence of the RACH configuration conflict for the served cell indicated within the gNB-DU RACH Configuration Conflict message, then determine, according to Action 906, CU RACH assistance information, according to the content already disclosed, at least in part, earlier. FIG. 17 shows an illustration of this case.

Figure 18:
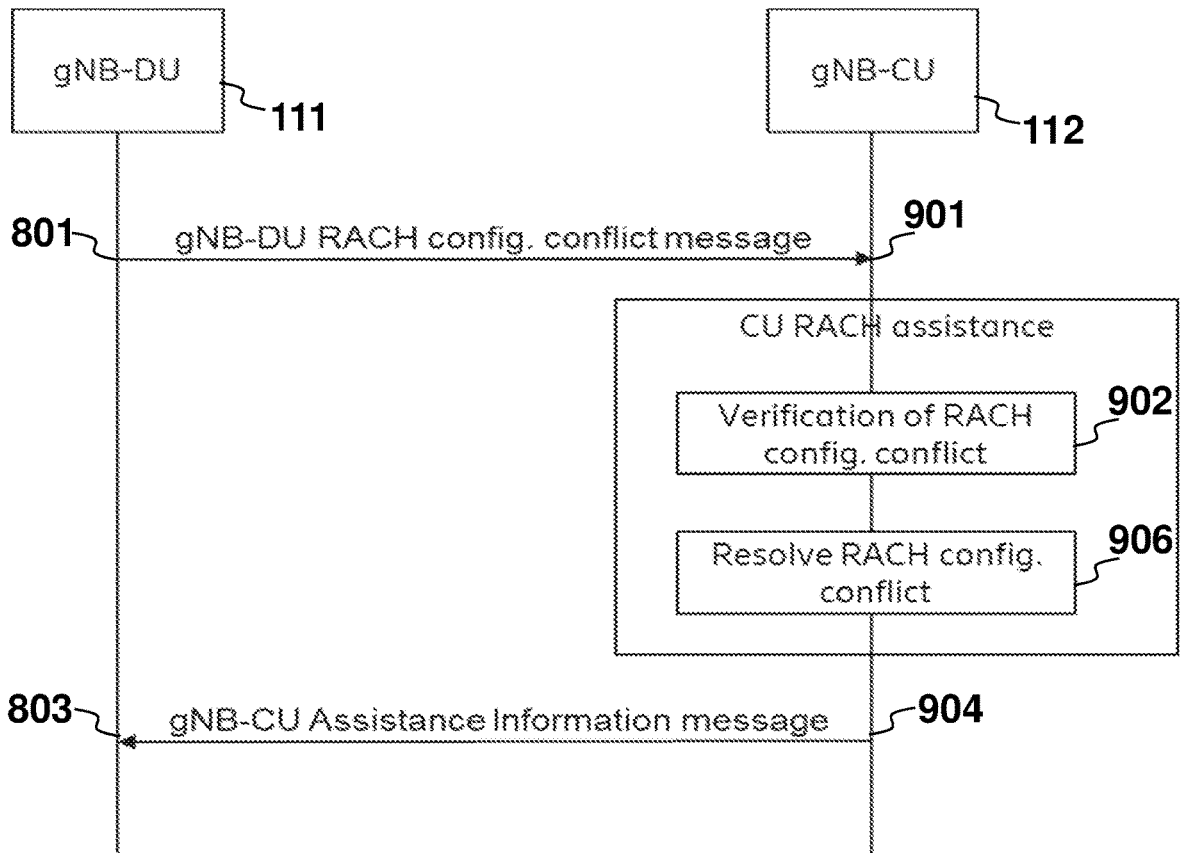
FIG. 18 is a flowchart illustrating a non-limiting example of RACH conflict resolution executed by the gNB-CU, according to embodiments herein.

Some examples of embodiments herein comprise resolution of the RACH configuration conflict at the gNB-CU without assistance from the gNB-DU. In one example of embodiments herein, upon receiving, according to Action 901, a gNB-DU RACH Configuration Conflict message from the gNB-DU indicating the RACH configuration conflict for the served cell, the gNB-CU, according to Action 904, may further determine, according to Action 906, a new RACH configuration based at least on the gNB-DU RACH Configuration Conflict message, and, according to Action 904, transmit a CU RACH assistance info message to the gNB-DU comprising the new RACH configuration for the served cell. FIG. 18 shows an illustration of the method according to embodiments herein. In this case, the gNB-CU may first verify, according to Action 902, the existence of the RACH configuration conflict for the served cell indicated within the gNB-DU RACH Configuration Conflict message. The gNB-CU may then resolve, according to Action 906, the RACH configuration conflict by determining a new RACH configuration for the served cell based, for instance, on: a) the RACH configuration of the neighbouring cell causing the RACH conflict with the cell served by the gNB-DU, and/or b) the RACH configuration of neighbouring cells of the cell served by the gNB-DU for which a RACH conflict has been detected. In this case, the gNB-CU may not rely on any further assistance information from the gNB-DU to determine the new RACH configuration for the served cell. The gNB-CU may then, according to Action 904, either instruct, or recommend, the gNB-DU to update the RACH configuration of the served cell with the RACH configuration indicated by the gNB-CU.

Figure 19:
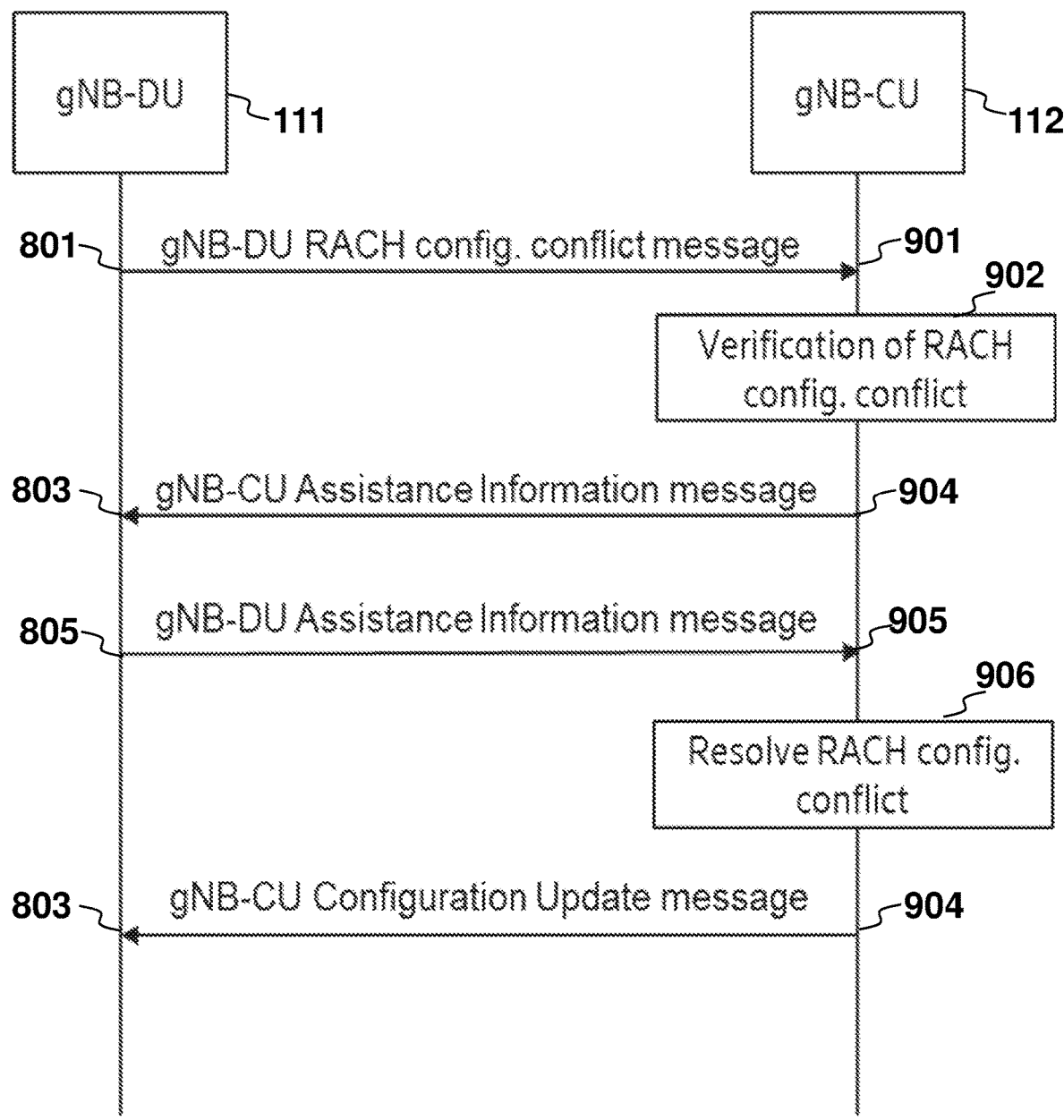
FIG. 19 is a flowchart illustrating a non-limiting example wherein the gNB-CU, upon verifying the RACH configuration conflict reported by the gNB-DU, receives DU assistance information to resolve the RACH configuration conflict and indicate a new RACH configuration for the served cell to the gNB-DU, according to embodiments herein.

Some examples of embodiments herein comprise resolution of the RACH configuration conflict at the gNB-CU with assistance from the gNB-DU. In one example of embodiments herein, upon receiving, according to Action 901, a gNB-DU RACH Configuration Conflict message from the gNB-DU, the gNB-CU may further: a) verify the existence of the RACH conflict for the served cell as reported by the gNB-DU within the received gNB-DU RACH Configuration Conflict message; b) transmit, according to Action 904, the gNB-CU Assistance Information message to the gNB-DU in response to the gNB-DU RACH Configuration Conflict message comprising an acknowledgement of the RACH conflict reported by the gNB-DU and/or a request for DU RACH assistance information; c) receive, according to Action 95, a gNB-DU Assistance Information message from the gNB-DU associated to the RACH configuration conflict, comprising at least DU RACH assistance information; d) resolve, according to Action 906, the RACH configuration conflict for the served cell based at least on the gNB-DU Assistance Information message; and e) transmit, according to Action 904, a gNB-CU Configuration Update message to the gNB-DU comprising either a new RACH configuration for the served cell or a range of values for a set of RACH configuration parameters. FIG. 19 shows an illustration of the method at the gNB-CU, wherein the gNB-CU may receive DU RACH assistance information for resolving the RACH configuration conflict. Upon verifying, according to Action 902, the existence of the RACH configuration conflict reported by the gNB-DU, the gNB-CU may, according to Action 904, transmit a gNB-CU Assistance Information message to the gNB-DU one or both of: i) an acknowledgement of the RACH configuration conflict reported by the gNB-DU; and ii) a request for DU RACH assistance information. In both cases, the gNB-DU may respond, according to Action 805, providing a DU RACH assistance info message. It may be noticed that, if the gNB-CU only transmits a ACK of the RACH configuration conflict reported by the gNB-DU, the gNB-DU may proactively provide DU RACH assistance information without being explicitly requested by the gNB-CU. The gNB-DU Assistance Information message may comprise one or more information elements in the group of: a set of preferred RACH configurations that may be configured for the served cell, a range of values for a set of RACH configuration parameters that for determining a new RACH configuration for the served cell, and/or a set of DU RACH requirements for the optimization of the RACH configuration of the served cell. For a CU RACH conflict resolution based on DU RACH assistance information, the gNB-CU may then resolve, according to Action 906, the RACH configuration conflict for the served cell reported by the gNB-DU by determining a new RACH configuration for the served cell based on one or more information in the group of: i) the RACH configuration of the neighbouring cell causing the RACH conflict with the cell served by the gNB-DU, the RACH configuration of neighbouring cells of the cell served by the gNB-DU for which a RACH conflict has been detected, and iii) the DU RACH assistance information received from the gNB-DU.

Figure 20:
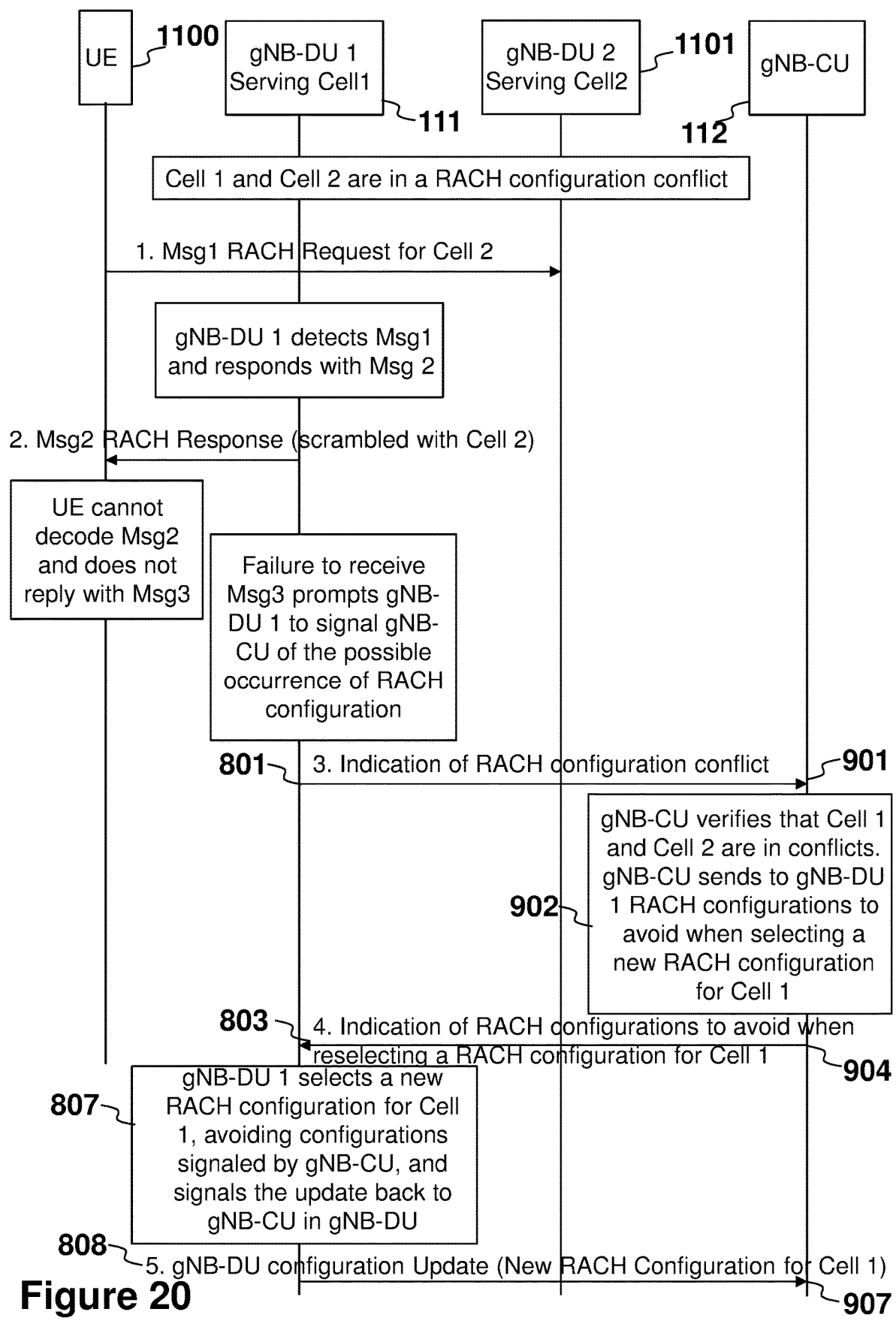
FIG. 20 is a flowchart illustrating a non-limiting example of conflict resolution at gNB-CU with provisioning of assistance information, according to embodiments herein.
Figure 21:
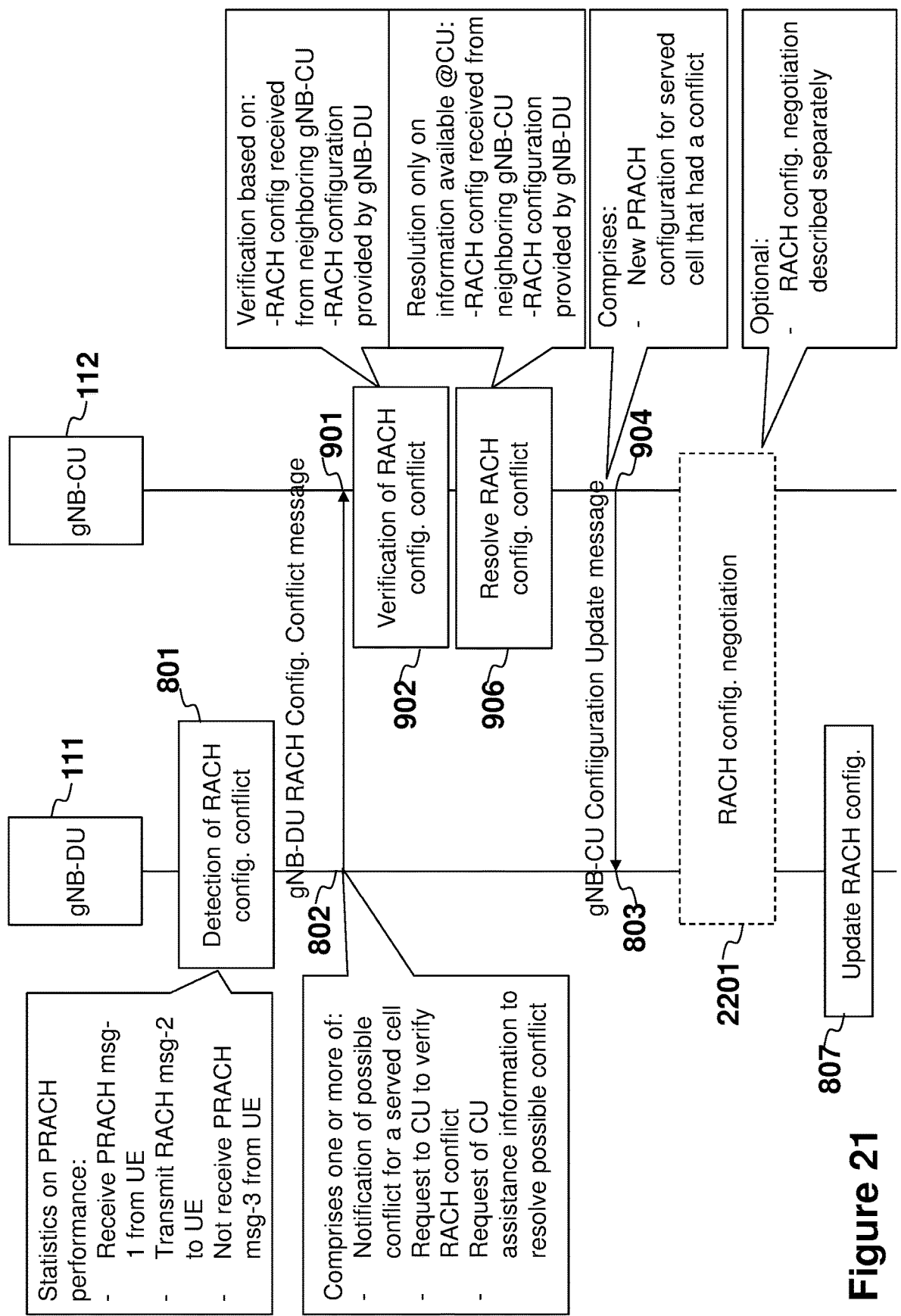
FIG. 21 is a flowchart illustrating a non-limiting example of implementation of methods at gNB-DU and gNB-CU wherein, the gNB-DU detects a potential RACH configuration conflict for a served cell, while the gNB-CU verifies the existence of the conflict, resolves the conflict and informs the gNB-DU of a new RACH configuration to use for the served cell, according to embodiments herein.
Figure 22:
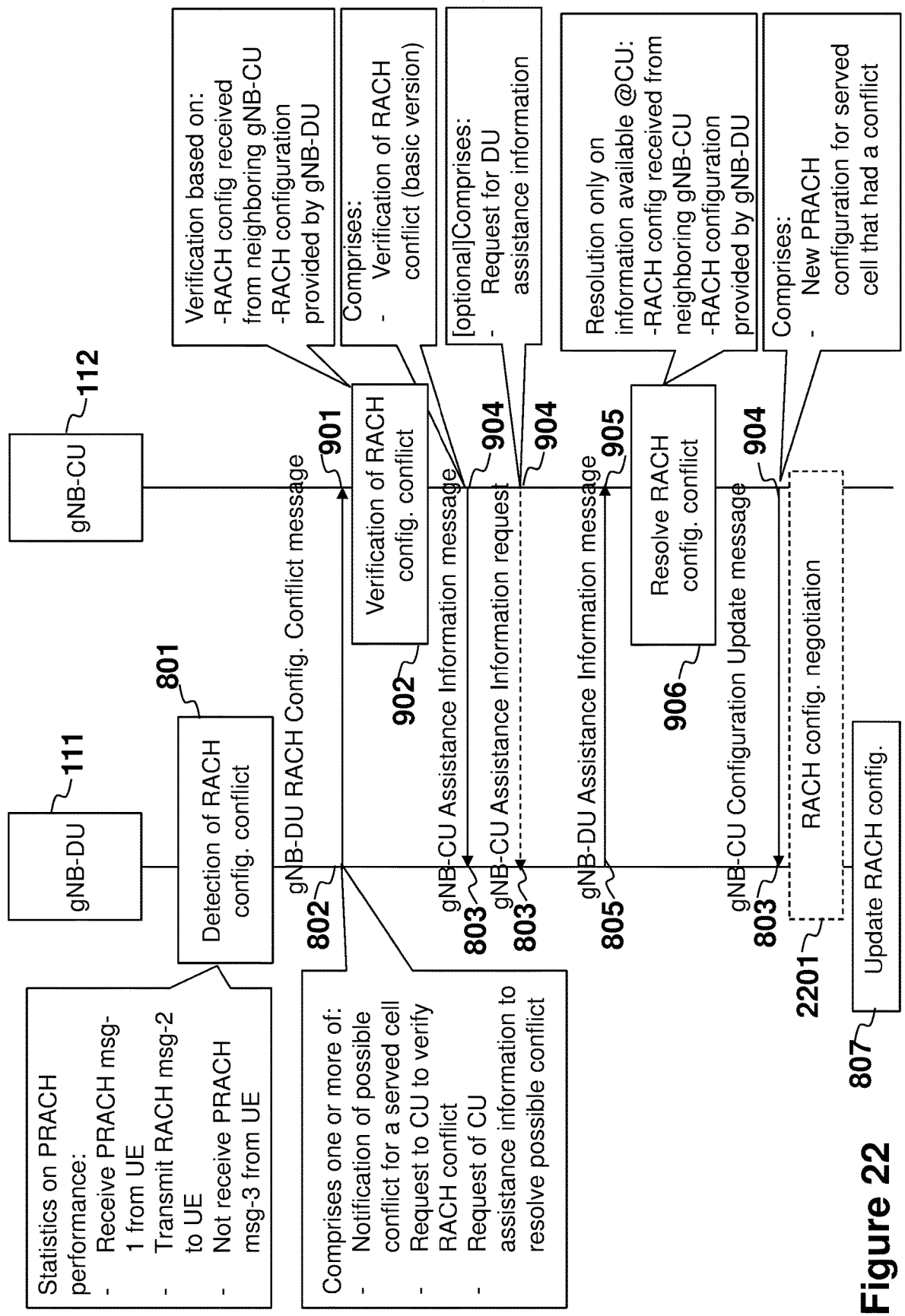
FIG. 22 is a flowchart illustrating a non-limiting example of implementation of methods at gNB-DU and gNB-CU wherein, the gNB-DU detects a potential RACH configuration conflict for a served cell, while the gNB-CU verifies the existence of the conflict, requests assistance information to the gNB-DU to resolve the RACH conflict, resolves the conflict and informs the gNB-DU of a new RACH configuration to use for the served cell, according to embodiments herein.

FIGS. 20-22 depict non-limiting examples of combination of two methods.

FIG. 20 shows how the solution based on conflict detection at the gNB-DU and conflict resolution at the gNB-DU, based on assistance information as per Option a described earlier. The gNB-DU detects potential cases of RACH configuration conflicts by monitoring reception of Msg1 followed by absence of Msg3, as described earlier in relation to FIG. 11. According to Action 801, the gNB-DU signals the gNB-CU a possible RACH configuration conflict involving e.g., Cell A. The gNB-CU verifies, according to Action 902, that other cells in the neighbourhood of Cell A have an overlapping RACH configuration with Cell A, and, according to Action 904, signals to the gNB-DU, the RACH configurations to avoid when choosing a new configuration for Cell A. The gNB-DU selects, according to Action 807, a new RACH configuration taking the limitations from the gNB-CU into account. The gNB-DU then, according to Action 808, signals gNB-CU the newly adopted RACH configuration in gNB-DU configuration Update.

FIG. 21 shows another possible implementation that combines the methods and embodiments for the gNB-CU and the gNB-DU. In this example, the gNB-DU detects, according to Action 801, a potential RACH configuration conflict for the served cell, while the gNB-CU, according to Action 902, verifies the existence of the conflict, resolves, according to Action 906, the conflict and informs, according to Action 904, the gNB-DU of a new RACH configuration to use for the served cell. In this case, the gNB-CU may resolve the RACH conflict for the served cell with only information already available at the gNB-CU. No additional assistance information is requested to the gNB-DU. Optionally, the gNB-CU and the gNB-DU may enter into a negotiation, as described earlier, if the gNB-DU does not accept the configuration suggested by the gNB-CU. The gNB-DU may ultimately update, according to Action 807, the first RACH configuration with the finally accepted configuration.

FIG. 22 shows another example of implementation that combines the methods and embodiments at gNB-DU and gNB-CU wherein, the gNB-DU detects, according to Action 801, a potential RACH configuration conflict for the served cell, while gNB-CU, according to Action 902, verifies the existence of the conflict, requests, according to Action 902, assistance information to the gNB-DU to resolve the RACH conflict, resolves, according to Action 906, the conflict, and informs, according to Action 904, the gNB-DU of a new RACH configuration to use for the served cell. In this case, the gNB-CU requests, according to Action 904, gNB-DU assistance information for resolving the RACH conflict. Optionally, the gNB-CU and the gNB-DU may enter into a negotiation, as described earlier, if the gNB-DU does not accept the configuration suggested by the gNB-CU. The gNB-DU may ultimately update, according to Action 807, the first RACH configuration with the finally accepted configuration.

Certain embodiments disclosed herein may provide one or more of the following technical advantage(s), which may be summarized as follows. Embodiments herein may allow a gNB-DU to efficiently detect a (potential) RACH configuration conflict for a served cell without any assistance from the gNB-CU. The gNB-DU is further enabled to readily update the RACH configuration for the served cell experiencing a RACH configuration conflict, thereby improving the overall system performance when user devices attempt to access the served cell using a random access procedure.

The proposed method further enables a gNB-DU to efficiently detect and report a potential RACH configuration conflict for a served cell to the controlling gNB-CU. In turn, this enables the gNB-CU to efficiently verify whether the reported RACH configuration conflict exists based on additional information that is only available to the gNB-CU. Thus, the occurrence of a RACH configuration conflict between a served cell and a neighbouring cell can be efficiently detected and resolved with minimal information exchange between the gNB-DU and the gNB-CU.

Figure 23:
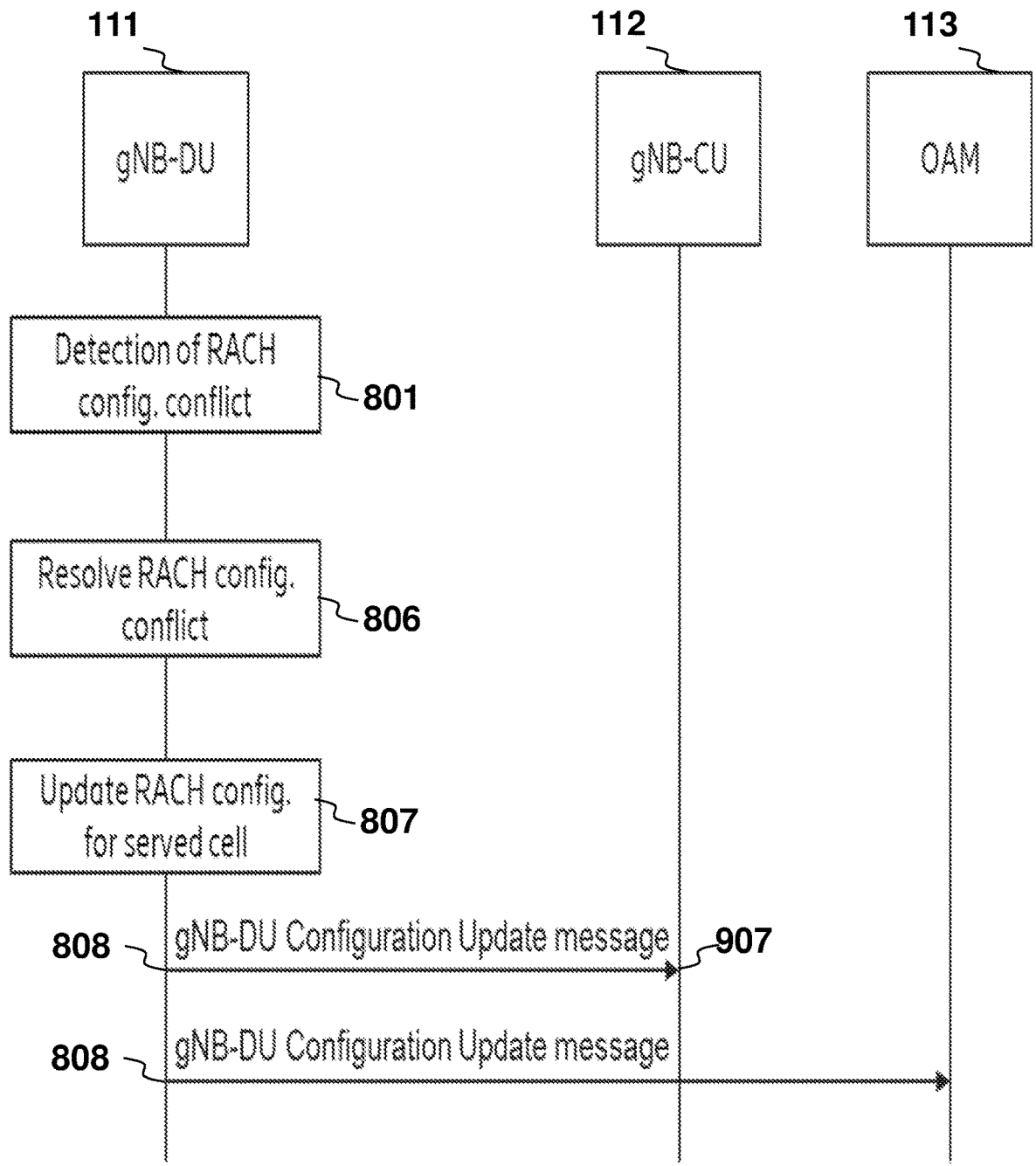
FIG. 23 is a flowchart illustrating a non-limiting example of detection and resolution of RACH configuration conflict at the gNB-DU without any assistance from gNB-CU, according to an implementation related to embodiments herein.

FIG. 23 is a signalling diagram depicting resolution of the RACH conflict at the gNB-DU without assistance from the gNB-CU in an implementation related to embodiments herein, which may be performed by the first network node 111, for example, before or after any of the embodiments described so far. The reference numerals correspond to the Actions described earlier for each of the first network node 111, and the second network node 112. The direction of the arrows represents the direction of the signalling. The different indications mentioned in the actions are exemplified with particular messages. In FIG. 11, a particular exemplary combination of actions the first network node 111 and the second network node 112 may perform is depicted. In one non-limiting example of an implementation related embodiments herein, illustrated in FIG. 23, the first network node 111, a gNB-DU, upon detecting, at 801, the RACH configuration conflict for the served cell 121, further: resolves, according to Action 806, the RACH configuration conflict detected for the served cell by determining a new RACH configuration for the served cell, updates, according to Action 807, the RACH configuration of the served cell according to the new RACH configuration, and transmits, according to Action 808, a gNB-DU RACH Configuration Conflict message, or an equivalent message, to at least a second network node 112, the gNB-CU, comprising the new RACH configuration and the identity of the served cell configured with the new RACH configuration. The new RACH configuration may comprise, for instance, RACH resources that may be orthogonal to the RACH resources of the pre-existing RACH configuration used by the served cell in time domain, frequency domain, code domain or a combination thereof. This may need to insure that the RACH conflict with the neighbouring cell is resolved. However, if the RACH configuration selected by the gNB-DU is still subject to a RACH configuration conflict, detected by the gNB-CU as described above, the gNB-CU may fail the procedure with which the gNB-DU updates its cell RACH configuration with an opportune cause value indicating that the configuration generates RACH configuration conflict. The gNB-DU may therefore select yet another configuration until the conflict is resolved. Upon resolving the RACH configuration conflict or upon updating the RACH configuration for the served cell, the gNB-DU may further transmit, according to Action 808, a gNB-DU Configuration Update message to the third network node 113, an OAM node, as illustrated in FIG. 23. It may be clear to the skilled reader that the gNB-DU Configuration Update message may be transmitted to the gNB-CU and OAM in a different order. The implementation of this method may be understood to have the advantage of enabling an efficient detection of a RACH configuration conflict at the gNB-DU and resolving such conflict without any assistance from another network node.

The implementation related to embodiments herein may allow a gNB-DU to efficiently detect a (potential) RACH configuration conflict for a served cell without any assistance from the gNB-CU. The gNB-DU is further enabled to readily update the RACH configuration for the served cell experiencing a RACH configuration conflict, thereby improving the overall system performance when user devices attempt to access the served cell using a random access procedure.

As a summarized view of the foregoing, embodiments herein may be understood to be related to the following examples.

Embodiments herein may be understood to disclose a method executed by the first network node 111, e.g., a gNB-DU, for optimizing the RACH configuration of at least the served cell, the method comprising: detecting the RACH configuration conflict between the RACH configuration of the served cell and the RACH configuration of the neighbouring cell, and changing the RACH configuration for the served cell based on the detection of the RACH configuration conflict.

Embodiments herein may be understood to further disclose a method executed by the second network node 112, e.g., a gNB-CU, the method comprising: receiving a gNB-DU RACH Configuration Conflict message from the gNB-DU associated to the RACH configuration conflict detected by the gNB-DU for the served cell; determining CU RACH assistance information based on the received gNB-DU RACH Configuration Conflict message; and transmitting a gNB-CU Assistance Information message to the gNB-DU gNB-DU RACH Configuration Conflict message comprising CU RACH assistance information associated to the RACH configuration conflict detected by the gNB-DU for the served cell.

Figure 24:
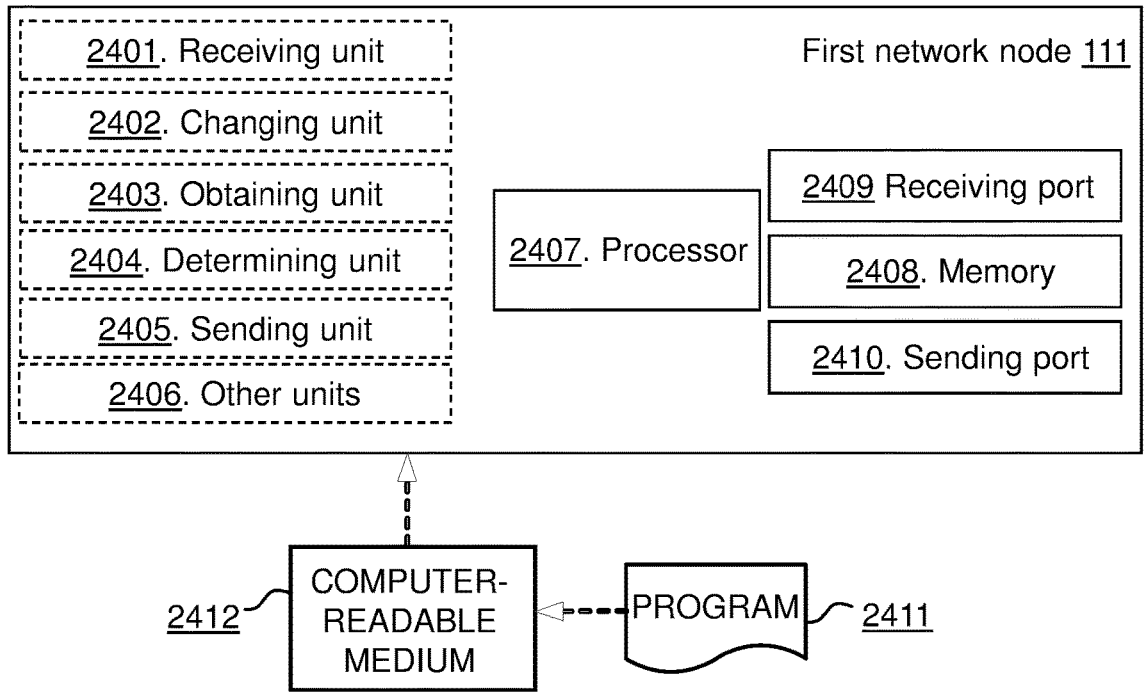
FIG. 24 is a schematic block diagram illustrating two non-limiting examples, a) and b), of a first network node, according to embodiments herein.
Figure 24:
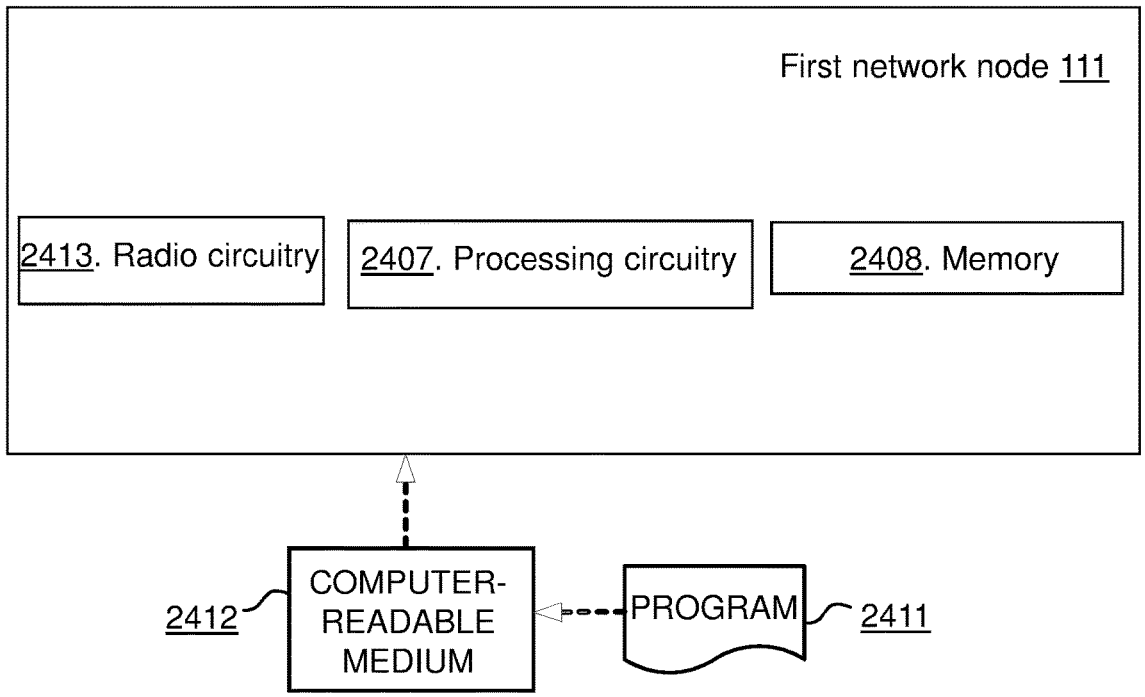

FIG. 24 depicts two different examples in panels a) and b), respectively, of the arrangement that the first network node 111 may comprise. In some embodiments, the first network node 111 may comprise the following arrangement depicted in FIG. 24a. The first network node 111 may be understood to be for handling a RACH, configuration conflict. The first network node 111 is configured to operate in the wireless communications network 100 with a RAT with a split architecture, wherein the first network node 111 is configured to be the DU, and the second network node 112 is configured to be the CU.

Several embodiments are comprised herein. It should be noted that the examples herein are not mutually exclusive. One or more embodiments may be combined, where applicable. All possible combinations are not described to simplify the description. Components from one embodiment may be tacitly assumed to be present in another embodiment and it will be obvious to a person skilled in the art how those components may be used in the other exemplary embodiments. In FIG. 24, optional units are indicated with dashed boxes. The detailed description of some of the following corresponds to the same references provided above, in relation to the actions described for the first network node 111, and will thus not be repeated here. For example, in some embodiments, the first network node 111 may be a gNB-DU. In some embodiments, the second network node 112 may be a gNB-CDU. In some embodiments, the first network node 111 may be a gNB-DU and the second network node 112 may be a gNB-CU.

The first network node 111 is configured to perform the receiving of Action 803, e.g. by means of a receiving unit 2401, configured to receive the one or more indications, also referred to herein as the one or more second indications, from the second network node 112 configured to operate in the wireless communications network 100. The one or more second indications are configured to comprise at least one of: i) the positive acknowledgement or the negative acknowledgement of the RACH configuration conflict configured to be detected between the first RACH configuration in the first cell 121, the first cell 121 being configured to be the served cell by the first network node 111, and the second RACH configuration in the second cell 122, the second cell 122 being configured to be the neighbour cell to the first cell 121, ii) the CU RACH assistance information configured to be associated to the RACH conflict, the CU RACH assistance information being configured to comprise the second RACH configuration, and iii) the first third RACH configuration for the first cell 121. The receiving unit 2401 may be a processor 2407 of the first network node 111, or an application running on such processor.

The first network node 111 is configured to perform the updating, or changing, of Action 807, e.g. by means of a changing unit 2402 within the first network node 111, configured to update the first RACH configuration to the second third RACH configuration, based on the conflict configured to be detected. The second third RACH configuration is configured to be obtained based on the one or more indications configured to be received. The changing unit 2402 may be a processor 2407 of the first network node 111, or an application running on such processor.

In some embodiments, the CU RACH assistance information may be configured to comprise at least one of: i) the set of second RACH configurations of neighbouring cells to the first cell 121 configured to be served by the first network node 111 causing the RACH conflict, ii) the another set of RACH configurations of neighbouring cells to the first cell 121 configured to be served by the first network node 111 for which the RACH conflict is configured to have been detected, wherein the another set of RACH configurations are configured to not cause the RACH conflict and are to be avoided when resolving the RACH conflict for the served cell, and iii) the range of values for one or more RACH resources that are configured to be available to be used by the first network node 111 to resolve the RACH conflict for the served cell 121.

In some embodiments, the first network node 111 may be further configured to perform the obtaining of Action 806, e.g. by means of an obtaining unit 2403, configured to obtain the second third RACH configuration based on the one or more indications configured to be received. The obtaining unit 2403 may be a processor 2407 of the first network node 111, or an application running on such processor.

The first network node 111 may be further configured to perform the detecting of Action 801, e.g. by means of a determining unit 2404 within the first network node 111, configured to detect the existence of the conflict. The determining unit 2404 may be a processor 2407 of the first network node 111, or an application running on such processor.

The first network node 111 may be further configured to perform the sending of Action 802, e.g. by means of a sending unit 2405, configured to send the first indication to the second network node 112. The first indication may be configured to be based on the conflict configured to be detected. The one or more second indications may be configured to be based on the first indication configured to be sent. The sending unit 2405 may be a processor 2407 of the first network node 111, or an application running on such processor.

The first indication may be configured to comprise at least one of: i.) the indication of the detected conflict for the served cell, ii) the identifier of the served cell for which the conflict is configured to have been detected, iii) the request for the second network node 112 to verify the conflict configured to be detected by the first network node 111 for the served cell, and iv) the request to the second network node 112 for RACH assistance information for the conflict for the served cell configured to be detected.

The first network node 111 may be configured to perform the obtaining of Action 804, e.g. by means of the obtaining unit 2403, configured to obtain the first assistance information configured to be based on the conflict configured to be determined.

The first network node 111 may be configured to perform the sending of Action 805, e.g. by means of the sending unit 2405, configured to send the third indication to the second network node 112. The third indication may be configured to be based on the first assistance information configured to be obtained. At least one of the one or more second indications configured to be received may be configured to be based on the third indication configured to be sent.

The first network node 111 may be configured to perform the sending of Action 808, e.g. by means of the sending unit 2405, configured to send the fourth indication to at least one of the second network node 112 further configured to operate in the wireless communications network 100 and the third network node 113 further configured to operate in the wireless communications network 100. The fourth indication may be configured to be based on the second third RACH configuration configured to be obtained, and/or on the first RACH configuration as configured to be updated to the second third RACH configuration by the first network node 111.

In some embodiments, the conflict may be configured to be between the RACH configuration associated to the first SSB beam of the first cell 121 and the another RACH configuration associated to the second SSB beam of the second cell 122.

Other units 2406 may be comprised in the first network node 111.

The embodiments herein in the first network node 111 may be implemented through one or more processors, such as a processor 2407 in the first network node 111 depicted in FIG. 24a, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the first network node 111. One such carrier may be in the form of a CD ROM disc. It is however feasible with other data carriers such as a memory stick. The computer program code may furthermore be provided as pure program code on a server and downloaded to the first network node 111.

The first network node 111 may further comprise a memory 2408 comprising one or more memory units. The memory 2408 is arranged to be used to store obtained information, store data, configurations, schedulings, and applications etc. to perform the methods herein when being executed in the first network node 111.

In some embodiments, the first network node 111 may receive information from, e.g., the second network node 112, or the user equipment described earlier, through a receiving port 2409. In some embodiments, the receiving port 2409 may be, for example, connected to one or more antennas in first network node 111. In other embodiments, the first network node 111 may receive information from another structure in the wireless communications network 100 through the receiving port 2409. Since the receiving port 2409 may be in communication with the processor 2407, the receiving port 2409 may then send the received information to the processor 2407. The receiving port 2409 may also be configured to receive other information.

The processor 2407 in the first network node 111 may be further configured to transmit or send information to e.g., the second network node 112, the user equipment, or the third network node 113, or another structure in the wireless communications network 100, through a sending port 2410, which may be in communication with the processor 2407, and the memory 2408.

Those skilled in the art will also appreciate that the receiving unit 2401, the changing unit 2402, the obtaining unit 2403, the determining unit 2404, the sending unit 2405, and the other units 2406 described above may refer to a combination of analog and digital circuits, and/or one or more processors configured with software and/or firmware, e.g., stored in memory, that, when executed by the one or more processors such as the processor 2407, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different units 2401-2406 described above may be implemented as one or more applications running on one or more processors such as the processor 2407.

Thus, the methods according to the embodiments described herein for the first network node 111 may be respectively implemented by means of a computer program 2411 product, comprising instructions, i.e., software code portions, which, when executed on at least one processor 2407, cause the at least one processor 2407 to carry out the actions described herein, as performed by the first network node 111. The computer program 2411 product may be stored on a computer-readable storage medium 2412. The computer-readable storage medium 2412, having stored thereon the computer program 2411, may comprise instructions which, when executed on at least one processor 2407, cause the at least one processor 2407 to carry out the actions described herein, as performed by the first network node 111. In some embodiments, the computer-readable storage medium 2412 may be a non-transitory computer-readable storage medium, such as a CD ROM disc, or a memory stick. In other embodiments, the computer program 2411 product may be stored on a carrier containing the computer program 2411 just described, wherein the carrier is one of an electronic signal, optical signal, radio signal, or the computer-readable storage medium 2412, as described above.

The first network node 111 may comprise a communication interface configured to facilitate communications between the first network node 111 and other nodes or devices, e.g., the second network node 112, the user equipment, the third network node 113, or another structure. The interface may, for example, include a transceiver configured to transmit and receive radio signals over an air interface in accordance with a suitable standard.

In other embodiments, the first network node 111 may comprise the following arrangement depicted in FIG. 24*b*. The first network node 111 may comprise a processing circuitry 2407, e.g., one or more processors such as the processor 2407, in the first network node 111 and the memory 2408. The first network node 111 may also comprise a radio circuitry 2413, which may comprise e.g., the receiving port 2409 and the sending port 2410. The processing circuitry 2407 may be configured to, or operable to, perform the method actions according to FIG. 8, FIGS. 10-23 and/or FIGS. 29-33, in a similar manner as that described in relation to FIG. 24*a*. The radio circuitry 2413 may be configured to set up and maintain at least a wireless connection with the second network node 112, the user equipment, the third network node 113, or another structure. Circuitry may be understood herein as a hardware component.

Hence, embodiments herein also relate to the first network node 111 operative to operate in the wireless communications network 100. The first network node 111 may comprise the processing circuitry 2407 and the memory 2408, said memory 2408 containing instructions executable by said processing circuitry 2407, whereby the first network node 111 is further operative to perform the actions described herein in relation to the first network node 111, e.g., in FIG. 8, FIGS. 10-23 and/or FIGS. 29-33.

Figure 25:
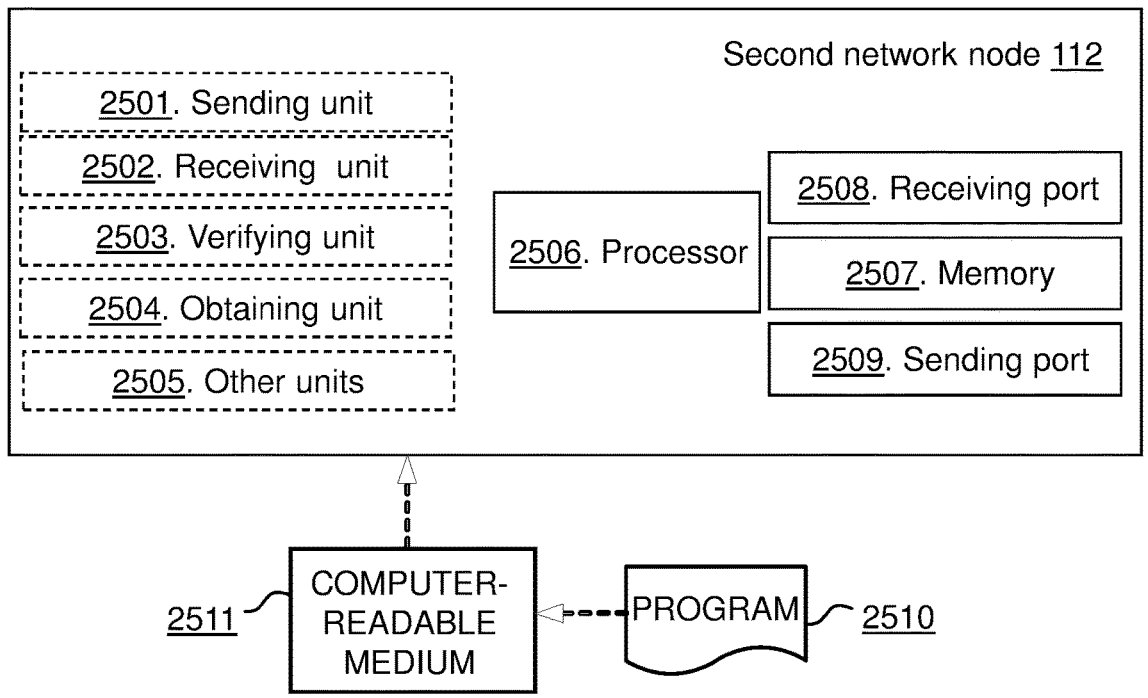
FIG. 25 is a schematic block diagram illustrating two non-limiting examples, a) and b), of a second network node, according to embodiments herein.
Figure 25:
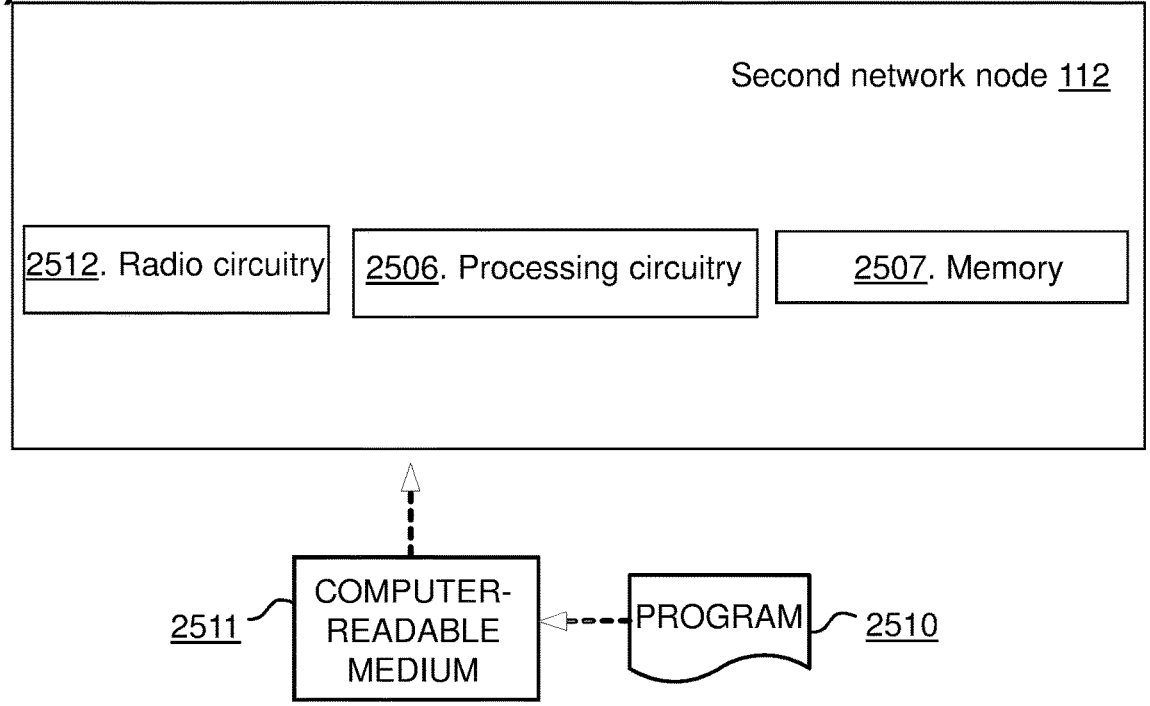

FIG. 25 depicts two different examples in panels a) and b), respectively, of the arrangement that the second network node 112 may comprise. In some embodiments, the second network node 112 may comprise the following arrangement depicted in FIG. 25*a*. The second network node 112 may be understood to be for handling a RACH configuration conflict. The second network node 112 is configured to operate in the wireless communications network 100 with the RAT with the split architecture, wherein the second network node 112 is configured to be the CU, and the first network node 111 is configured to be the DU.

Several embodiments are comprised herein. It should be noted that the examples herein are not mutually exclusive. One or more embodiments may be combined, where applicable. All possible combinations are not described to simplify the description. Components from one embodiment may be tacitly assumed to be present in another embodiment and it will be obvious to a person skilled in the art how those components may be used in the other exemplary embodiments. In FIG. 25, optional units are indicated with dashed boxes. The detailed description of some of the following corresponds to the same references provided above, in relation to the actions described for the first network node 111, and will thus not be repeated here. For example, in some embodiments, the second network node 112 may be a gNB-CU. In some embodiments, the first network node 111 may be a gNB-DU. In some embodiments, the first network node 111 may be a gNB-DU and the second network node 112 may be a gNB-CU.

The second network node 112 is configured to perform the sending of Action 904, e.g. by means of a sending unit 2501, configured to send the one or more indications, also referred to as the one or more second indications, to the first network node 111 configured to operate in the wireless communications network 100. The one or more second indications are configured to comprise at least one of: i) the positive acknowledgement or the negative acknowledgement of the RACH configuration conflict between the first RACH configuration in the first cell 121, the first cell 121 being configured to be the served cell by the first network node 111, and the second RACH configuration in the second cell 122, the second cell 122 being configured to be the neighbour cell to the first cell 121, ii) the CU RACH assistance information configured to be associated to the RACH conflict, the CU RACH assistance information being configured to comprise the second RACH configuration, and iii) the first third RACH configuration for the first cell 121. The sending unit 2501 may be a processor 2506 of the second network node 112, or an application running on such processor.

In some embodiments, the CU RACH assistance information may be configured to comprise at least one of: i) the set of second RACH configurations of neighbouring cells to the first cell 121 configured to be served by the first network node 111 causing the RACH conflict, ii) the another set of RACH configurations of neighbouring cells to the first cell 121 configured to be served by the first network node 111 for which the RACH conflict is configured to have been detected, wherein the another set of RACH configurations are configured to not cause the RACH conflict and are to be avoided when resolving the RACH conflict for the served cell, and iii) the range of values for one or more RACH resources that are configured to be available to be used by the first network node 111 to resolve the RACH conflict for the served cell 121.

The second network node 112 may be configured to perform the receiving of Action 901, e.g. by means of a receiving unit 2502 within the second network node 112, configured to receive the first indication from the first network node 111. The first indication may be configured to be based on the conflict between the first RACH configuration, and the second RACH configuration. The receiving unit 2502 may be a processor 2506 of the second network node 112, or an application running on such processor.

The first indication may be configured to comprise at least one of: i.) the indication of the conflict for the served cell configured to be detected, ii) the identifier of the served cell for which the conflict is configured to have been detected, iii) the request for the second network node 112 to verify the conflict configured to be detected by the first network node 111 for the served cell, and iv) the request to the second network node 112 for RACH assistance information for the conflict configured to be detected by the first network node 111 for the served cell.

In some embodiments, the second network node 112 may be configured to perform the verifying of Action 902, e.g. by means of a verifying unit 2503, configured to verify the existence of the conflict based on the first indication configured to be received. At least one of the one or more second indications configured to be sent may be configured to be based on a result of the verification The verifying unit 2503 may be a processor 2506 of the second network node 112, or an application running on such processor.

In some embodiments, the second network node 112 may be configured to perform the obtaining of Action 903, e.g. by means of an obtaining unit 2504, configured to obtain the second assistance information based on the first indication configured to be received. At least one of the one or more second indications configured to be sent may be configured to be based on the second assistance information configured to be obtained. The obtaining unit 2504 may be a processor 2506 of the second network node 112, or an application running on such processor.

The second network node 112 may be configured to perform the obtaining of Action 906, e.g. by means of the obtaining unit 2504, configured to obtain the first third RACH configuration based on the first indication, to change the first RACH configuration to the first third RACH configuration. At least one of the one or more second indications configured to be sent may be configured to be based on the first third RACH configuration configured to be obtained.

At least one of the one or more second indications may be configured to indicate the first third RACH configuration.

The second network node 112 may be configured to perform the receiving of Action 905, e.g. by means of the receiving unit 2502, configured to receive the third indication from the first network node 111. The third indication may be configured to be based on the first assistance information. At least one of the one or more second indications configured to be sent may be configured to be based on the third indication configured to be received.

The second network node 112 may be configured to perform the receiving of Action 907, e.g. by means of the receiving unit 2502, configured to receive the fourth indication from the first network node 111. The fourth indication may be configured to be based on the second third RACH configuration, and/or on the first RACH configuration as configured to be updated to the first third RACH configuration or the second third RACH configuration by the first network node 111.

In some embodiments, the conflict may be configured to be between the RACH configuration configured to be associated to the first SSB beam of the first cell 121 and another RACH configuration configured to be associated to the second SSB beam of the second cell 122.

Other units 2505 may be comprised in the second network node 112.

The embodiments herein in the second network node 112 may be implemented through one or more processors, such as a processor 2506 in the second network node 112 depicted in FIG. 25a, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the second network node 112. One such carrier may be in the form of a CD ROM disc. It is however feasible with other data carriers such as a memory stick. The computer program code may furthermore be provided as pure program code on a server and downloaded to the second network node 112.

The second network node 112 may further comprise a memory 2507 comprising one or more memory units. The memory 2507 is arranged to be used to store obtained information, store data, configurations, schedulings, and applications etc. to perform the methods herein when being executed in the second network node 112.

In some embodiments, the second network node 112 may receive information from, e.g., the first network node 111, the user equipment or the third network node 113, through a receiving port 2508. In some embodiments, the receiving port 2508 may be, for example, connected to one or more antennas in second network node 112. In other embodiments, the second network node 112 may receive information from another structure in the wireless communications network 100 through the receiving port 2508. Since the receiving port 2508 may be in communication with the processor 2506, the receiving port 2508 may then send the received information to the processor 2506. The receiving port 2508 may also be configured to receive other information.

The processor 2506 in the second network node 112 may be further configured to transmit or send information to e.g., the first network node 111, the third network node 113, the user equipment, or another structure in the wireless communications network 100, through a sending port 2509, which may be in communication with the processor 2506, and the memory 2507.

Those skilled in the art will also appreciate that the sending unit 2501, the receiving unit 2502, the verifying unit 2503, the obtaining unit 2504, and the other units 2505 described above may refer to a combination of analog and digital circuits, and/or one or more processors configured with software and/or firmware, e.g., stored in memory, that, when executed by the one or more processors such as the processor 2506, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different units 2501-2505 described above may be implemented as one or more applications running on one or more processors such as the processor 2506.

Thus, the methods according to the embodiments described herein for the second network node 112 may be respectively implemented by means of a computer program 2510 product, comprising instructions, i.e., software code portions, which, when executed on at least one processor 2506, cause the at least one processor 2506 to carry out the actions described herein, as performed by the second network node 112. The computer program 2510 product may be stored on a computer-readable storage medium 2511. The computer-readable storage medium 2511, having stored thereon the computer program 2510, may comprise instructions which, when executed on at least one processor 2506, cause the at least one processor 2506 to carry out the actions described herein, as performed by the second network node 112. In some embodiments, the computer-readable storage medium 2511 may be a non-transitory computer-readable storage medium, such as a CD ROM disc, or a memory stick. In other embodiments, the computer program 2510 product may be stored on a carrier containing the computer program 2510 just described, wherein the carrier is one of an electronic signal, optical signal, radio signal, or the computer-readable storage medium 2511, as described above.

The second network node 112 may comprise a communication interface configured to facilitate communications between the second network node 112 and other nodes or devices, e.g., the first network node 111, the third network node 113, the user equipment or another structure. The interface may, for example, include a transceiver configured to transmit and receive radio signals over an air interface in accordance with a suitable standard.

In other embodiments, the second network node 112 may comprise the following arrangement depicted in FIG. 25b. The second network node 112 may comprise a processing circuitry 2506, e.g., one or more processors such as the processor 2506, in the second network node 112 and the memory 2507. The second network node 112 may also comprise a radio circuitry 2512, which may comprise e.g., the receiving port 2508 and the sending port 2509. The processing circuitry 2506 may be configured to, or operable to, perform the method actions according to FIG. 9, FIG. 12-23 and/or FIGS. 29-33, in a similar manner as that described in relation to FIG. 25a. The radio circuitry 2512 may be configured to set up and maintain at least a wireless connection with the first network node 111, the user equipment, the third network node 113, or another structure. Circuitry may be understood herein as a hardware component.

Hence, embodiments herein also relate to the second network node 112 operative to operate in the wireless communications network 100. The second network node 112 may comprise the processing circuitry 2506 and the memory 2507, said memory 2507 containing instructions executable by said processing circuitry 2506, whereby the second network node 112 is further operative to perform the actions described herein in relation to the second network node 112, e.g., in FIG. 9, FIG. 12-23 and/or FIGS. 29-33.

As used herein, the expression "at least one of:" followed by a list of alternatives separated by commas, and wherein the last alternative is preceded by the "and" term, may be understood to mean that only one of the list of alternatives may apply, more than one of the list of alternatives may apply or all of the list of alternatives may apply. This expression may be understood to be equivalent to the expression "at least one of:" followed by a list of alternatives separated by commas, and wherein the last alternative is preceded by the "or" term.

When using the word "comprise" or "comprising" it shall be interpreted as non-limiting, i.e. meaning "consist at least of".

A processor may be understood herein as a hardware component.

The embodiments herein are not limited to the above described preferred embodiments. Various alternatives, modifications and equivalents may be used. Therefore, the above embodiments should not be taken as limiting the scope of the invention.

It should be noted that the names "gNB-DU RACH Configuration Conflict message", "gNB-CU Assistance Information message", as well as names of other messages exchanged between the two network nodes according to embodiments of the methods, are used as examples. Such a message may consist of an existing message enhanced to carry the information described herein, such as the gNB-DU Configuration Update message over the F1 interface, or it may be a new message.

Examples Related to Embodiments Herein

Some other examples related to embodiments herein will now be described.

Several embodiments are comprised herein. It should be noted that the examples herein are not mutually exclusive. Components from one embodiment may be tacitly assumed to be present in another embodiment and it will be obvious to a person skilled in the art how those components may be used in the other exemplary embodiments.

More specifically, the following are embodiments related to a first network node, such as the first network node 111, e.g., a gNB-DU, and embodiments related to a second network node, such as the second network node 112, e.g., a gNB-CU. The first network node embodiments relate to FIG. 26, FIG. 24 and Figures QQ5-QQ9.

A method, performed by a first network node, such as the first network node 111, is described herein. The method may be understood to be for handling a Random Access Channel (RACH) configuration. The first network node 111 may operate in the wireless communications network 100.

Figure 26:
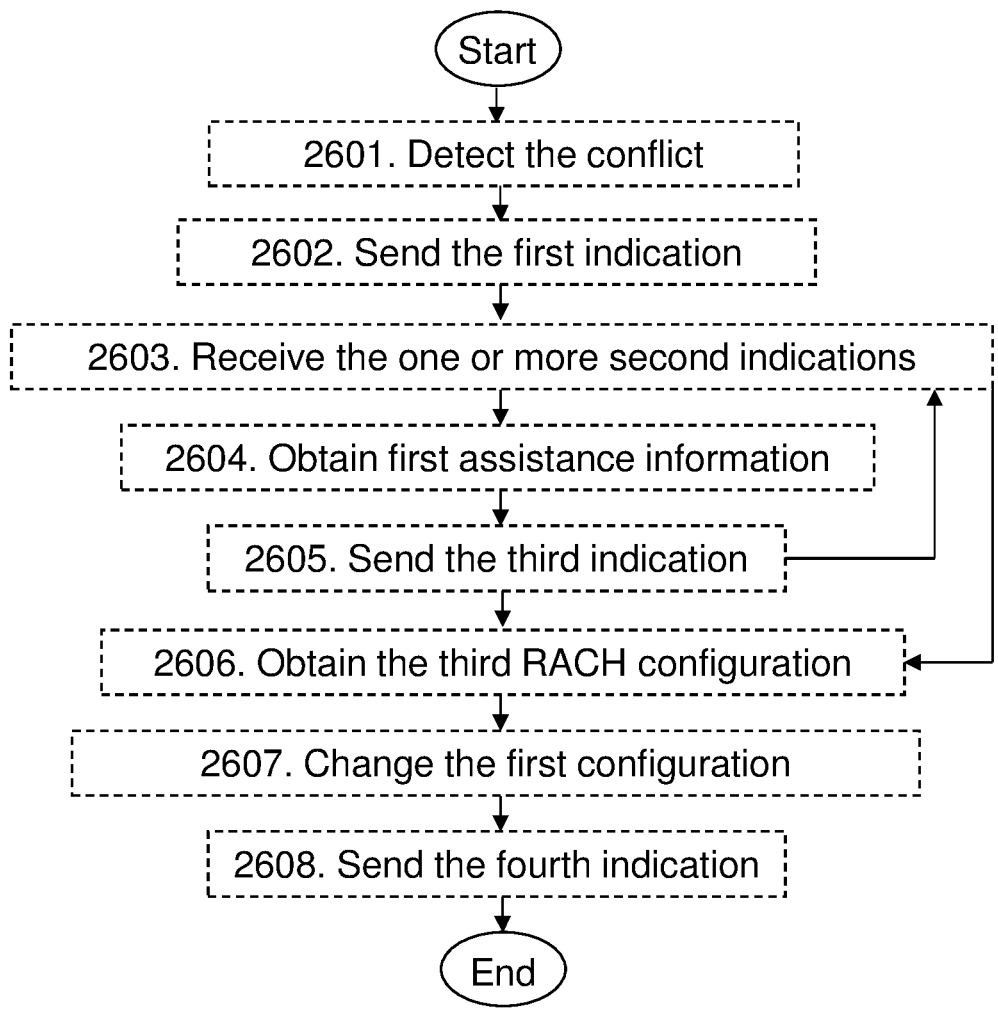
FIG. 26 is a flowchart depicting an example of a method in a first network node, according to examples related to embodiments herein.

Several embodiments are comprised herein. In some embodiments all the actions may be performed. In some embodiments, one or more actions may be performed. It should be noted that the examples herein are not mutually exclusive. One or more embodiments may be combined, where applicable. All possible combinations are not described to simplify the description. Components from one embodiment may be tacitly assumed to be present in another embodiment and it will be obvious to a person skilled in the art how those components may be used in the other exemplary embodiments. A non-limiting example of the method performed by the first network node 111 is depicted in FIG. 26. Some actions may be performed in a different order than that shown in FIG. 26. Some of the actions may be performed more than once, e.g., iteratively.

In some embodiments, the first network node 111 may be a gNB-DU.

In some embodiments, the second network node 112 may be a gNB-CU.

In some embodiments, the first network node 111 may be a gNB-DU and the second network node 112 may be a gNB-CU.

Detecting 2601, or determining an existence of, a conflict. The conflict may be between a first RACH configuration, e.g., in the first cell 121, the first cell 121 being a served cell, and a second RACH configuration, e.g., in a second cell 122, the second cell 122 being a neighbour cell to the first cell 121. The first network node 111 may be configured to perform this detecting 2601 action, e.g. by means of a determining unit 2401 within the first network node 111, configured to perform this action. The determining unit 2401 may be a processor 2407 of the first network node 111, or an application running on such processor.

Determining may be understood as calculating, or deriving.

Changing 2607, or updating, the first RACH configuration to a third RACH configuration, based on the detected conflict. The first network node 111 may be configured to perform this changing action 2607, e.g. by means of a changing unit 2402, configured to perform this action. The changing unit 2402 may be a processor 2407 of the first network node 111, or an application running on such processor.

Obtaining 2606 the third RACH configuration. The first network node 111 may be configured to perform this obtaining action 2606, e.g. by means of an obtaining unit 2403, configured to perform this action. The obtaining unit 2403 may be a processor 2407 of the first network node 111, or an application running on such processor.

Obtaining may be understood as determining, calculating, deriving, retrieving, or receiving, e.g., via the first link 141.

Sending 2602 a first indication to a second network node, such as the second network node 112 operating in the wireless communications network 100. The first network node 111 may be configured to perform this sending action 2602, e.g. by means of a sending unit 2404, configured to perform this action. The sending unit 2404 may be a processor 2407 of the first network node 111, or an application running on such processor.

The first indication may be based on the detected/determined conflict.

Sending may be understood as transmitting, or providing, e.g., via the first link 141.

Receiving 2603 one or more second indications from the second network node 112. The first network node 111 may be configured to perform this receiving action 2603, e.g. by means of a receiving unit 2405, configured to perform this action. The receiving unit 2405 may be a processor 2407 of the first network node 111, or an application running on such processor.

The one or more second indications may be based on the sent first indication. The third RACH configuration may be obtained based on the received one or more second indications.

In some embodiments, one of:
the second indication may indicate the third RACH configuration, and
the third RACH configuration may be obtained based on the one or more second indications.

Obtaining 2604 first assistance information. The first network node 111 may be configured to perform this obtaining action 2604, e.g. by means of the obtaining unit 2403, configured to perform this action.

The first assistance information may be based on the determined conflict.

Sending 2605 a third indication to the second network node 112. The first network node 111 may be configured to perform this sending action 2605, e.g. by means of the sending unit 2404, configured to perform this action.

The third indication may be based on the obtained first assistance information. At least one of the received one or more second indications may be based on the sent third indication.

Sending 2608 a fourth indication to at least one of the second network node 112 and the third network node 113 operating in the wireless communications network 100. The first network node 111 may be configured to perform this sending action 2608, e.g. by means of the sending unit 2404, configured to perform this action.

The fourth indication may be based on the obtained third RACH configuration, and/or on the first RACH configuration as changed/updated to the third RACH configuration by the first network node 111.

Sending in this Action 2608 may be performed, e.g., via the first link 141 and/or via the second link 142.

Examples of these actions and the indications are provided later in this document.

Other units 2406 may be comprised in the first network node 111.

The first network node 111 may also be configured to communicate user data with a host application unit in a host computer QQ510, e.g., via another link such as QQ550.

In FIG. 24, optional units are indicated with dashed boxes.

The first network node 111 may comprise an interface unit to facilitate communications between the first network node 111 and other nodes or devices, e.g., the second network node 112, the user equipment, the host computer QQ510, or any other nodes. In some particular examples, the interface may, for example, include a transceiver configured to transmit and receive radio signals over an air interface in accordance with a suitable standard.

The first network node 111 may comprise an arrangement as shown in FIG. 24 or in Figure QQ5.

Figure 27:
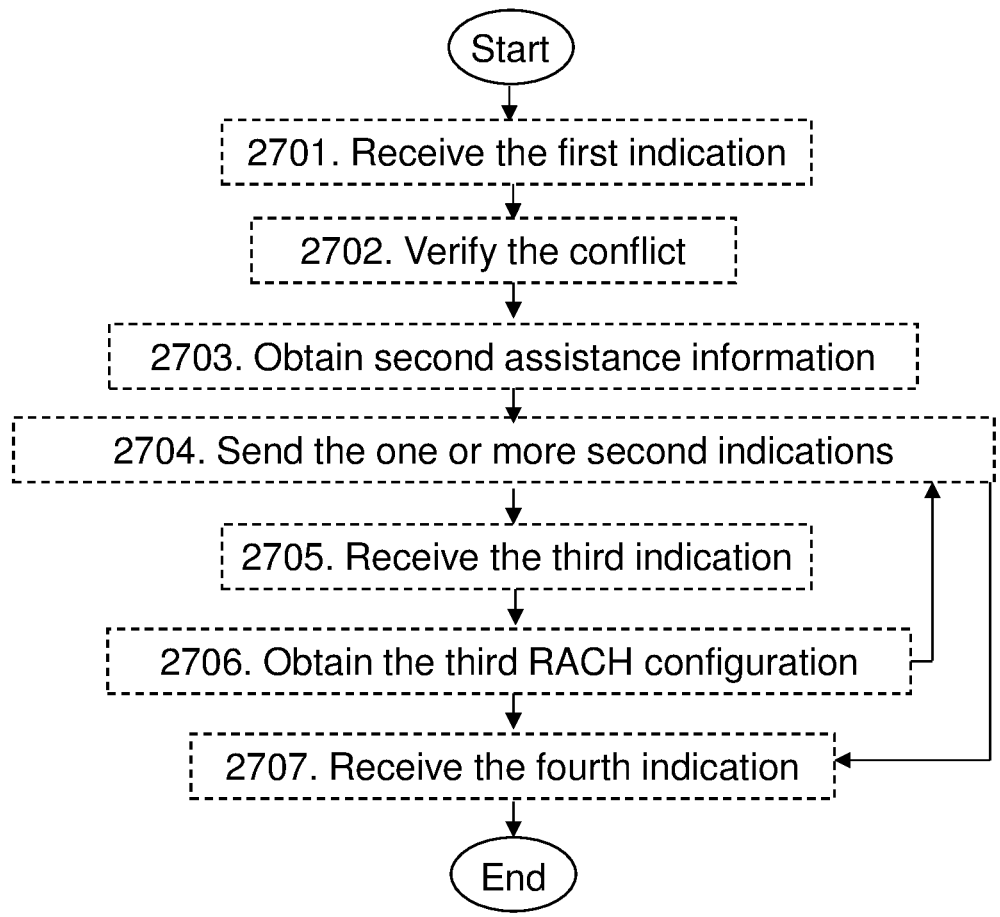
FIG. 27 is a flowchart depicting an example of a method in a second network node, according to examples related to embodiments herein.

The first network node embodiments relate to FIG. 27, FIG. 25 and Figures QQ5-QQ9.

A method, performed by a second network node, such as the second network node 112, is described herein. The method may be understood to be for handling a Random Access Channel (RACH) configuration. The second network node 112 may operate in the wireless communications network 100.

Several embodiments are comprised herein. In some embodiments all the actions may be performed. In some embodiments, one or more actions may be performed. It should be noted that the examples herein are not mutually exclusive. One or more embodiments may be combined, where applicable. All possible combinations are not described to simplify the description. Components from one embodiment may be tacitly assumed to be present in another embodiment and it will be obvious to a person skilled in the art how those components may be used in the other exemplary embodiments. A non-limiting example of the method performed by the second network node 112 is depicted in FIG. 27. Some actions may be performed in a different order than that shown in FIG. 27. Some of the actions may be performed more than once, e.g., iteratively.

In some embodiments, the second network node 112 may be a gNB-CU.

In some embodiments, the first network node 111 may be a gNB-DU.

In some embodiments, the first network node 111 may be a gNB-DU and the second network node 112 may be a gNB-CU.

Receiving 2701 the first indication from a first network node such as the first network node 111 operating in the wireless communications network 100. The second network node 112 may be configured to perform this receiving 2701 action, e.g. by means of a receiving unit 2501 within the second network node 112, configured to perform this action. The receiving unit 2501 may be a processor 2506 of the second network node 112, or an application running on such processor.

The first indication may be based on the conflict between the first RACH configuration in the first cell 121, the first cell 121 being a served cell, and the second RACH configuration in the second cell 122, the second cell 122 being a neighbour cell to the first cell 121.

Receiving may be performed, e.g., via the first link 141.

Sending 2704 the one or more second indications to the first network node 111. The second network node 112 may be configured to perform this sending action 2704, e.g. by means of a sending unit 2502, configured to perform this action. The sending unit 2502 may be a processor 2506 of the second network node 112, or an application running on such processor.

Sending may be understood as transmitting, or providing, e.g., via the first link 141.

The one or more second indications may be based on the received first indication.

Verifying 2702 an existence of the conflict based on the received first indication. The second network node 112 may be configured to perform this verifying action 2702, e.g. by means of a verifying unit 2503, configured to perform this action. The verifying unit 2503 may be a processor 2506 of the second network node 112, or an application running on such processor.

At least one of the sent one or more second indications may be based on a result of the verification.

Obtaining 2703 second assistance information. The second network node 112 may be configured to perform this obtaining action 2703, e.g. by means of an obtaining unit 2504, configured to perform this action. The obtaining unit 2504 may be a processor 2506 of the second network node 112, or an application running on such processor.

The obtaining in this Action 2602 may be based on the received first indication. At least one of the sent one or more second indications may be based on the obtained second assistance information.

Obtaining may be understood as determining, calculating, deriving, retrieving, or receiving, e.g., via the first link 141.

Obtaining 2706 the third RACH configuration. The second network node 112 may be configured to perform this obtaining action 2706, e.g. by means of the obtaining unit 2504, configured to perform this action.

The obtaining in this Action 2706 may be based on the first indication. The third RACH configuration may be to change update the first RACH configuration to the third RACH configuration. At least one of the sent one or more second indications may be based on the obtained third RACH configuration.

In some embodiments, at least one of the one or more second indications may indicate the third RACH configuration.

Receiving 2705 the third indication from the first network node 111. The second network node 112 may be configured to perform this receiving action 2705, e.g. by means of the receiving unit 2501, configured to perform this action.

The third indication and/or the receiving 2705 may be based on the first assistance information. At least one of the sent one or more second indications may be based on the received third indication Receiving 2707 the fourth indication from the first network node 111.

The second network node 112 may be configured to perform this receiving action 2707, e.g. by means of the receiving unit 2501, configured to perform this action.

The fourth indication may be based on the third RACH configuration, and/or on the first RACH configuration as changed/updated to the third RACH configuration by the first network node 111.

Examples of these actions and the indications are provided later in this document.

Other units 2505 may be comprised in the second network node 112.

The second network node 112 may also be configured to communicate user data with a host application unit in a host computer QQ510, e.g., via another link such as QQ550.

In FIG. 25, optional units are indicated with dashed boxes.

The second network node 112 may comprise an interface unit to facilitate communications between the second network node 112 and other nodes or devices, e.g., the second network node 112, the user equipment, the host computer QQ510, or any other nodes. In some particular examples, the interface may, for example, include a transceiver configured to transmit and receive radio signals over an air interface in accordance with a suitable standard.

The second network node 112 may comprise an arrangement as shown in FIG. 25 or in Figure QQ5.

Some examples related to embodiments herein may be as follows.

Example 1. A method performed by a first network node (111), the method being for handling a Random Access Channel, RACH, configuration, the first network node (111) operating in a wireless communications network (100), the method comprising:

detecting/determining an existence of (2601) a conflict between a first RACH configuration in a first cell (121), the first cell (121) being a served cell, and a second RACH configuration in a second cell (122), the second cell (122) being a neighbour cell to the first cell (121), and changing/updating (2607) the first RACH configuration to a third RACH configuration, based on the detected conflict.

Example 2. The method according to example 1, the method further comprising:
  obtaining (2606) the third RACH configuration.
Example 3. The method according to any of examples 1-2, the method further comprising:
  sending (2602) a first indication to a second network node (112) operating in the wireless communications network (100), the first indication being based on the detected/determined conflict.
Example 4. The method according to example 3, the method further comprising:
  receiving (2603) one or more second indications from the second network node (112), the one or more second indications being based on the sent first indication, and wherein the third RACH configuration is obtained based on the received one or more second indications.
Example 5. The method according to example 4, wherein one of:
  the second indication indicates the third RACH configuration, and
  the third RACH configuration is obtained based on the one or more second indications.
Example 6. The method according to any of examples 4-5, the method further comprising:
  obtaining (2604) first assistance information based on the determined conflict, and
  sending (2605) a third indication to the second network node (112), the third indication being based on the obtained first assistance information and wherein at least one of the received one or more second indications is based on the sent third indication.
Example 7. The method according to any of examples 1-6, the method further comprising:
  sending (2608) a fourth indication to at least one of a second network node (112) operating in the wireless communications network (100) and a third network node (113) operating in the wireless communications network (100), the fourth indication being based on the obtained third RACH configuration, and/or on the first RACH configuration as changed/updated to the third RACH configuration by the first network node (111).
Example 8. A method performed by a second network node (112), the method being for handling a Random Access Channel, RACH, configuration, the second network node (112) operating in a wireless communications network (100), the method comprising:
  receiving (2701) a first indication from a first network node (111) operating in the wireless communications network (100), the first indication being based on a conflict between a first RACH configuration in a first cell (121), the first cell (121) being a served cell, and a second RACH configuration in a second cell (122), the second cell (122) being a neighbour cell to the first cell (121), and
  sending (2704) one or more second indications to the first network node (111), the one or more second indications being based on the received first indication.
Example 9. The method according to example 8, the method further comprising:
  verifying (2702) an existence of the conflict based on the received first indication, and wherein at least one of the sent one or more second indications are based on a result of the verification.
Example 10. The method according to any of examples 8-9, the method further comprising:
  obtaining (2703) second assistance information based on the received first indication, and wherein at least one of the sent one or more second indications are based on the obtained second assistance information.
Example 11. The method according to any of examples 8-10, the method further comprising:
  obtaining (2706) a third RACH configuration based on the first indication, to change update the first RACH configuration to the third RACH configuration, wherein at least one of the sent one or more second indications are based on the obtained third RACH configuration.
Example 12. The method according to example 11, wherein at least one of the one or more second indications indicates the third RACH configuration.
Example 13. The method according to any of examples 8-12, the method further comprising:
  receiving (2705) a third indication from the first network node (111), the third indication being based on first assistance information and wherein at least one of the sent one or more second indications is based on the received third indication.
Example 14. The method according to any of examples 1-6, the method further comprising:
  receiving (2707) a fourth indication from the first network node (111), the fourth indication being based on the third RACH configuration, and/or on the first RACH configuration as changed/updated to the third RACH configuration by the first network node (111).

Further Extensions and Variations

Figure 28:
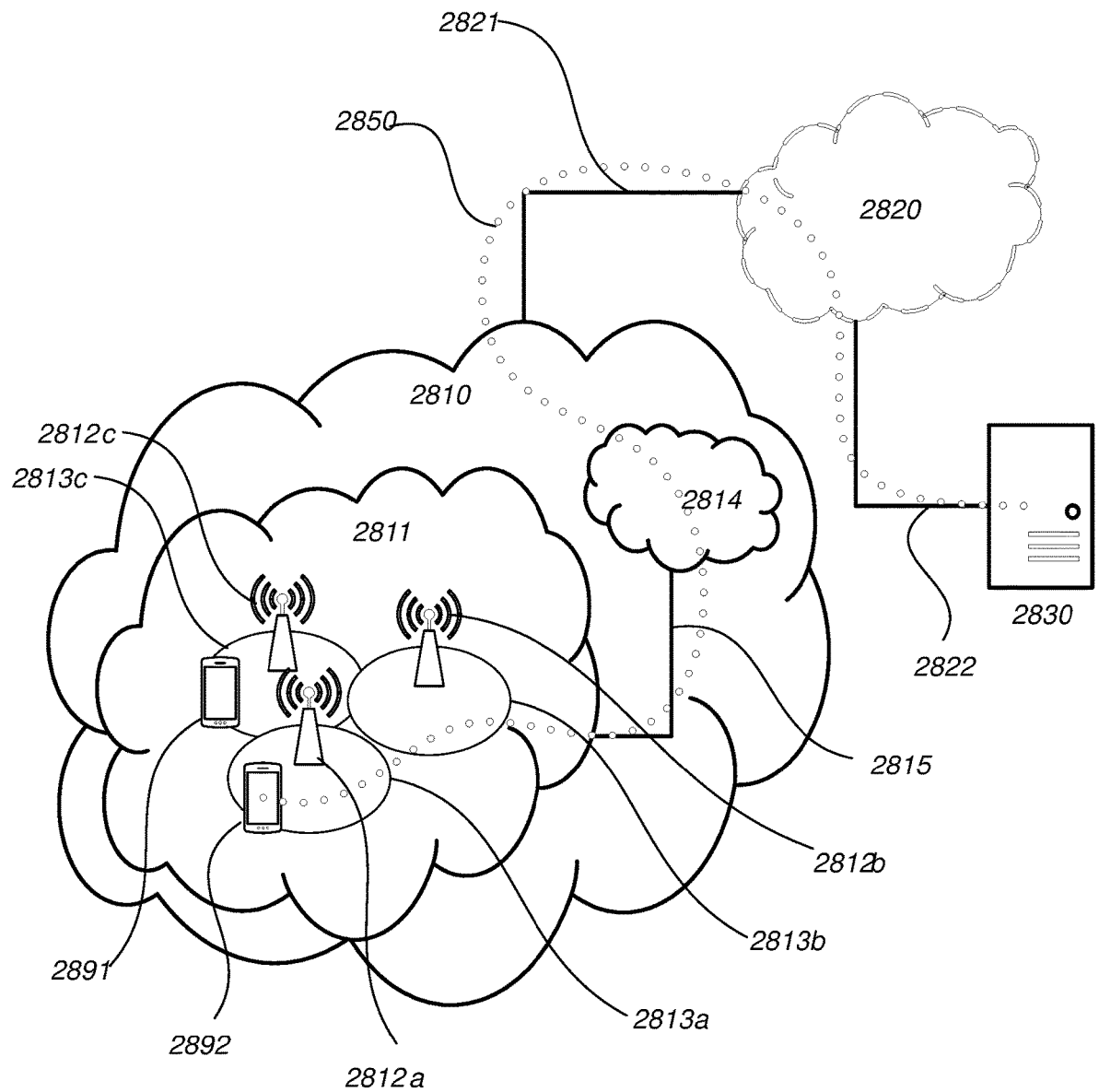
FIG. 28 is a schematic block diagram illustrating a telecommunication network connected via an intermediate network to a host computer, according to embodiments herein.

FIG. 28: Telecommunication Network Connected Via an Intermediate Network to a Host Computer in Accordance with Some Embodiments With reference to FIG. 28, in accordance with an embodiment, a communication system includes telecommunication network 2810 such as the wireless communications network 100, for example, a 3GPP-type cellular network, which comprises access network 2811, such as a radio access network, and core network 2814. Access network 2811 comprises a plurality of network nodes such as the network node 110, which may comprise any or both of the first network node 111 and the second network node 112. For example, base stations 2812a, 2812b, 2812c, such as NBs, eNBs, gNBs or other types of wireless access points, each defining a corresponding coverage area 2813a, 2813b, 2813c. Each base station 2812a, 2812b, 2812c is connectable to core network 2814 over a wired or wireless connection 2815. A plurality of wireless devices, such as the user equipment mentioned earlier in the description of FIG. 7, which will be referred to herein as the user equipment 130, are comprised in the wireless communications network 100. In FIG. 28, a first UE 2891 located in coverage area 2813c is configured to wirelessly connect to, or be paged by, the corresponding base station 2812c. A second UE 2892 in coverage area 2813a is wirelessly connectable to the corresponding base station 2812a. While a plurality of UEs 2891, 2892 are illustrated in this example, the disclosed embodiments are equally applicable to a situation where a sole UE is in the coverage area or where a sole UE is connecting to the corresponding base station 2812. Any of the UEs 2891, 2892 are examples of the user equipment 130.

Telecommunication network 2810 is itself connected to host computer 2830, which may be embodied in the hardware and/or software of a standalone server, a cloud-implemented server, a distributed server or as processing resources in a server farm. Host computer 2830 may be under the ownership or control of a service provider, or may be operated by the service provider or on behalf of the service provider. Connections 2821 and 2822 between telecommunication network 2810 and host computer 2830 may extend directly from core network 2814 to host computer 2830 or may go via an optional intermediate network 2820. Intermediate network 2820 may be one of, or a combination of more than one of, a public, private or hosted network; intermediate network 2820, if any, may be a backbone network or the Internet; in particular, intermediate network 2820 may comprise two or more sub-networks (not shown).

The communication system of FIG. 28 as a whole enables connectivity between the connected UEs 2891, 2892 and host computer 2830. The connectivity may be described as an over-the-top (OTT) connection 2850. Host computer 2830 and the connected UEs 2891, 2892 are configured to communicate data and/or signaling via OTT connection 2850, using access network 2811, core network 2814, any intermediate network 2820 and possible further infrastructure (not shown) as intermediaries. OTT connection 2850 may be transparent in the sense that the participating communication devices through which OTT connection 2850 passes are unaware of routing of uplink and downlink communications. For example, base station 2812 may not or need not be informed about the past routing of an incoming downlink communication with data originating from host computer 2830 to be forwarded (e.g., handed over) to a connected UE 2891. Similarly, base station 2812 need not be aware of the future routing of an outgoing uplink communication originating from the UE 2891 towards the host computer 2830.

In relation to FIGS. 29, 30, 31, 32, and 33, which are described next, it may be understood that a UE is an example of the user equipment 130, and that any description provided for the UE equally applies to the user equipment 130. It may be also understood that the base station is an example of the network node 110, and that any description provided for the base station equally applies to the network node 110, which may comprise any or both of the first network node 111 and the second network node 112.

Figure 29:
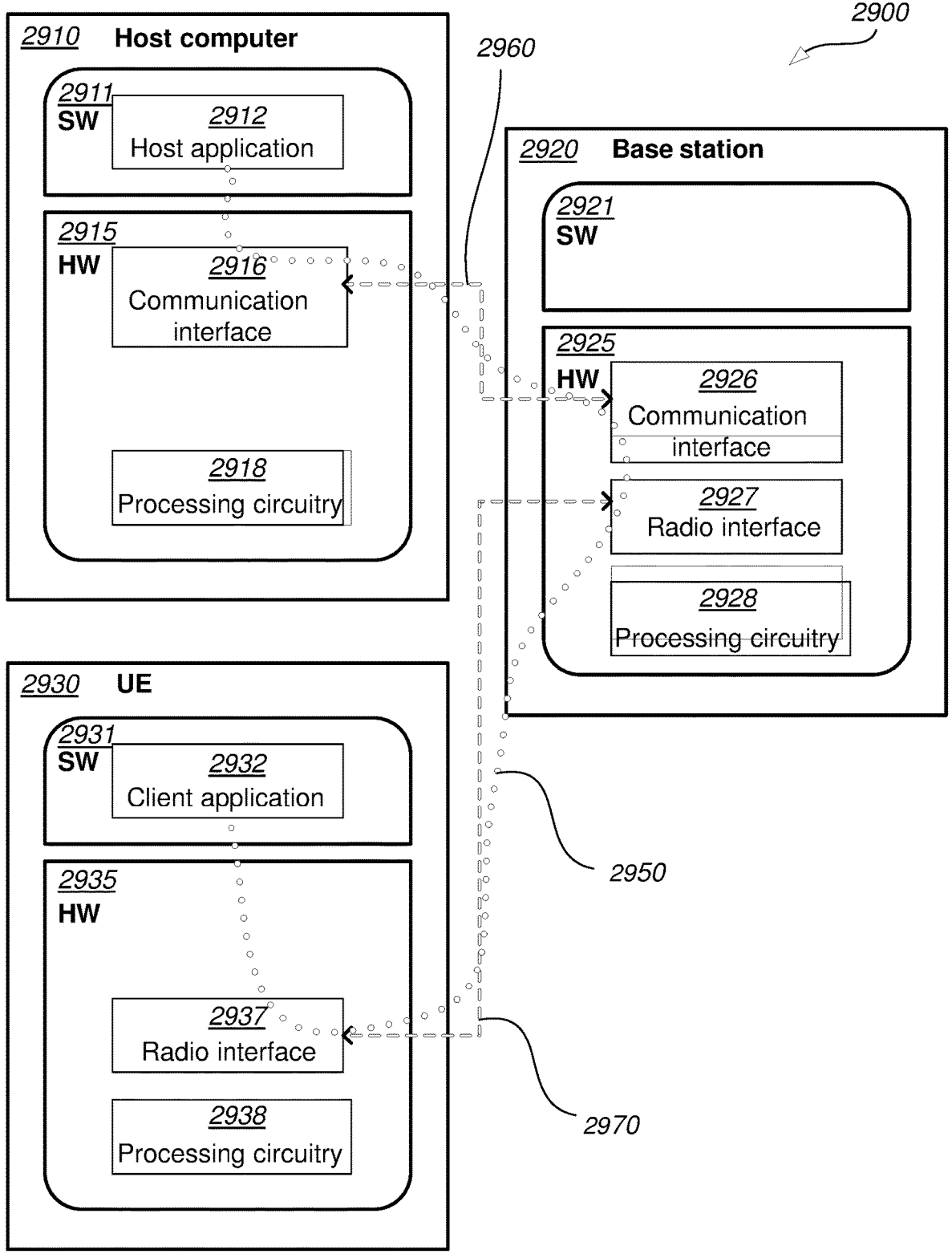
FIG. 29 is a generalized block diagram of a host computer communicating via a base station with a user equipment over a partially wireless connection, according to embodiments herein.

FIG. 29: Host Computer Communicating Via a Base Station with a User Equipment Over a Partially Wireless Connection in Accordance with Some Embodiments Example implementations, in accordance with an embodiment, of the user equipment 130, e.g., a UE, the network node 110, e.g., a base station and host computer discussed in the preceding paragraphs will now be described with reference to FIG. 29. In communication system 2900, such as the wireless communications network 100, host computer 2910 comprises hardware 2915 including communication interface 2916 configured to set up and maintain a wired or wireless connection with an interface of a different communication device of communication system 2900. Host computer 2910 further comprises processing circuitry 2918, which may have storage and/or processing capabilities. In particular, processing circuitry 2918 may comprise one or more programmable processors, application-specific integrated circuits, field programmable gate arrays or combinations of these (not shown) adapted to execute instructions. Host computer 2910 further comprises software 2911, which is stored in or accessible by host computer 2910 and executable by processing circuitry 2918. Software 2911 includes host application 2912. Host application 2912 may be operable to provide a service to a remote user, such as UE 2930 connecting via OTT connection 2950 terminating at UE 2930 and host computer 2910. In providing the service to the remote user, host application 2912 may provide user data which is transmitted using OTT connection 2950.

Communication system 2900 further includes the network node 110, exemplified in FIG. 29 as a base station 2920 provided in a telecommunication system and comprising hardware 2925 enabling it to communicate with host computer 2910 and with UE 2930. Hardware 2925 may include communication interface 2926 for setting up and maintaining a wired or wireless connection with an interface of a different communication device of communication system 2900, as well as radio interface 2927 for setting up and maintaining at least wireless connection 2970 with the user equipment 130, exemplified in FIG. 29 as a UE 2930 located in a coverage area (not shown in FIG. 29) served by base station 2920. Communication interface 2926 may be configured to facilitate connection 2960 to host computer 2910. Connection 2960 may be direct or it may pass through a core network (not shown in FIG. 29) of the telecommunication system and/or through one or more intermediate networks outside the telecommunication system. In the embodiment shown, hardware 2925 of base station 2920 further includes processing circuitry 2928, which may comprise one or more programmable processors, application-specific integrated circuits, field programmable gate arrays or combinations of these (not shown) adapted to execute instructions. Base station 2920 further has software 2921 stored internally or accessible via an external connection.

Communication system 2900 further includes UE 2930 already referred to. Its hardware 2935 may include radio interface 2937 configured to set up and maintain wireless connection 2970 with a base station serving a coverage area in which UE 2930 is currently located. Hardware 2935 of UE 2930 further includes processing circuitry 2938, which may comprise one or more programmable processors, application-specific integrated circuits, field programmable gate arrays or combinations of these (not shown) adapted to execute instructions. UE 2930 further comprises software 2931, which is stored in or accessible by UE 2930 and executable by processing circuitry 2938. Software 2931 includes client application 2932. Client application 2932 may be operable to provide a service to a human or non-human user via UE 2930, with the support of host computer 2910. In host computer 2910, an executing host application 2912 may communicate with the executing client application 2932 via OTT connection 2950 terminating at UE 2930 and host computer 2910. In providing the service to the user, client application 2932 may receive request data from host application 2912 and provide user data in response to the request data. OTT connection 2950 may transfer both the request data and the user data. Client application 2932 may interact with the user to generate the user data that it provides.

It is noted that host computer 2910, base station 2920 and UE 2930 illustrated in FIG. 29 may be similar or identical to host computer 2830, one of base stations 2812a, 2812b, 2812c and one of UEs 2891, 2892 of FIG. 28, respectively. This is to say, the inner workings of these entities may be as shown in FIG. 29 and independently, the surrounding network topology may be that of FIG. 28.

In FIG. 29, OTT connection 2950 has been drawn abstractly to illustrate the communication between host computer 2910 and UE 2930 via base station 2920, without explicit reference to any intermediary devices and the precise routing of messages via these devices. Network infrastructure may determine the routing, which it may be configured to hide from UE 2930 or from the service provider operating host computer 2910, or both. While OTT connection 2950 is active, the network infrastructure may further take decisions by which it dynamically changes the routing (e.g., on the basis of load balancing consideration or reconfiguration of the network).

Wireless connection 2970 between UE 2930 and base station 2920 is in accordance with the teachings of the embodiments described throughout this disclosure. One or more of the various embodiments improve the performance of OTT services provided to UE 2930 using OTT connection 2950, in which wireless connection 2970 forms the last segment. More precisely, the teachings of these embodiments may improve the latency, signalling overhead, and service interruption and thereby provide benefits such as reduced user waiting time, better responsiveness and extended battery lifetime.

A measurement procedure may be provided for the purpose of monitoring data rate, latency and other factors on which the one or more embodiments improve. There may further be an optional network functionality for reconfiguring OTT connection 2950 between host computer 2910 and UE 2930, in response to variations in the measurement results. The measurement procedure and/or the network functionality for reconfiguring OTT connection 2950 may be implemented in software 2911 and hardware 2915 of host computer 2910 or in software 2931 and hardware 2935 of UE 2930, or both. In embodiments, sensors (not shown) may be deployed in or in association with communication devices through which OTT connection 2950 passes; the sensors may participate in the measurement procedure by supplying values of the monitored quantities exemplified above, or supplying values of other physical quantities from which software 2911, 2931 may compute or estimate the monitored quantities. The reconfiguring of OTT connection 2950 may include message format, retransmission settings, preferred routing etc.; the reconfiguring need not affect base station 2920, and it may be unknown or imperceptible to base station 2920. Such procedures and functionalities may be known and practiced in the art. In certain embodiments, measurements may involve proprietary UE signaling facilitating host computer 2910's measurements of throughput, propagation times, latency and the like. The measurements may be implemented in that software 2911 and 2931 causes messages to be transmitted, in particular empty or 'dummy' messages, using OTT connection 2950 while it monitors propagation times, errors etc.

The first network node embodiments relate to FIG. 8, FIGS. 10-23, FIG. 24 and FIGS. 29-33.

The first network node 111 may also be configured to communicate user data with a host application unit in a host computer 2910, e.g., via another link such as 2950.

The first network node 111 may comprise an interface unit to facilitate communications between the first network node 111 and other nodes or devices, e.g., the second network node 112, the user equipment, the host computer 2910, or any other nodes. In some particular examples, the interface may, for example, include a transceiver configured to transmit and receive radio signals over an air interface in accordance with a suitable standard.

The first network node 111 may comprise an arrangement as shown in FIG. 24 or in FIG. 29.

The second network node embodiments relate to FIG. 9, FIGS. 12-23, FIG. 25 and FIGS. 29-33.

The second network node 112 may also be configured to communicate user data with a host application unit in a host computer 2910, e.g., via another link such as 2950.

The second network node 112 may comprise an interface unit to facilitate communications between the second network node 112 and other nodes or devices, e.g., the second network node 112, the user equipment, the host computer 2910, or any other nodes. In some particular examples, the interface may, for example, include a transceiver configured to transmit and receive radio signals over an air interface in accordance with a suitable standard.

The second network node 112 may comprise an arrangement as shown in FIG. 25 or in FIG. 29.

FIG. 30: Methods Implemented in a Communication System Including a Host Computer, a Base Station and a User Equipment in Accordance with Some Embodiments FIG. 30 is a flowchart illustrating a method implemented in a communication system, in accordance with one embodiment. The communication system includes a host computer, a base station and a UE which may be those described with reference to FIGS. 28 and 29. For simplicity of the present disclosure, only drawing references to FIG. 30 will be included in this section. In step 3010, the host computer provides user data. In substep 3011 (which may be optional) of step 3010, the host computer provides the user data by executing a host application. In step 3020, the host computer initiates a transmission carrying the user data to the UE. In step 3030 (which may be optional), the base station transmits to the UE the user data which was carried in the transmission that the host computer initiated, in accordance with the teachings of the embodiments described throughout this disclosure. In step 3040 (which may also be optional), the UE executes a client application associated with the host application executed by the host computer.

FIG. 31: Methods Implemented in a Communication System Including a Host Computer, a Base Station and a User Equipment in Accordance with Some Embodiments FIG. 31 is a flowchart illustrating a method implemented in a communication system, in accordance with one embodiment. The communication system includes a host computer, a base station and a UE which may be those described with reference to FIGS. 28 and 29. For simplicity of the present disclosure, only drawing references to FIG. 31 will be included in this section. In step 3110 of the method, the host computer provides user data. In an optional substep (not shown) the host computer provides the user data by executing a host application. In step 3120, the host computer initiates a transmission carrying the user data to the UE. The transmission may pass via the base station, in accordance with the teachings of the embodiments described throughout this disclosure. In step 3130 (which may be optional), the UE receives the user data carried in the transmission.

FIG. 32: Methods Implemented in a Communication System Including a Host Computer, a Base Station and a User Equipment in Accordance with Some Embodiments FIG. 32 is a flowchart illustrating a method implemented in a communication system, in accordance with one embodiment. The communication system includes a host computer, a base station and a UE which may be those described with reference to FIGS. 28 and 29. For simplicity of the present disclosure, only drawing references to FIG. 32 will be included in this section. In step 3210 (which may be optional), the UE receives input data provided by the host computer. Additionally or alternatively, in step 3220, the UE provides user data. In substep 3221 (which may be optional) of step 3220, the UE provides the user data by executing a client application. In substep 3211 (which may be optional) of step 3210, the UE executes a client application which provides the user data in reaction to the received input data provided by the host computer. In providing the user data, the executed client application may further consider user input received from the user. Regardless of the specific manner in which the user data was provided, the UE initiates, in substep 3230 (which may be optional), transmission of the user data to the host computer. In step 3240 of the method, the host computer receives the user data transmitted from the UE, in accordance with the teachings of the embodiments described throughout this disclosure.

FIG. 33: Methods Implemented in a Communication System Including a Host Computer, a Base Station and a User Equipment in Accordance with Some Embodiments FIG. 33 is a flowchart illustrating a method implemented in a communication system, in accordance with one embodiment. The communication system includes a host computer, a base station and a UE which may be those described with reference to FIGS. 28 and 29. For simplicity of the present disclosure, only drawing references to FIG. 33 will be included in this section. In step 3310 (which may be optional), in accordance with the teachings of the embodiments described throughout this disclosure, the base station receives user data from the UE. In step 3320 (which may be optional), the base station initiates transmission of the received user data to the host computer. In step 3330 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Further Numbered Embodiments

1. A base station configured to communicate with a user equipment (UE), the base station comprising a radio interface and processing circuitry configured to perform one or more of the actions described herein as performed by the network node 110.

5. A communication system including a host computer comprising:
   processing circuitry configured to provide user data; and
   a communication interface configured to forward the user data to a cellular network for transmission to a user equipment (UE),
   wherein the cellular network comprises a base station having a radio interface and processing circuitry, the base station's processing circuitry configured to perform one or more of the actions described herein as performed by the network node 110.

6. The communication system of embodiment 5, further including the base station.

7. The communication system of embodiment 6, further including the UE, wherein the UE is configured to communicate with the base station.

8. The communication system of embodiment 7, wherein:
   the processing circuitry of the host computer is configured to execute a host application, thereby providing the user data; and
   the UE comprises processing circuitry configured to execute a client application associated with the host application.

11. A method implemented in a base station, comprising one or more of the actions described herein as performed by the network node 110.

15. A method implemented in a communication system including a host computer, a base station and a user equipment (UE), the method comprising:
   at the host computer, providing user data; and
   at the host computer, initiating a transmission carrying the user data to the UE via a cellular network comprising the base station, wherein the base station performs one or more of the actions described herein as performed by the network node 110.

16. The method of embodiment 15, further comprising:
   at the base station, transmitting the user data.

17. The method of embodiment 16, wherein the user data is provided at the host computer by executing a host application, the method further comprising:
   at the UE, executing a client application associated with the host application.

21. A user equipment (UE) configured to communicate with a base station, the UE comprising a radio interface and processing circuitry configured to perform one or more of the actions described herein as performed by the user equipment 130.

25. A communication system including a host computer comprising:
   processing circuitry configured to provide user data; and
   a communication interface configured to forward user data to a cellular network for transmission to a user equipment (UE),
   wherein the UE comprises a radio interface and processing circuitry, the UE's processing circuitry configured to perform one or more of the actions described herein as performed by the user equipment 130.

26. The communication system of embodiment 25, further including the UE.

27. The communication system of embodiment 26, wherein the cellular network further includes a base station configured to communicate with the UE.

28. The communication system of embodiment 26 or 27, wherein:
   the processing circuitry of the host computer is configured to execute a host application, thereby providing the user data; and
   the UE's processing circuitry is configured to execute a client application associated with the host application.

31. A method implemented in a user equipment (UE), comprising one or more of the actions described herein as performed by the user equipment 130.

35. A method implemented in a communication system including a host computer, a base station and a user equipment (UE), the method comprising:

at the host computer, providing user data; and
at the host computer, initiating a transmission carrying the user data to the UE via a cellular network comprising the base station, wherein the UE performs one or more of the actions described herein as performed by the user equipment 130.

36. The method of embodiment 35, further comprising:
at the UE, receiving the user data from the base station.

41. A user equipment (UE) configured to communicate with a base station, the UE comprising a radio interface and processing circuitry configured to perform one or more of the actions described herein as performed by the user equipment 130.

45. A communication system including a host computer comprising:
a communication interface configured to receive user data originating from a transmission from a user equipment (UE) to a base station,
wherein the UE comprises a radio interface and processing circuitry, the UE's processing circuitry configured to: perform one or more of the actions described herein as performed by the user equipment 130.

46. The communication system of embodiment 45, further including the UE.

47. The communication system of embodiment 46, further including the base station, wherein the base station comprises a radio interface configured to communicate with the UE and a communication interface configured to forward to the host computer the user data carried by a transmission from the UE to the base station.

48. The communication system of embodiment 46 or 47, wherein:
the processing circuitry of the host computer is configured to execute a host application; and
the UE's processing circuitry is configured to execute a client application associated with the host application, thereby providing the user data.

49. The communication system of embodiment 46 or 47, wherein:
the processing circuitry of the host computer is configured to execute a host application, thereby providing request data; and
the UE's processing circuitry is configured to execute a client application associated with the host application, thereby providing the user data in response to the request data.

51. A method implemented in a user equipment (UE), comprising one or more of the actions described herein as performed by the user equipment 130.

52. The method of embodiment 51, further comprising:
providing user data; and
forwarding the user data to a host computer via the transmission to the base station.

55. A method implemented in a communication system including a host computer, a base station and a user equipment (UE), the method comprising:
at the host computer, receiving user data transmitted to the base station from the UE, wherein the UE performs one or more of the actions described herein as performed by the user equipment 130.

56. The method of embodiment 55, further comprising:
at the UE, providing the user data to the base station.

57. The method of embodiment 56, further comprising:
at the UE, executing a client application, thereby providing the user data to be transmitted; and
at the host computer, executing a host application associated with the client application.

58. The method of embodiment 56, further comprising:
at the UE, executing a client application; and
at the UE, receiving input data to the client application, the input data being provided at the host computer by executing a host application associated with the client application,
wherein the user data to be transmitted is provided by the client application in response to the input data.

61. A base station configured to communicate with a user equipment (UE), the base station comprising a radio interface and processing circuitry configured to perform one or more of the actions described herein as performed by the network node 110.

65. A communication system including a host computer comprising a communication interface configured to receive user data originating from a transmission from a user equipment (UE) to a base station, wherein the base station comprises a radio interface and processing circuitry, the base station's processing circuitry configured to perform one or more of the actions described herein as performed by the network node 110.

66. The communication system of embodiment 65, further including the base station.

67. The communication system of embodiment 66, further including the UE, wherein the UE is configured to communicate with the base station.

68. The communication system of embodiment 67, wherein:
the processing circuitry of the host computer is configured to execute a host application;
the UE is configured to execute a client application associated with the host application, thereby providing the user data to be received by the host computer.

71. A method implemented in a base station, comprising one or more of the actions described herein as performed by the network node 110.

75. A method implemented in a communication system including a host computer, a base station and a user equipment (UE), the method comprising:
at the host computer, receiving, from the base station, user data originating from a transmission which the base station has received from the UE, wherein the UE performs one or more of the actions described herein as performed by the user equipment 130.

76. The method of embodiment 75, further comprising:
at the base station, receiving the user data from the UE.

77. The method of embodiment 76, further comprising:
at the base station, initiating a transmission of the received user data to the host computer.

Abbreviations

At least some of the following abbreviations may be used in this disclosure. If there is an inconsistency between abbreviations, preference should be given to how it is used above. If listed multiple times below, the first listing should be preferred over any subsequent listing(s).

3GPP 3rd Generation Partnership Project
5G 5th Generation
5GS 5G System
5GC 5G Core network
AM Acknowledged Mode
AMD Acknowledged Mode Data
AMF Access and Mobility Management Function
ARQ Automated Repeat Request
CHO Conditional Handover
CN Core Network
C-RNTI Cell RNTI CU Central Unit
DL Downlink
DU Distributed Unit
eICIC Enhanced Inter-Cell Interference Coordination
eNB Evolved Node B
eMBB Enhanced Make-Before-Break
E-UTRAN Evolved Universal Terrestrial Access Network
EPC Evolved Packet Core network
gNB 5G Node B
HARQ Hybrid Automatic Repeat Request
HO Handover
ICIC Inter-Cell Interference Coordination
LTE Long-term Evolution
MAC Medium Access Control
MBB Make-Before-Break
MME Mobility Management Entity
NCC Next Hop Chaining Counter
NG The interface/reference point between the RAN and the CN in 5G/NR.
NG-C The control plane part of NG (between a gNB and an AMF).
NG-U The user plane part of NG (between a gNB and a UPF).
NG-RAN Next Generation Radio Access Network
NR New Radio
PDCP Packet Data Convergence Protocol
PDU Protocol Data Unit
PHY Physical layer
QoS Quality of Service
RA Random Access
RACH Random Access Channel
RAN Radio Access Network
RAR Random Access Response
RLC Radio Link Control
ROHC Robust Header Compression
RNTI Radio Network Temporary Identifier
RRC Radio Resource Control
Rx Receive
S1 The interface/reference point between the RAN and the CN in LTE.
S1-C The control plane part of S1 (between an eNB and a MME).
S1-U The user plane part of S1 (between an eNB and a SGW).
SDU Service Data Unit
SGW Serving Gateway
SN Sequence Number
TS Technical Specification
Tx Transmit
UE User Equipment
UL Uplink
UPF User Plane Function
URLLC Ultra-Reliable Low-Latency Communication
X2 The interface/reference point between two eNBs.
X2AP X2 Application Protocol
Xn The interface/reference point between two gNBs.
XnAP Xn Application Protocol

The invention claimed is:

1. A method performed by a first network node, the method being for handling a Random Access Channel, RACH, configuration conflict, the first network node operating in a wireless communications network with Radio Access Technology with a split architecture, the first network node being a Distributed Unit, DU, and a second network node being a Centralized Unit, CU, the method comprising:

receiving one or more indications from the second network node operating in the wireless communications network, the one or more indications being one or more second indications, the one or more indications comprising at least one of:
  i. a positive acknowledgement or a negative acknowledgement of a RACH configuration conflict detected between a first RACH configuration in a first cell, the first cell being a served cell by the first network node, and a second RACH configuration in a second cell, the second cell being a neighbour cell to the first cell,
  ii. CU RACH assistance information associated to the RACH conflict, the CU RACH assistance information comprising the second RACH configuration, and
  iii. a first third RACH configuration for the first cell,
detecting an existence of the conflict, and
updating the first RACH configuration to a second third RACH configuration, based on the detected conflict, the second third RACH configuration being obtained based on the received one or more indications, and
sending a first indication to the second network node, the first indication being based on the detected conflict, and the one or more second indications being based on the sent first indication.

2. The method according to claim 1, wherein the CU RACH assistance information comprises at least one of:
  i. a set of second RACH configurations of neighbouring cells to the first cell served by the first network node causing the RACH conflict,
  ii. another set of RACH configurations of neighbouring cells to the first cell served by the first network node for which the RACH conflict has been detected, wherein the another set of RACH configurations are not causing the RACH conflict and are to be avoided when resolving the RACH conflict for the served cell, and
  iii. a range of values for one or more RACH resources that are available to be used by the first network node to resolve the RACH conflict for the served cell.

3. The method according to claim 1, the method further comprising:
obtaining the second third RACH configuration based on the received one or more indications.

4. The method according to claim 3, the method further comprising:
sending a fourth indication to at least one of a second network node operating in the wireless communications network and a third network node operating in the wireless communications network, the fourth indication being based on the obtained second third RACH configuration, and/or on the first RACH configuration as updated to the second third RACH configuration by the first network node.

5. The method according to claim 1, wherein the first indication comprises one or more of:
an indication of the detected conflict for the served cell,
an identifier of the served cell for which the conflict has been detected,
a request for the second network node to verify the conflict detected by the first network node for the served cell,
a request to the second network node for RACH assistance information for the detected conflict for the served cell.

6. The method according to claim 1, wherein the method further comprises:

obtaining first assistance information based on the determined conflict, and sending a third indication to the second network node, the third indication being based on the obtained first assistance information and wherein at least one of the received one or more second indications is based on the sent third indication.

7. A first network node, for handling a Random Access Channel, RACH, configuration conflict, the first network node being configured to operate in a wireless communications network with Radio Access Technology with a split architecture, the first network node being configured to be a Distributed Unit, DU, and a second network node being configured to be a Centralized Unit, CU, the first network node further configured to:

receive one or more indications from the second network node configured to operate in the wireless communications network, the one or more indications being one or more second indications, the one or more indications being configured to comprise at least one of:
  i. a positive acknowledgement or a negative acknowledgement of a RACH configuration conflict configured to be detected between a first RACH configuration in a first cell, the first cell being configured to be a served cell by the first network node, and a second RACH configuration in a second cell, the second cell being configured to be a neighbour cell to the first cell,
  ii. CU RACH assistance information configured to be associated to the RACH conflict, the CU RACH assistance information being configured to comprise the second RACH configuration, and
  iii. a first third RACH configuration for the first cell,
detect an existence of the conflict, and
update the first RACH configuration to a second third RACH configuration, based on the conflict configured to be detected, the second third RACH configuration configured to be obtained based on the one or more indications configured to be received, and
send a first indication to the second network node, the first indication configured to be based on the conflict configured to be detected, and the one or more second indications configured to be based on the first indication configured to be sent.

8. The first network node according to claim 7, wherein the CU RACH assistance information is configured to comprise at least one of:
  i. a set of second RACH configurations of neighbouring cells to the first cell configured to be served by the first network node causing the RACH conflict,
  ii. another set of RACH configurations of neighbouring cells to the first cell configured to be served by the first network node for which the RACH conflict is configured to have been detected, wherein the another set of RACH configurations are configured to not cause the RACH conflict and are to be avoided when resolving the RACH conflict for the served cell, and
  iii. a range of values for one or more RACH resources that are configured to be available to be used by the first network node to resolve the RACH conflict for the served cell.

9. The first network node according to claim 7, the first network node being further configured to:
  obtain the second third RACH configuration based on the one or more indications configured to be received.

10. The first network node according to claim 7, wherein the first indication is further configured to comprise one or more of:
  an indication of the detected conflict for the served cell,
  an identifier of the served cell for which the conflict is configured to have been detected,
  a request for the second network node to verify the conflict configured to be detected by the first network node for the served cell,
  a request to the second network node for RACH assistance information for the conflict for the served cell configured to be detected.

11. The first network node according to claim 7, wherein the first network node is further configured to:
  obtain first assistance information configured to be based on the conflict configured to be determined, and
  send a third indication to the second network node, the third indication being configured to be based on the first assistance information configured to be obtained and wherein at least one of the one or more second indications configured to be received is configured to be based on the third indication configured to be sent.

* * * * *